US010181019B2

United States Patent
Barday et al.

(10) Patent No.: US 10,181,019 B2
(45) Date of Patent: *Jan. 15, 2019

(54) DATA PROCESSING SYSTEMS AND COMMUNICATIONS SYSTEMS AND METHODS FOR INTEGRATING PRIVACY COMPLIANCE SYSTEMS WITH SOFTWARE DEVELOPMENT AND AGILE TOOLS FOR PRIVACY DESIGN

(71) Applicant: OneTrust, LLC, Atlanta, GA (US)

(72) Inventors: Kabir A. Barday, Atlanta, GA (US); Jonathan Blake Brannon, Smyrna, GA (US)

(73) Assignee: OneTrust, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/989,416

(22) Filed: May 25, 2018

(65) Prior Publication Data
US 2018/0276355 A1    Sep. 27, 2018

Related U.S. Application Data

(63) Continuation-in-part of application No. 15/853,674, filed on Dec. 22, 2017, now Pat. No. 10,019,597,
(Continued)

(51) Int. Cl.
*G06F 9/44* (2018.01)
*G06F 21/31* (2013.01)
(Continued)

(52) U.S. Cl.
CPC ........ *G06F 21/316* (2013.01); *G06F 11/3438* (2013.01); *G06F 21/6245* (2013.01); *G06F 2201/81* (2013.01); *G06F 2221/2111* (2013.01)

(58) Field of Classification Search
CPC ............... G06F 21/316; G06F 21/6245; G06F 11/3438; G06F 2221/2111; G06F 2201/81
(Continued)

(56) References Cited

U.S. PATENT DOCUMENTS 5,276,735 A    1/1994  Boebert et al.
6,253,203 B1   6/2001  Oflaherty et al.
(Continued)

FOREIGN PATENT DOCUMENTS

EP    2031540      3/2009
WO    2005008411   1/2005
(Continued)

OTHER PUBLICATIONS

Notice of Allowance, dated Jun. 19, 2018, from corresponding U.S. Appl. No. 15/894,890.
(Continued)

*Primary Examiner* — Anna C Deng
(74) *Attorney, Agent, or Firm* — Brient IP Law, LLC

(57) ABSTRACT

A privacy compliance monitoring system, according to particular embodiments, is configured to track a user's system inputs and responses to questions regarding a particular privacy campaign in order to monitor any potential abnormal or misleading response. In various embodiments, the system is configured to track changes to a user's responses, monitor an amount of time it takes a user to respond, determine a number of times that a user changes a response and/take other actions to determine whether a particular response may be abnormal. In various embodiments, the system is configured to automatically flag one or more questions based on determining that the user may have provided an abnormal response.

19 Claims, 23 Drawing Sheets

Related U.S. Application Data which is a continuation-in-part of application No. 15/619,455, filed on Jun. 10, 2017, now Pat. No. 9,851,966, which is a continuation-in-part of application No. 15/254,901, filed on Sep. 1, 2016, now Pat. No. 9,729,583.

(60) Provisional application No. 62/541,613, filed on Aug. 4, 2017, provisional application No. 62/360,123, filed on Jul. 8, 2016, provisional application No. 62/353,802, filed on Jun. 23, 2016, provisional application No. 62/348,695, filed on Jun. 10, 2016.

(51) Int. Cl.
*G06F 21/62* (2013.01)
*G06F 11/34* (2006.01)

(58) Field of Classification Search
USPC .......................................................... 717/101
See application file for complete search history.

(56) References Cited

U.S. PATENT DOCUMENTS

| | | |
|---|---|---|
| 6,275,824 B1 | 8/2001 | Oflaherty et al. |
| 6,374,252 B1 | 4/2002 | Althoff et al. |
| 6,816,944 B2 | 11/2004 | Peng |
| 6,901,346 B2 | 5/2005 | Tracy et al. |
| 6,904,417 B2 | 6/2005 | Clayton et al. |
| 6,925,443 B1 | 8/2005 | Baggett, Jr. et al. |
| 6,983,221 B2 | 1/2006 | Tracy et al. |
| 6,993,448 B2 | 1/2006 | Tracy et al. |
| 6,993,495 B2 | 1/2006 | Smith, Jr. et al. |
| 7,058,970 B2 | 6/2006 | Shaw |
| 7,069,427 B2 | 6/2006 | Adler et al. |
| 7,234,065 B2 | 6/2007 | Breslin et al. |
| 7,251,624 B1 | 7/2007 | Lee et al. |
| 7,260,830 B2 | 8/2007 | Sugimoto |
| 7,287,280 B2 | 10/2007 | Young |
| 7,290,275 B2 | 10/2007 | Baudoin et al. |
| 7,412,402 B2 | 8/2008 | Cooper |
| 7,478,157 B2 | 1/2009 | Bohrer et al. |
| 7,512,987 B2 | 3/2009 | Williams |
| 7,516,882 B2 | 4/2009 | Cucinotta |
| 7,523,053 B2 | 4/2009 | Pudhukottai et al. |
| 7,548,968 B1 | 6/2009 | Bura et al. |
| 7,584,505 B2 | 9/2009 | Mondri et al. |
| 7,603,356 B2 | 10/2009 | Schran et al. |
| 7,630,998 B2 | 12/2009 | Zhou et al. |
| 7,636,742 B1 | 12/2009 | Olavarrieta et al. |
| 7,668,947 B2 | 2/2010 | Hutchinson et al. |
| 7,673,282 B2 | 3/2010 | Amaru et al. |
| 7,707,224 B2 | 4/2010 | Chastagnol et al. |
| 7,729,940 B2 | 6/2010 | Harvey et al. |
| 7,756,987 B2 | 7/2010 | Wang et al. |
| 7,788,632 B2 | 8/2010 | Kuester et al. |
| 7,801,758 B2 | 9/2010 | Gracie et al. |
| 7,853,468 B2 | 12/2010 | Callahan et al. |
| 7,870,608 B2 | 1/2011 | Shraim et al. |
| 7,877,812 B2 | 1/2011 | Koved et al. |
| 7,885,841 B2 | 2/2011 | King |
| 7,917,963 B2 | 3/2011 | Goyal et al. |
| 7,966,310 B2 | 6/2011 | Sullivan et al. |
| 7,966,663 B2 | 6/2011 | Strickland et al. |
| 7,991,559 B2 | 8/2011 | Dzekunov et al. |
| 8,019,881 B2 | 9/2011 | Sandhu et al. |
| 8,146,074 B2 | 3/2012 | Ito et al. |
| 8,150,717 B2 | 4/2012 | Whitmore |
| 8,156,158 B2 | 4/2012 | Rolls et al. |
| 8,176,334 B2 | 5/2012 | Vainstein |
| 8,180,759 B2 | 5/2012 | Hamzy |
| 8,286,239 B1 | 10/2012 | Sutton |
| 8,438,644 B2 | 5/2013 | Watters et al. |
| 8,494,894 B2 | 7/2013 | Jaster et al. |
| 8,504,481 B2 | 8/2013 | Motahari et al. |
| 8,578,036 B1 | 11/2013 | Holfelder et al. |
| 8,578,166 B2 | 11/2013 | De Monseignat et al. |
| 8,578,481 B2 | 11/2013 | Rowley |
| 8,583,694 B2 | 11/2013 | Siegel et al. |
| 8,601,591 B2 | 12/2013 | Krishnamurthy et al. |
| 8,606,746 B2 | 12/2013 | Yeap et al. |
| 8,612,420 B2 | 12/2013 | Sun et al. |
| 8,612,993 B2 | 12/2013 | Grant et al. |
| 8,621,637 B2 | 12/2013 | Al-Harbi et al. |
| 8,683,502 B2 | 3/2014 | Shkedi et al. |
| 8,688,601 B2 | 4/2014 | Jaiswal |
| 8,706,742 B1 | 4/2014 | Ravid et al. |
| 8,712,813 B2 | 4/2014 | King |
| 8,744,894 B2 | 6/2014 | Christiansen et al. |
| 8,763,071 B2 | 6/2014 | Sinha et al. |
| 8,767,947 B1 | 7/2014 | Ristock et al. |
| 8,805,707 B2 | 8/2014 | Schumann, Jr. et al. |
| 8,805,925 B2 | 8/2014 | Price et al. |
| 8,812,342 B2 | 8/2014 | Barcelo et al. |
| 8,819,253 B2 | 8/2014 | Simeloff et al. |
| 8,826,446 B1 | 9/2014 | Liu et al. |
| 8,893,286 B1 | 11/2014 | Oliver |
| 8,914,299 B2 | 12/2014 | Pesci-Anderson et al. |
| 8,943,076 B2 | 1/2015 | Stewart et al. |
| 8,959,584 B2 | 2/2015 | Piliouras |
| 8,966,575 B2 | 2/2015 | McQuay et al. |
| 8,977,234 B2 | 3/2015 | Chava |
| 8,983,972 B2 | 3/2015 | Kriebel et al. |
| 8,990,933 B1 | 3/2015 | Magdalin |
| 8,997,213 B2 | 3/2015 | Papakipos et al. |
| 9,047,582 B2 | 6/2015 | Hutchinson et al. |
| 9,092,796 B2 | 7/2015 | Eversoll et al. |
| 9,094,434 B2 | 7/2015 | Williams et al. |
| 9,098,515 B2 | 8/2015 | Richter et al. |
| 9,111,295 B2 | 8/2015 | Tietzen et al. |
| 9,135,261 B2 | 9/2015 | Maunder et al. |
| 9,152,820 B1 | 10/2015 | Pauley, Jr. et al. |
| 9,158,655 B2 | 10/2015 | Wadhwani et al. |
| 9,172,706 B2 | 10/2015 | Krishnamurthy et al. |
| 9,178,901 B2 | 11/2015 | Xue et al. |
| 9,202,085 B2 | 12/2015 | Mawdsley et al. |
| 9,215,252 B2 | 12/2015 | Smith et al. |
| 9,232,040 B2 | 1/2016 | Barash et al. |
| 9,235,476 B2 | 1/2016 | McHugh et al. |
| 9,288,118 B1 | 3/2016 | Pattan |
| 9,317,715 B2 | 4/2016 | Schuette et al. |
| 9,336,332 B2 | 5/2016 | Davis et al. |
| 9,338,188 B1 | 5/2016 | Ahn |
| 9,344,424 B2 | 5/2016 | Tenenboym et al. |
| 9,348,802 B2 | 5/2016 | Massand |
| 9,369,488 B2 | 6/2016 | Woods et al. |
| 9,384,357 B2 | 7/2016 | Patil et al. |
| 9,386,104 B2 | 7/2016 | Adams et al. |
| 9,401,900 B2 | 7/2016 | Levasseur et al. |
| 9,424,021 B2 | 8/2016 | Zamir |
| 9,462,009 B1 | 10/2016 | Kolman et al. |
| 9,477,660 B2 | 10/2016 | Scott et al. |
| 9,483,659 B2 | 11/2016 | Bao et al. |
| 9,507,960 B2 | 11/2016 | Bell et al. |
| 9,521,166 B2 | 12/2016 | Wilson |
| 9,549,047 B1 | 1/2017 | Fredinburg et al. |
| 9,558,497 B2 | 1/2017 | Carvalho |
| 9,571,509 B1 | 2/2017 | Satish et al. |
| 9,602,529 B2 | 3/2017 | Jones et al. |
| 9,621,566 B2 | 4/2017 | Gupta et al. |
| 9,646,095 B1 | 5/2017 | Gottlieb et al. |
| 9,648,036 B2 | 5/2017 | Seiver et al. |
| 9,652,314 B2 | 5/2017 | Mahiddini |
| 9,654,541 B1 | 5/2017 | Kapczynski et al. |
| 9,665,722 B2 | 5/2017 | Nagasundaram et al. |
| 9,672,053 B2 | 6/2017 | Tang et al. |
| 9,691,090 B1 | 6/2017 | Barday |
| 9,721,078 B2 | 8/2017 | Cornick et al. |
| 9,721,108 B2 | 8/2017 | Krishnamurthy et al. |
| 9,729,583 B1 | 8/2017 | Barday |
| 9,740,985 B2 | 8/2017 | Byron et al. |
| 9,740,987 B2 | 8/2017 | Dolan |
| 9,767,309 B1 | 9/2017 | Patel et al. |
| 9,800,605 B2 | 10/2017 | Baikalov et al. |

(56) References Cited

U.S. PATENT DOCUMENTS

| | | | |
|---|---|---|---|
| 9,838,407 B1 | 12/2017 | Oprea et al. | |
| 9,882,935 B2 | 1/2018 | Barday | |
| 9,892,441 B2 | 2/2018 | Barday | |
| 9,892,442 B2 | 2/2018 | Barday | |
| 9,892,443 B2 | 2/2018 | Barday | |
| 9,892,444 B2 | 2/2018 | Barday | |
| 9,898,769 B2 | 2/2018 | Barday | |
| 9,916,703 B2 | 3/2018 | Robert et al. | |
| 10,013,577 B1 | 7/2018 | Beaumont et al. | |
| 10,044,761 B2 | 8/2018 | Ducatel et al. | |
| 10,055,426 B2 | 8/2018 | Arasan et al. | |
| 2002/0161594 A1 | 10/2002 | Bryan et al. | |
| 2003/0041250 A1 | 2/2003 | Proudler | |
| 2005/0022198 A1 | 1/2005 | Olapurath et al. | |
| 2005/0144066 A1 | 6/2005 | Cope et al. | |
| 2005/0197884 A1 | 9/2005 | Mullen, Jr. | |
| 2006/0015263 A1* | 1/2006 | Stupp | G06F 17/18 702/19 |
| 2006/0075122 A1 | 4/2006 | Lindskog et al. | |
| 2007/0027715 A1 | 2/2007 | Gropper et al. | |
| 2007/0157311 A1 | 7/2007 | Meier et al. | |
| 2007/0180490 A1 | 8/2007 | Renzi et al. | |
| 2007/0266420 A1 | 11/2007 | Hawkins et al. | |
| 2007/0283171 A1 | 12/2007 | Breslin et al. | |
| 2008/0015927 A1 | 1/2008 | Ramirez | |
| 2008/0028435 A1 | 1/2008 | Strickland et al. | |
| 2008/0047016 A1 | 2/2008 | Spoonamore | |
| 2008/0120699 A1 | 5/2008 | Spear | |
| 2008/0270203 A1 | 10/2008 | Holmes et al. | |
| 2008/0288271 A1 | 11/2008 | Faust | |
| 2009/0037975 A1 | 2/2009 | Ishikawa et al. | |
| 2009/0182818 A1 | 7/2009 | Krywaniuk | |
| 2009/0204452 A1 | 8/2009 | Iskandar et al. | |
| 2009/0216610 A1 | 8/2009 | Chorny | |
| 2009/0303237 A1 | 12/2009 | Liu et al. | |
| 2010/0121773 A1 | 5/2010 | Currier et al. | |
| 2010/0192201 A1 | 7/2010 | Shimoni et al. | |
| 2010/0205057 A1 | 8/2010 | Hook et al. | |
| 2010/0228786 A1 | 9/2010 | Török | |
| 2010/0235915 A1 | 9/2010 | Memon et al. | |
| 2010/0268628 A1 | 10/2010 | Pitkow et al. | |
| 2010/0281313 A1 | 11/2010 | White et al. | |
| 2010/0333012 A1 | 12/2010 | Adachi et al. | |
| 2011/0010202 A1 | 1/2011 | Neale | |
| 2011/0137696 A1 | 6/2011 | Meyer et al. | |
| 2011/0231896 A1 | 9/2011 | Tovar | |
| 2012/0084349 A1 | 4/2012 | Lee et al. | |
| 2012/0102543 A1 | 4/2012 | Kohli et al. | |
| 2012/0110674 A1 | 5/2012 | Belani et al. | |
| 2012/0116923 A1 | 5/2012 | Irving et al. | |
| 2012/0143650 A1 | 6/2012 | Crowley et al. | |
| 2012/0144499 A1 | 6/2012 | Tan et al. | |
| 2012/0259752 A1 | 10/2012 | Agee | |
| 2013/0111323 A1 | 5/2013 | Taghaddos et al. | |
| 2013/0218829 A1 | 8/2013 | Martinez | |
| 2013/0311224 A1 | 11/2013 | Heroux et al. | |
| 2013/0332362 A1 | 12/2013 | Ciurea | |
| 2013/0340086 A1 | 12/2013 | Blom | |
| 2014/0006616 A1 | 1/2014 | Aad et al. | |
| 2014/0012833 A1 | 1/2014 | Humprecht | |
| 2014/0032265 A1 | 1/2014 | Paprocki | |
| 2014/0040134 A1 | 2/2014 | Ciurea | |
| 2014/0040161 A1 | 2/2014 | Berlin | |
| 2014/0047551 A1 | 2/2014 | Nagasundaram et al. | |
| 2014/0089039 A1 | 3/2014 | McClellan | |
| 2014/0208418 A1 | 7/2014 | Libin | |
| 2014/0278663 A1 | 9/2014 | Samuel et al. | |
| 2014/0283027 A1 | 9/2014 | Orona et al. | |
| 2014/0283106 A1 | 9/2014 | Stahura et al. | |
| 2014/0288971 A1 | 9/2014 | Whibbs, III | |
| 2014/0289862 A1 | 9/2014 | Gorfein et al. | |
| 2014/0337466 A1 | 11/2014 | Li et al. | |
| 2014/0344015 A1 | 11/2014 | Puértolas-Montañés et al. | |
| 2015/0019530 A1 | 1/2015 | Felch | |
| 2015/0066577 A1 | 3/2015 | Christiansen et al. | |
| 2015/0095352 A1* | 4/2015 | Lacey | G06F 17/30011 707/752 |
| 2015/0106867 A1 | 4/2015 | Liang | |
| 2015/0106948 A1 | 4/2015 | Holman et al. | |
| 2015/0106949 A1 | 4/2015 | Holman et al. | |
| 2015/0169318 A1 | 6/2015 | Nash | |
| 2015/0178740 A1 | 6/2015 | Borawski et al. | |
| 2015/0229664 A1 | 8/2015 | Hawthorn et al. | |
| 2015/0242778 A1 | 8/2015 | Wilcox et al. | |
| 2015/0261887 A1 | 9/2015 | Joukov | |
| 2015/0269384 A1 | 9/2015 | Holman et al. | |
| 2015/0356362 A1 | 12/2015 | Demos | |
| 2015/0379430 A1 | 12/2015 | Dirac et al. | |
| 2016/0034918 A1 | 2/2016 | Bjelajac et al. | |
| 2016/0048700 A1 | 2/2016 | Stransky-Heilkron | |
| 2016/0063523 A1 | 3/2016 | Nistor et al. | |
| 2016/0071112 A1 | 3/2016 | Unser | |
| 2016/0099963 A1 | 4/2016 | Mahaffey et al. | |
| 2016/0125751 A1 | 5/2016 | Barker et al. | |
| 2016/0148143 A1 | 5/2016 | Anderson et al. | |
| 2016/0162269 A1 | 6/2016 | Pogorelik et al. | |
| 2016/0234319 A1 | 8/2016 | Griffin | |
| 2016/0321748 A1 | 11/2016 | Mahatma et al. | |
| 2016/0330237 A1 | 11/2016 | Edlabadkar | |
| 2016/0342811 A1 | 11/2016 | Whitcomb et al. | |
| 2016/0364736 A1 | 12/2016 | Maugans, III | |
| 2016/0370954 A1 | 12/2016 | Burningham et al. | |
| 2016/0381064 A1 | 12/2016 | Chan et al. | |
| 2016/0381560 A1* | 12/2016 | Margaliot | H04L 63/08 726/4 |
| 2017/0004055 A1 | 1/2017 | Horan et al. | |
| 2017/0115864 A1 | 4/2017 | Thomas et al. | |
| 2017/0142158 A1 | 5/2017 | Laoutaris et al. | |
| 2017/0161520 A1 | 6/2017 | Lockhart, III et al. | |
| 2017/0171235 A1 | 6/2017 | Mulchandani et al. | |
| 2017/0177324 A1 | 6/2017 | Frank et al. | |
| 2017/0180505 A1* | 6/2017 | Shaw | H04L 67/306 |
| 2017/0193624 A1 | 7/2017 | Tsai | |
| 2017/0201518 A1 | 7/2017 | Holmqvist et al. | |
| 2017/0206707 A1 | 7/2017 | Guay et al. | |
| 2017/0220964 A1 | 8/2017 | Datta Ray | |
| 2017/0249710 A1 | 8/2017 | Guillama et al. | |
| 2017/0270318 A1 | 9/2017 | Ritchie | |
| 2017/0286719 A1 | 10/2017 | Krishnamurthy et al. | |
| 2017/0330197 A1 | 11/2017 | Dimaggio et al. | |
| 2018/0063174 A1 | 3/2018 | Grill et al. | |
| 2018/0063190 A1 | 3/2018 | Wright et al. | |
| 2018/0091476 A1 | 3/2018 | Jakobsson et al. | |

FOREIGN PATENT DOCUMENTS

| | | |
|---|---|---|
| WO | 2007002412 | 1/2007 |
| WO | 2012174659 | 12/2012 |
| WO | 2015116905 | 8/2015 |

OTHER PUBLICATIONS

Notice of Allowance, dated Jun. 27, 2018, from corresponding U.S. Appl. No. 15/882,989.

Notice of Allowance, dated May 21, 2018, from corresponding U.S. Appl. No. 15/896,790.

Notice of Allowance, dated May 5, 2017, from corresponding U.S. Appl. No. 15/254,901.

Notice of Allowance, dated Nov. 7, 2017, from corresponding U.S. Appl. No. 15/671,073.

Notice of Allowance, dated Sep. 27, 2017, from corresponding U.S. Appl. No. 15/626,052.

Notice of Filing Date for Petition for Post-Grant Review of related U.S. Pat. No. 9,691,090 dated Apr. 12, 2018.

Office Action, dated Apr. 18, 2018, from corresponding U.S. Appl. No. 15/894,819.

Office Action, dated Aug. 23, 2017, from corresponding U.S. Appl. No. 15/626,052.

Office Action, dated Aug. 24, 2017, from corresponding U.S. Appl. No. 15/169,643.

Office Action, dated Aug. 24, 2017, from corresponding U.S. Appl. No. 15/619,451.

(56) References Cited

OTHER PUBLICATIONS

Office Action, dated Aug. 29, 2017, from corresponding U.S. Appl. No. 15/619,237.
Office Action, dated Aug. 30, 2017, from corresponding U.S. Appl. No. 15/619,212.
Office Action, dated Aug. 30, 2017, from corresponding U.S. Appl. No. 15/619,382.
Office Action, dated Dec. 15, 2016, from corresponding U.S. Appl. No. 15/256,419.
Office Action, dated Jul. 21, 2017, from corresponding U.S. Appl. No. 15/256,430.
Office Action, dated Mar. 30, 2018, from corresponding U.S. Appl. No. 15/894,890.
Office Action, dated Mar. 30, 2018, from corresponding U.S. Appl. No. 15/896,790.
Office Action, dated May 16, 2018, from corresponding U.S. Appl. No. 15/882,989.
Office Action, dated May 2, 2018, from corresponding U.S. Appl. No. 15/894,809.
Office Action, dated Nov. 1, 2017, from corresponding U.S. Appl. No. 15/169,658.
Office Action, dated Sep. 1, 2017, from corresponding U.S. Appl. No. 15/619,459.
Office Action, dated Sep. 11, 2017, from corresponding U.S. Appl. No. 15/619,375.
Office Action, dated Sep. 11, 2017, from corresponding U.S. Appl. No. 15/619,478.
Office Action, dated Sep. 19, 2017, from corresponding U.S. Appl. No. 15/671,073.
Office Action, dated Sep. 22, 2017, from corresponding U.S. Appl. No. 15/619,278.
Office Action, dated Sep. 5, 2017, from corresponding U.S. Appl. No. 15/619,469.
Office Action, dated Sep. 6, 2017, from corresponding U.S. Appl. No. 15/619,479.
Office Action, dated Sep. 7, 2017, from corresponding U.S. Appl. No. 15/633,703.
Office Action, dated Sep. 8, 2017, from corresponding U.S. Appl. No. 15/619,251.
Petition for Post-Grant Review of related U.S. Pat. No. 9,691,090 dated Mar. 27, 2018.
Pfeifle, Sam, The Privacy Advisor, IAPP and AvePoint Launch New Free PIA Tool, International Association of Privacy Professionals, Mar. 5, 2014.
Pfeifle, Sam, The Privacy Advisor, IAPP Heads to Singapore with APIA Template in Tow, International Association of Privacy Professionals, https://iapp.org/news/a/iapp-heads-to-singapore-with-apia-template_in_tow/, Mar. 28, 2014, p. 1-3.
Restriction Requirement, dated Jan. 18, 2017, from corresponding U.S. Appl. No. 15/256,430.
Restriction Requirement, dated Jul. 28, 2017, from corresponding U.S. Appl. No. 15/169,658.
Restriction Requirement, dated Nov. 21, 2016, from corresponding U.S. Appl. No. 15/254,901.
Schwartz, Edward J., et al, 2010 IEEE Symposium on Security and Privacy: All You Ever Wanted to Know About Dynamic Analysis and forward Symbolic Execution (but might have been afraid to ask), Carnegie Mellon University, IEEE Computer Society, 2010, p. 317-331.
Symantec, Symantex Data Loss Prevention—Discover, monitor, and protect confidential data; 2008; Symantec Corporation; http://www.mssuk.com/images/Symantec%2014552315_IRC_BR_DLP_03.09_sngl.pdf.
TRUSTe Announces General Availability of Assessment Manager for Enterprises to Streamline Data Privacy Management with Automation, PRNewswire, Mar. 4, 2015.
Written Opinion of the International Searching Authority, dated Jun. 6, 2017, from corresponding International Application No. PCT/US2017/025611.

Written Opinion of the International Searching Authority, dated Aug. 15, 2017, from corresponding International Application No. PCT/US2017/036919.
Written Opinion of the International Searching Authority, dated Aug. 21, 2017, from corresponding International Application No. PCT/US2017/036914.
Written Opinion of the International Searching Authority, dated Aug. 29, 2017, from corresponding International Application No. PCT/US2017/036898.
Written Opinion of the International Searching Authority, dated Aug. 8, 2017, from corresponding International Application No. PCT/US2017/036889.
Written Opinion of the International Searching Authority, dated Aug. 8, 2017, from corresponding International Application No. PCT/US2017/036890.
Written Opinion of the International Searching Authority, dated Aug. 8, 2017, from corresponding International Application No. PCT/US2017/036893.
Written Opinion of the International Searching Authority, dated Aug. 8, 2017, from corresponding International Application No. PCT/US2017/036901.
Written Opinion of the International Searching Authority, dated Aug. 8, 2017, from corresponding International Application No. PCT/US2017/036913.
Written Opinion of the International Searching Authority, dated Aug. 8, 2017, from corresponding International Application No. PCT/US2017/036920.
Written Opinion of the International Searching Authority, dated Jun. 21, 2017, from corresponding International Application No. PCT/US2017/025600.
Written Opinion of the International Searching Authority, dated Jun. 6, 2017, from corresponding International Application No. PCT/US2017/025605.
Written Opinion of the International Searching Authority, dated Oct. 12, 2017, from corresponding International Application No. PCT/US2017/036888.
AVEPOINT, Automating Privacy Impact Assessments, AvePoint, Inc.
AVEPOINT, AvePoint Privacy Impact Assessment 1: User Guide, Cumulative Update 2, Revision E, Feb. 2015, AvePoint, Inc.
Enck, William, et al, TaintDroid: An Information-Flow Tracking System for Realtime Privacy Monitoring on Smartphones, ACM Transactions on Computer Systems, vol. 32, No. 2, Article 5, Jun. 2014, p. 5:1-5:29.
Final Office Action, dated Jan. 17, 2018, from corresponding U.S. Appl. No. 15/619,278.
Final Office Action, dated Jan. 23, 2018, from corresponding U.S. Appl. No. 15/619,479.
Final Office Action, dated Nov. 29, 2017, from corresponding U.S. Appl. No. 15/619,237.
Francis, Andre, Business Mathematics and Statistics, South-Western Cengage Learning, 2008, Sixth Edition.
Frikken, Keith B., et al, Yet Another Privacy Metric for Publishing Micro-data, Miami University, Oct. 27, 2008, p. 117-121.
Ghiglieri, Marco et al.; Personal DLP for Facebook, 2014 IEEE International Conference on Pervasive Computing and Communication Workshops (Percom Workshops); IEEE; Mar. 24, 2014; pp. 629-634.
Hunton & Williams LLP, The Role of Risk Management in Data Protection, Privacy Risk Framework and the Risk-based Approach to Privacy, Centre for Information Policy Leadership, Workshop II, Nov. 23, 2014.
IAPP, Daily Dashboard, PIA Tool Stocked With New Templates for DPI, Infosec, International Association of Privacy Professionals, Apr. 22, 2014.
International Search Report, dated Aug. 15, 2017, from corresponding International Application No. PCT/US2017/036919.
International Search Report, dated Aug. 21, 2017, from corresponding International Application No. PCT/US2017/036914.
International Search Report, dated Aug. 29, 2017, from corresponding International Application No. PCT/US2017/036898.
International Search Report, dated Aug. 8, 2017, from corresponding International Application No. PCT/US2017/036889.

(56) References Cited

OTHER PUBLICATIONS

International Search Report, dated Aug. 8, 2017, from corresponding International Application No. PCT/US2017/036890.
International Search Report, dated Aug. 8, 2017, from corresponding International Application No. PCT/US2017/036893.
International Search Report, dated Aug. 8, 2017, from corresponding International Application No. PCT/US2017/036901.
International Search Report, dated Aug. 8, 2017, from corresponding International Application No. PCT/US2017/036913.
International Search Report, dated Aug. 8, 2017, from corresponding International Application No. PCT/US2017/036920.
International Search Report, dated Jun. 21, 2017, from corresponding International Application No. PCT/US2017/025600.
International Search Report, dated Jun. 6, 2017, from corresponding International Application No. PCT/US2017/025605.
International Search Report, dated Jun. 6, 2017, from corresponding International Application No. PCT/US2017/025611.
International Search Report, dated Oct. 12, 2017, from corresponding International Application No. PCT/US2017/036888.
International Search Report, dated Oct. 20, 2017, from corresponding International Application No. PCT/US2017/036917.
International Search Report, dated Oct. 3, 2017, from corresponding International Application No. PCT/US2017/036912.
International Search Report, dated Sep. 1, 2017, from corresponding International Application No. PCT/US2017/036896.
Invitation to Pay Additional Search Fees, dated Aug. 10, 2017, from corresponding International Application No. PCT/US2017/036912.
Invitation to Pay Additional Search Fees, dated Aug. 10, 2017, from corresponding International Application No. PCT/US2017/036917.
Invitation to Pay Additional Search Fees, dated Aug. 24, 2017, from corresponding International Application No. PCT/US2017/036888.
Korba, Larry et al.; "Private Data Discovery for Privacy Compliance in Collaborative Environments"; Cooperative Design, Visualization, and Engineering; Springer Berlin Heidelberg; Sep. 21, 2008; pp. 142-150.
Li, Ninghui, et al, t-Closeness: Privacy Beyond k-Anonymity and l-Diversity, IEEE, 2014, p. 106-115.
Notice of Allowance, dated Apr. 12, 2017, from corresponding U.S. Appl. No. 15/256,419.
Notice of Allowance, dated Apr. 25, 2018, from corresponding U.S. Appl. No. 15/883,041.
Notice of Allowance, dated Aug. 18, 2017, from corresponding U.S. Appl. No. 15/619,455.
Notice of Allowance, dated Dec. 12, 2017, from corresponding U.S. Appl. No. 15/169,643.
Notice of Allowance, dated Dec. 12, 2017, from corresponding U.S. Appl. No. 15/619,212.
Notice of Allowance, dated Dec. 12, 2017, from corresponding U.S. Appl. No. 15/619,382.
Notice of Allowance, dated Dec. 5, 2017, from corresponding U.S. Appl. No. 15/633,703.
Notice of Allowance, dated Dec. 6, 2017, from corresponding U.S. Appl. No. 15/619,451.
Notice of Allowance, dated Dec. 6, 2017, from corresponding U.S. Appl. No. 15/619,459.
Notice of Allowance, dated Jan. 18, 2018, from corresponding U.S. Appl. No. 15/619,478.
Notice of Allowance, dated Jan. 23, 2018, from corresponding U.S. Appl. No. 15/619,251.
Notice of Allowance, dated Jan. 26, 2018, from corresponding U.S. Appl. No. 15/619,469.
Notice of Allowance, dated Jun. 6, 2018, from corresponding U.S. Appl. No. 15/875,570.
Notice of Allowance, dated Mar. 1, 2018, from corresponding U.S. Appl. No. 15/853,674.
Notice of Allowance, dated Mar. 2, 2018, from corresponding U.S. Appl. No. 15/858,802.
Written Opinion of the International Searching Authority, dated Oct. 20, 2017, from corresponding International Application No. PCT/US2017/036917.
Written Opinion of the International Searching Authority, dated Oct. 3, 2017, from corresponding International Application No. PCT/US2017/036912.
Written Opinion of the International Searching Authority, dated Sep. 1, 2017, from corresponding International Application No. PCT/US2017/036896.
www.truste.com (1), 200150207, Internet Archive Wayback Machine, www.archive.org,2_7_2015.
Notice of Allowance, dated Aug. 9, 2018, from corresponding U.S. Appl. No. 15/882,989.
Notice of Allowance, dated Aug. 24, 2018, from corresponding U.S. Appl. No. 15/619,479.
Notice of Allowance, dated Aug. 30, 2018, from corresponding U.S. Appl. No. 15/996,208.
Notice of Allowance, dated Sep. 13, 2018, from corresponding U.S. Appl. No. 15/894,809.
Notice of Allowance, dated Sep. 13, 2018, from corresponding U.S. Appl. No. 15/894,890.
Notice of Allowance, dated Sep. 18, 2018, from corresponding U.S. Appl. No. 15/894,819.
Notice of Allowance, dated Sep. 18, 2018, from corresponding U.S. Appl. No. 16/041,545.
Notice of Allowance, dated Sep. 28, 2018, from corresponding U.S. Appl. No. 16/041,520.
Acar, Gunes, et al, The Web Never Forgets, Computer and Communications Security, ACM, Nov. 3, 2014, pp. 674-689.
Falahrastegar, Marjan, et al, Tracking Personal Identifiers Across the Web, Medical Image Computing and Computer-Assisted Intervention—Miccai 2015, 18th International Conference, Oct. 5, 2015, Munich, Germany.
International Search Report, dated Sep. 12, 2018, from corresponding International Application No. PCT/US2018/037504.
Written Opinion of the International Searching Authority, dated Sep. 12, 2018, from corresponding International Application No. PCT/US2018/037504.
Hacigümüs, Hakan, et al, Executing SGL over Encrypted Data in the Database-Service-Provider Model, ACM, Jun. 4, 2002, pp. 216-227.
Krol, Kat, et al, Control versus Effort in Privacy Warnings for Webforms, ACM, Oct. 24, 2016, pp. 13-23.
Office Action, dated Oct. 10, 2018, from corresponding U.S. Appl. No. 16/041,563.
Office Action, dated Oct. 10, 2018, from corresponding U.S. Appl. No. 16/055,083.
Office Action, dated Oct. 10, 2018, from corresponding U.S. Appl. No. 16/055,944.
Office Action, dated Oct. 15, 2018, from corresponding U.S. Appl. No. 16/054,780.
International Search Report, dated Oct. 11, 2018, from corresponding International Application No. PCT/US2018/045240.
International Search Report, dated Oct. 11, 2018, from corresponding International Application No. PCT/US2018/043975.
International Search Report, dated Oct. 11, 2018, from corresponding International Application No. PCT/US2018/043977.
Notice of Allowance, dated Oct. 17, 2018, from corresponding U.S. Appl. No. 15/896,790.
Decision Regarding Institution of Post-Grant Review in Case PGR2018-00056 for U.S. Pat. No. 9,691,090 B1, Oct. 11, 2018.
Notice of Allowance, dated Oct. 17, 2018, from corresponding U.S. Appl. No. 16/054,672.
Restriction Requirement, dated Oct. 17, 2018, from corresponding U.S. Appl. No. 15/055,984.
Written Opinion of the International Searching Authority, dated Oct. 11, 2018, from corresponding International Application No. PCT/US2018/043975.
Written Opinion of the International Searching Authority, dated Oct. 11, 2018, from corresponding International Application No. PCT/US2018/043977.
Written Opinion of the International Searching Authority, dated Oct. 11, 2018, from corresponding International Application No. PCT/US2018/045240.
International Search Report, dated Oct. 11, 2018, from corresponding International Application No. PCT/US2018/043976.

(56) References Cited

OTHER PUBLICATIONS

Written Opinion of the International Searching Authority, dated Oct. 11, 2018, from corresponding International Application No. PCT/US2018/043976.
International Search Report, dated Oct. 16, 2018, from corresponding International PCT/US2018/045243.
Written Opinion of the International Searching Authority, dated Oct. 16, 2018, from corresponding International Application No. PCT/US2018/045243.
International Search Report, dated Oct. 11, 2018, from corresponding International Application No. PCT/US2018/044026.
Office Action, dated Oct. 23, 2018, from corresponding U.S. Appl. No. 16/055,961.
Written Opinion of the International Searching Authority, dated Oct. 11, 2018, from corresponding International Application No. PCT/US2018/044026.
International Search Report, dated Oct. 18, 2018, from corresponding International Application No. PCT/US2018/045249.
Written Opinion of the International Searching Authority, dated Oct. 18, 2018, from corresponding International Application No. PCT/US2018/045249.
International Search Report, dated Oct. 12, 2018, from corresponding International Application No. PCT/US2018/044046.
Office Action, dated Oct. 26, 2018, from corresponding U.S. Appl. No. 16/041,468.
Written Opinion of the International Searching Authority, dated Oct. 12, 2018, from corresponding International Application No. PCT/US2018/044046.
Notice of Allowance, dated Nov. 8, 2018, from corresponding U.S. Appl. No. 16/042,642.
Aghasian, Erfan, et al, Scoring Users' Privacy Disclosure Across Multiple Online Social Networks,IEEE Access, Multidisciplinary Rapid Review Open Access Journal, Jul. 31, 2017, vol. 5, 2017.
Invitation to Pay Additional Search Fees, dated Oct. 23, 2018, from corresponding International Application No. PCT/US2018/045296.
Liu, Kun, et al, A Framework for Computing the Privacy Scores of Users in Online Social Networks, ACM Transactions on Knowledge Discovery from Data, vol. 5, No. 1, Article 6, Dec. 2010, 30 pages.
Srivastava, Agrima, et al, Measuring Privacy Leaks in Online Social Networks, International Conference on Advances in Computing, Communications and Informatics (ICACCI), 2013.
Notice of Allowance, dated Nov. 2, 2018, from corresponding U.S. Appl. No. 16/054,762.

\* cited by examiner

Privacy Portal

Personal Information Inventory
Internet usage history — 1100

① Description  ② What is collected?  ③ From Who?  ④ Where is it stored?  ⑤ Who has access?

? Get Help    ○ Comment    👥 Add Collaborators

Who is it collected from? — 1105

What is the individuals role?   [Employee] [Customer] [Other]

Prospect or Current?    [Prospect] [Current] [Not Sure]

How is consent given?   [EULA] [Opt-In Prompt] [Implied Consent]

Could the individual be a minor/child?   [Always a Minor] [Never a Minor] [Age not Known] [Not Sure]

Where are the individuals located?   [Anywhere we have customers] [Anywhere globally] [Specific location]

*Deadline to complete: January 10th, 2016 (3 working days away)*

[Save and Continue to Next Section]  [Close]    Discard Changes

Personal Information Inventory

| | Risk | Data Flow Summary | Status | Source | Destination | Access | Audit |
|---|---|---|---|---|---|---|---|
| ☐ | ▽ | Internet Usage History | Pending Review | Customers | Acme DC | 4 Transfers | ? Pending |
| ☐ | ▽ | Customer Payment Info | Approved | Customers | Savvis | 8 Transfers | ✓ 140 days |
| ☐ | ▽ | Call History Log | Audit Needed | Customers | ROOT | 3 Transfers | ⊗ Expired |
| ☐ | ▽ | Cellular Roaming Records | Approved | Customers | Savvis | 3 Transfers | ✓ 360 days |
| ☐ | ▽ | New Service Installation | Approved | Customers | Acme DC | 9 Transfers | ✓ 205 days |
| ☐ | ▽ | Collections Records | Approved | Customers | Acme DC | 6 Transfers | ✓ 160 days |
| ☐ | ▽ | Giveaways Signup | Pending Review | Customers | Zendesk | 3 Transfers | ? Pending |
| ☐ | ▽ | Customer Billing Records | Approved | Customers | Acme DC | 2 Transfers | ✓ OK |
| ☐ | ▽ | Services Subscriptions | Approved | Customers | Acme DC | 2 Transfers | ✓ OK |
| ☐ | ▽ | Complaint History Records | Action Required | Customers | Zendesk | 2 Transfers | ⊗ 3 days |
| ☐ | ▽ | Customer Credit Records | Approved | Customers | Acme DC | 6 Transfers | ✓ OK |
| ☐ | ▽ | Customer Support/Chat Session | Approved | Customers | Zendesk | 3 Transfers | ✓ OK |
| ☐ | ▽ | Employee Reference Checks | Approved | Employees | Savvis | 7 Transfers | ✓ OK |

FIG. 15

Edit data flow: Internet Usage History

Data Flow Info

Data Flow Name*  [Internet Usage History]

Description  [Data flow involved with tracking internet usage.]

Business Group  [Internet ▼]

Business Rep  [Me] [Someone Else] [Jeff Hill (jeffhill@acme.com)]

Data Collection

| Contact Info | Financial/Billing Info | Online Identifiers | Personal Details |
|---|---|---|---|
| ☐ Account Holder Name | ☐ Credit Card Num | ☑ IP Address | ☐ Birthdate |
| ☐ Other Individual Name | ☐ Billing Address | ☐ Device Type | ☐ Credit Score |

[Save Changes] Cancel

DATA PROCESSING SYSTEMS AND COMMUNICATIONS SYSTEMS AND METHODS FOR INTEGRATING PRIVACY COMPLIANCE SYSTEMS WITH SOFTWARE DEVELOPMENT AND AGILE TOOLS FOR PRIVACY DESIGN

CROSS-REFERENCE TO RELATED APPLICATIONS

This application is a continuation-in-part of U.S. patent application Ser. No. 15/853,674, filed Dec. 22, 2017, which is a continuation-in-part of U.S. patent application Ser. No. 15/619,455, filed Jun. 10, 2017, which is a continuation-in-part of Ser. No. 15/254,901, filed Sep. 1, 2016; which claims priority from: (1) U.S. Provisional Patent Application Ser. No. 62/360,123, filed Jul. 8, 2016; (2) U.S. Provisional Patent Application Ser. No. 62/353,802, filed Jun. 23, 2016; (3) U.S. Provisional Patent Application Ser. No. 62/348,695, filed Jun. 10, 2016. This application also claims priority from U.S. Provisional Patent Application Ser. No. 62/541,613, filed Aug. 4, 2017. The disclosures of all of the above patent applications are hereby incorporated herein by reference in their entirety.

TECHNICAL FIELD

This disclosure relates to a data processing system and methods for retrieving data regarding a plurality of privacy campaigns, and for using that data to assess a relative risk associated with the data privacy campaign, provide an audit schedule for each campaign, and electronically display campaign information.

BACKGROUND

Over the past years, privacy and security policies, and related operations have become increasingly important. Breaches in security, leading to the unauthorized access of personal data (which may include sensitive personal data) have become more frequent among companies and other organizations of all sizes. Such personal data may include, but is not limited to, personally identifiable information (PII), which may be information that directly (or indirectly) identifies an individual or entity. Examples of PII include names, addresses, dates of birth, social security numbers, and biometric identifiers such as a person's fingerprints or picture. Other personal data may include, for example, customers' Internet browsing habits, purchase history, or even their preferences (e.g., likes and dislikes, as provided or obtained through social media).

Many organizations that obtain, use, and transfer personal data, including sensitive personal data, have begun to address these privacy and security issues. To manage personal data, many companies have attempted to implement operational policies and processes that comply with legal requirements, such as Canada's Personal Information Protection and Electronic Documents Act (PIPEDA) or the U.S.'s Health Insurance Portability and Accountability Act (HIPPA) protecting a patient's medical information. Many regulators recommend conducting privacy impact assessments, or data protection risk assessments along with data inventory mapping. For example, the GDPR requires data protection impact assessments. Additionally, the United Kingdom ICO's office provides guidance around privacy impact assessments. The OPC in Canada recommends certain personal information inventory practices, and the Singapore PDPA specifically mentions personal data inventory mapping.

In implementing these privacy impact assessments, an individual may provide incomplete or incorrect information regarding personal data to be collected, for example, by new software, a new device, or a new business effort, for example, to avoid being prevented from collecting that personal data, or to avoid being subject to more frequent or more detailed privacy audits. In light of the above, there is currently a need for improved systems and methods for monitoring compliance with corporate privacy policies and applicable privacy laws in order to reduce a likelihood that an individual will successfully "game the system" by providing incomplete or incorrect information regarding current or future uses of personal data.

SUMMARY

A computer-implemented data processing method for monitoring one or more user inputs while a user provides one or more responses to one or more questions in a computerized privacy questionnaire, according to various embodiments, comprises: (A) actively monitoring, by one or more processors, one or more system inputs from the user, the one or more system inputs comprising one or more submitted inputs and one or more unsubmitted inputs; (B) storing, in computer memory, by one or more processors, an electronic record of the one or more system inputs; (C) analyzing, by one or more processors, the one or more submitted inputs and one or more unsubmitted inputs to determine one or more changes to the one or more responses prior to submission, by the user, of the one or more responses; (D) determining, by one or more processors, based at least in part on the one or more inputs and the one or more changes to the one or more responses, whether the user has provided one or more responses comprising one or more abnormal responses; and (E) at least partially in response to determining that the user has provided one or more abnormal responses, automatically flagging the one or more questions in memory.

A computer-implemented data processing method for monitoring a user as the user provides one or more responses to one or more questions in a computerized privacy questionnaire, in various embodiments, comprises: (A) actively monitoring, by one or more processors, (i) a user context of the user as the user provides the one or more responses to the one or more questions in the computerized privacy questionnaire and (ii) one or more system inputs from the user as the user provides the one or more responses and the one or more system inputs comprising one or more submitted inputs and one or more unsubmitted inputs; (B) storing, in computer memory, by one or more processors, an electronic record of user context of the user and the one or more system inputs from the user; (C) analyzing, by one or more processors, at least one selected from a group consisting of (i) the user context and (ii) the one or more system inputs from the user to determine whether user abnormal behavior occurred in providing the one or more responses; and (D) at least partially in response to determining that user abnormal behavior occurred in providing the one or more responses, automatically flagging at least a portion of the computerized privacy questionnaire in memory.

A computer-implemented data processing method for monitoring a user as the user provides one or more responses to one or more questions in a computerized privacy questionnaire, in various embodiments, comprises: (A) actively monitoring, by one or more processors, a user context of the user as the user provides the one or more responses to the one or more questions in a computerized privacy questionnaire, wherein the user context includes at least one user factor selected from a group consisting of: (i) an amount of time the user takes to complete the computerized privacy questionnaire, (ii) a deadline associated with the computerized privacy questionnaire, (iii) a location of the user as the user conducts the computerized privacy questionnaire, and (iv) one or more electronic activities associated with an electronic device on which the user is responding to the computerized privacy questionnaire; (B) storing, in computer memory, by one or more processors, an electronic record of user context of the user; (C) analyzing, by one or more processors, the user context, based at least in part on the at least one user factor, to determine whether user abnormal behavior occurred in providing the one or more responses; and (D) at least partially in response to determining that user abnormal behavior occurred in providing the one or more responses, automatically flagging at least a portion of the computerized privacy questionnaire in memory.

The details of one or more embodiments of the subject matter described in this specification are set forth in the accompanying drawings and the description below. Other features, aspects, and advantages of the subject matter may become apparent from the description, the drawings, and the claims.

BRIEF DESCRIPTION OF THE DRAWINGS

Various embodiments of a system and method for operationalizing privacy compliance and assessing risk of privacy campaigns are described below. In the course of this description, reference will be made to the accompanying drawings, which are not necessarily drawn to scale, and wherein:

FIG. 8 is an example of a graphical user interface (GUI) showing a dialog that allows for the entry of description information related to a privacy campaign.

FIG. 9 is an example of a notification, generated by the system, informing a business representative (e.g., owner) that they have been assigned to a particular privacy campaign.

FIG. 10 is an example of a GUI showing a dialog allowing entry of the type of personal data that is being collected for a campaign.

FIG. 11 is an example of a GUI that shows a dialog that allows collection of campaign data regarding the subject from which personal data was collected.

FIG. 12 is an example of a GUI that shows a dialog for inputting information regarding where the personal data related to a campaign is stored.

FIG. 13 is an example of a GUI that shows information regarding the access of personal data related to a campaign.

FIG. 14 is an example of an instant messaging session overlaid on top of a GUI, wherein the GUI contains prompts for the entry or selection of campaign data.

FIG. 15 is an example of a GUI showing an inventory page.

FIG. 17 is an example of a GUI showing a web page that allows editing of campaign data.

DETAILED DESCRIPTION

Figure 1:
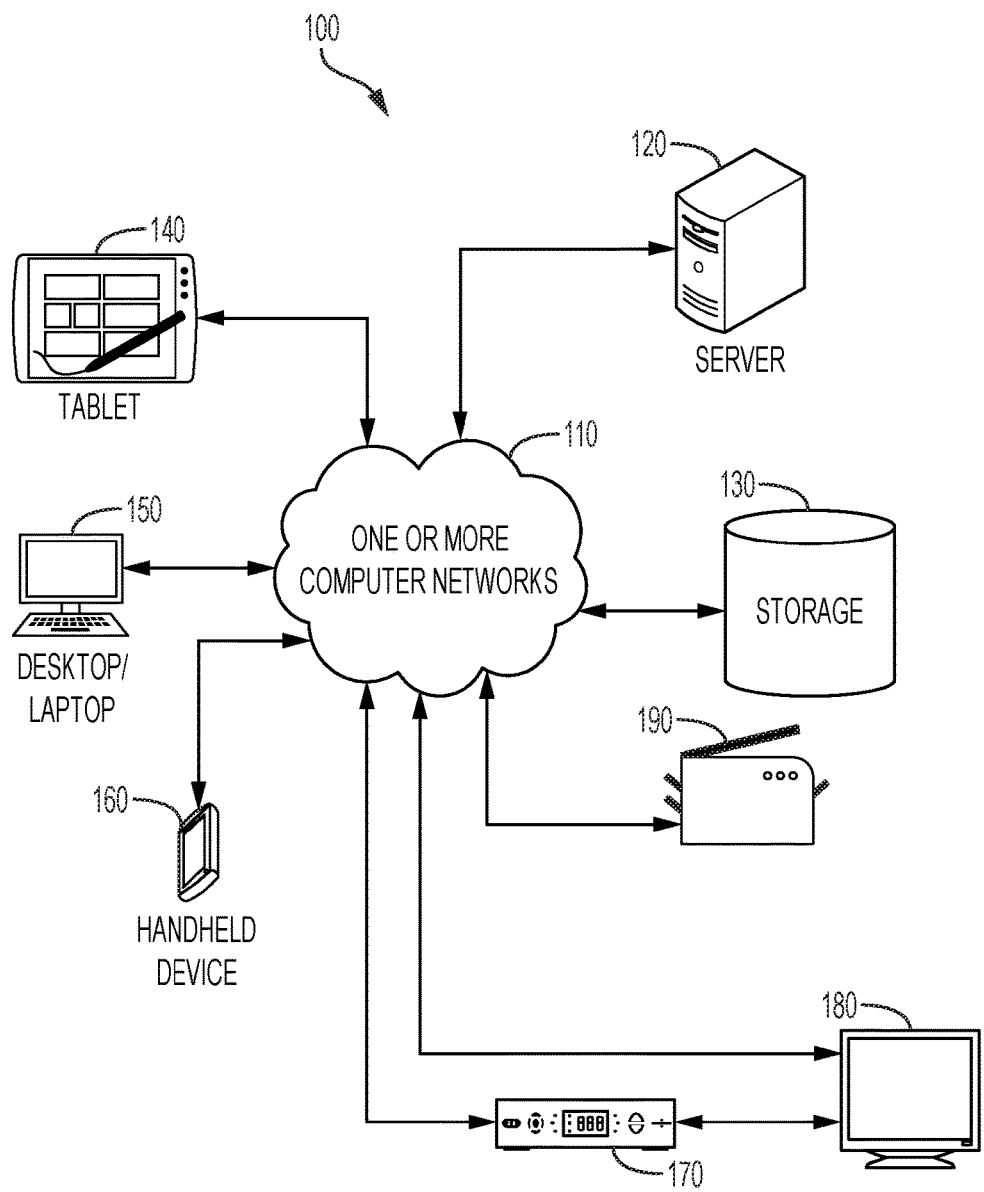
FIG. 1 is a diagram illustrating an exemplary network environment in which the present systems and methods for operationalizing privacy compliance may operate.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

According to exemplary embodiments, a system for operationalizing privacy compliance is described herein. The system may be comprised of one or more servers and client computing devices that execute software modules that facilitate various functions.

A Main Privacy Compliance Module is operable to allow a user to initiate the creation of a privacy campaign (i.e., a business function, system, product, technology, process, project, engagement, initiative, campaign, etc., that may utilize personal data collected from one or more persons or entities). The personal data may contain PII that may be sensitive personal data. The user can input information such as the name and description of the campaign. The user may also select whether he/she will take ownership of the campaign (i.e., be responsible for providing the information needed to create the campaign and oversee the conducting of privacy audits related to the campaign), or assign the campaign to one or more other persons. The Main Privacy Compliance Module can generate a sequence or serious of GUI windows that facilitate the entry of campaign data representative of attributes related to the privacy campaign (e.g., attributes that might relate to the description of the personal data, what personal data is collected, whom the data is collected from, the storage of the data, and access to that data).

Based on the information input, a Risk Assessment Module may be operable to take into account Weighting Factors and Relative Risk Ratings associated with the campaign in order to calculate a numerical Risk Level associated with the campaign, as well as an Overall Risk Assessment for the campaign (i.e., low-risk, medium risk, or high risk). The Risk Level may be indicative of the likelihood of a breach involving personal data related to the campaign being compromised (i.e., lost, stolen, accessed without authorization, inadvertently disclosed, maliciously disclosed, etc.). An inventory page can visually depict the Risk Level for one or more privacy campaigns.

After the Risk Assessment Module has determined a Risk Level for a campaign, a Privacy Audit Module may be operable to use the Risk Level to determine an audit schedule for the campaign. The audit schedule may be editable, and the Privacy Audit Module also facilitates the privacy audit process by sending alerts when a privacy audit is impending, or sending alerts when a privacy audit is overdue.

The system may also include a Data Flow Diagram Module for generating a data flow diagram associated with a campaign. An exemplary data flow diagram displays one or more shapes representing the source from which data associated with the campaign is derived, the destination (or location) of that data, and which departments or software systems may have access to the data. The Data Flow Diagram Module may also generate one or more security indicators for display. The indicators may include, for example, an "eye" icon to indicate that the data is confidential, a "lock" icon to indicate that the data, and/or a particular flow of data, is encrypted, or an "unlocked lock" icon to indicate that the data, and/or a particular flow of data, is not encrypted. Data flow lines may be colored differently to indicate whether the data flow is encrypted or unencrypted.

The system also provides for a Communications Module that facilitates the creation and transmission of notifications and alerts (e.g., via email). The Communications Module may also instantiate an instant messaging session and overlay the instant messaging session over one or more portions of a GUI in which a user is presented with prompts to enter or select information.

Exemplary Technical Platforms

As will be appreciated by one skilled in the relevant field, a system for operationalizing privacy compliance and assessing risk of privacy campaigns may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web, mobile, wearable computer-implemented, computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems) and computer program products. It should be understood that each step of the block diagrams and flowchart illustrations, and combinations of steps in the block diagrams and flowchart illustrations, respectively, may be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart step or steps These computer program instructions may also be stored in a computer-readable memory that may direct a computer or other programmable data processing apparatus to function in a particular manner such that the instructions stored in the computer-readable memory produce an article of manufacture that is configured for implementing the function specified in the flowchart step or steps. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart step or steps.

Accordingly, steps of the block diagrams and flowchart illustrations support combinations of mechanisms for performing the specified functions, combinations of steps for performing the specified functions, and program instructions for performing the specified functions. It should also be understood that each step of the block diagrams and flowchart illustrations, and combinations of steps in the block diagrams and flowchart illustrations, may be implemented by special purpose hardware-based computer systems that perform the specified functions or steps, or combinations of special purpose hardware and other hardware executing appropriate computer instructions.

Example System Architecture

FIG. 1 is a block diagram of a System 100 according to a particular embodiment. As may be understood from this figure, the System 100 includes one or more computer networks 110, a Server 120, a Storage Device 130 (which may contain one or more databases of information), one or more remote client computing devices such as a tablet computer 140, a desktop or laptop computer 150, or a handheld computing device 160, such as a cellular phone, browser and Internet capable set-top boxes 170 connected with a TV 180, or even smart TVs 180 having browser and Internet capability. The client computing devices attached to the network may also include copiers/printers 190 having hard drives (a security risk since copies/prints may be stored on these hard drives). The Server 120, client computing devices, and Storage Device 130 may be physically located in a central location, such as the headquarters of the organization, for example, or in separate facilities. The devices may be owned or maintained by employees, contractors, or other third parties (e.g., a cloud service provider). In particular embodiments, the one or more computer networks 115 facilitate communication between the Server 120, one or more client computing devices 140, 150, 160, 170, 180, 190, and Storage Device 130.

The one or more computer networks 115 may include any of a variety of types of wired or wireless computer networks such as the Internet, a private intranet, a public switched telephone network (PSTN), or any other type of network. The communication link between the Server 120, one or more client computing devices 140, 150, 160, 170, 180, 190, and Storage Device 130 may be, for example, implemented via a Local Area Network (LAN) or via the Internet.

Example Computer Architecture Used within the System

Figure 2:
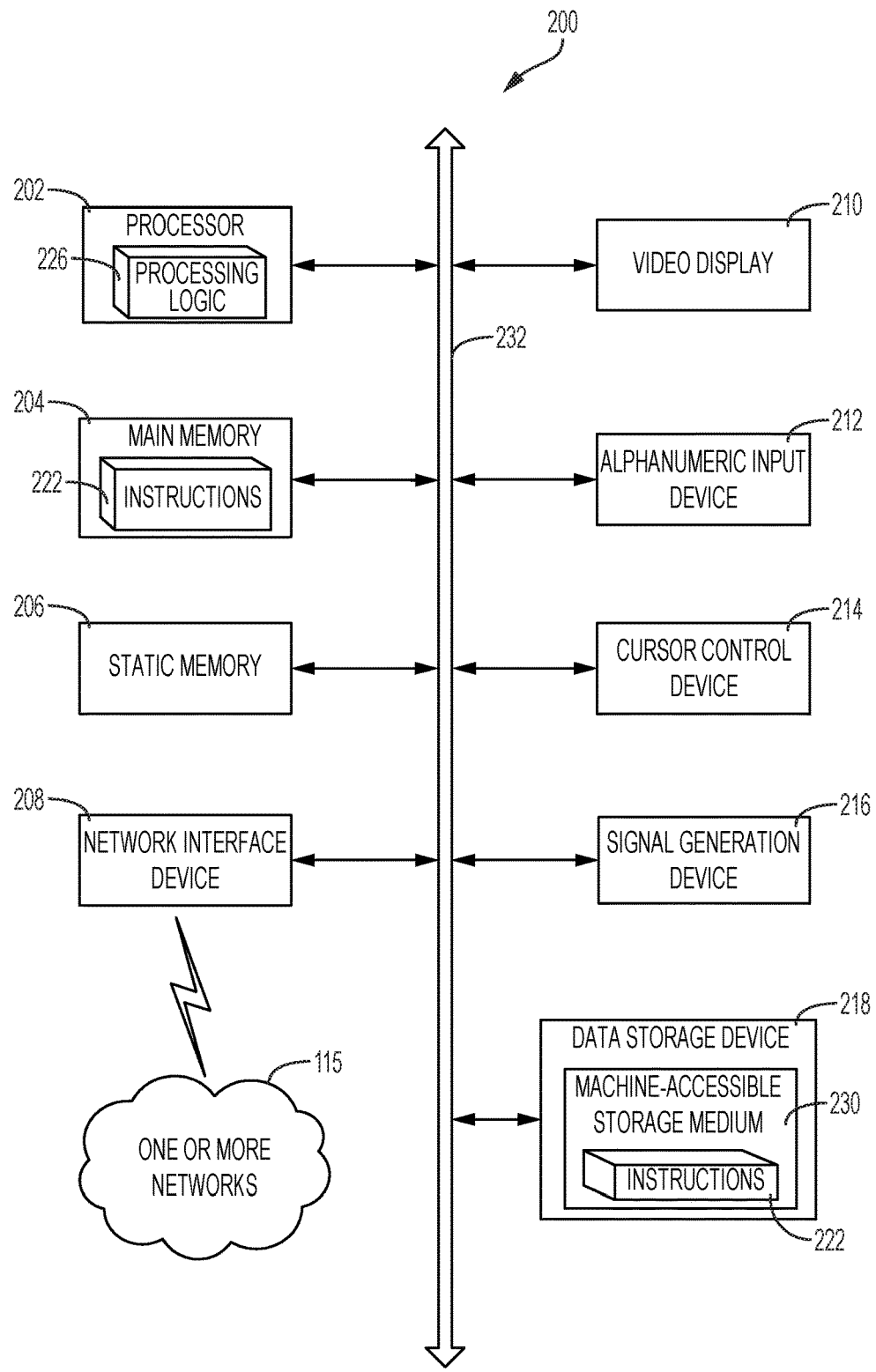
FIG. 2 is a schematic diagram of a computer (such as the server 120, or user device 140, 150, 160, 170, 180, 190) that is suitable for use in various embodiments.

FIG. 2 illustrates a diagrammatic representation of the architecture of a computer 200 that may be used within the System 100, for example, as a client computer (e.g., one of computing devices 140, 150, 160, 170, 180, 190, shown in FIG. 1), or as a server computer (e.g., Server 120 shown in FIG. 1). In exemplary embodiments, the computer 200 may be suitable for use as a computer within the context of the System 100 that is configured to operationalize privacy compliance and assess risk of privacy campaigns. In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The computer 200 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 200 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker). The data storage device 218 may include a non-transitory computer-readable storage medium 230 (also known as a non-transitory computer-readable storage medium or a non-transitory computer-readable medium) on which is stored one or more sets of instructions 222 (e.g., software, software modules) embodying any one or more of the methodologies or functions described herein. The software 222 may also reside, completely or at least partially, within main memory 204 and/or within processing device 202 during execution thereof by computer 200—main memory 204 and processing device 202 also constituting computer-accessible storage media. The software 222 may further be transmitted or received over a network 220 via network interface device 208.

While the computer-readable storage medium 230 is shown in an exemplary embodiment to be a single medium, the terms "computer-readable storage medium" and "machine-accessible storage medium" should be understood to include a single medium or multiple media (e.g., a centralized or distributed database, and/or associated caches and servers) that store the one or more sets of instructions. The term "computer-readable storage medium" should also be understood to include any medium that is capable of storing, encoding or carrying a set of instructions for execution by the computer and that cause the computer to perform any one or more of the methodologies of the present invention. The term "computer-readable storage medium" should accordingly be understood to include, but not be limited to, solid-state memories, optical and magnetic media, etc.

Exemplary System Platform

According to various embodiments, the processes and logic flows described in this specification may be performed by a system (e.g., System 100) that includes, but is not limited to, one or more programmable processors (e.g., processor 202) executing one or more computer program modules to perform functions by operating on input data and generating output, thereby tying the process to a particular machine (e.g., a machine programmed to perform the processes described herein). This includes processors located in one or more of client computers (e.g., client computers 140, 150, 160, 170, 180, 190 of FIG. 1). These devices connected to network 110 may access and execute one or more Internet browser-based program modules that are "served up" through the network 110 by one or more servers (e.g., server 120 of FIG. 1), and the data associated with the program may be stored on a one or more storage devices, which may reside within a server or computing device (e.g., Main Memory 204, Static Memory 206), be attached as a peripheral storage device to the one or more servers or computing devices, or attached to the network (e.g., Storage 130).

The System 100 facilitates the acquisition, storage, maintenance, use, and retention of campaign data associated with a plurality of privacy campaigns within an organization. In doing so, various aspects of the System 100 initiates and creates a plurality of individual data privacy campaign records that are associated with a variety of privacy-related attributes and assessment related meta-data for each campaign. These data elements may include: the subjects of the sensitive information, the respective person or entity responsible for each campaign (e.g., the campaign's "owner"), the location where the personal data will be stored, the entity or entities that will access the data, the parameters according to which the personal data will be used and retained, the Risk Level associated with a particular campaign (as well as assessments from which the Risk Level is calculated), an audit schedule, and other attributes and meta-data. The System 100 may also be adapted to facilitate the setup and auditing of each privacy campaign. These modules may include, for example, a Main Privacy Compliance Module, a Risk Assessment Module, a Privacy Audit Module, a Data Flow Diagram Module, a Communications Module (examples of which are described below), a Privacy Assessment Monitoring Module, and a Privacy Assessment Modification Module. It is to be understood that these are examples of modules of various embodiments, but the functionalities performed by each module as described may be performed by more (or less) modules. Further, the functionalities described as being performed by one module may be performed by one or more other modules.

A. Example Elements Related to Privacy Campaigns

Figure 3:
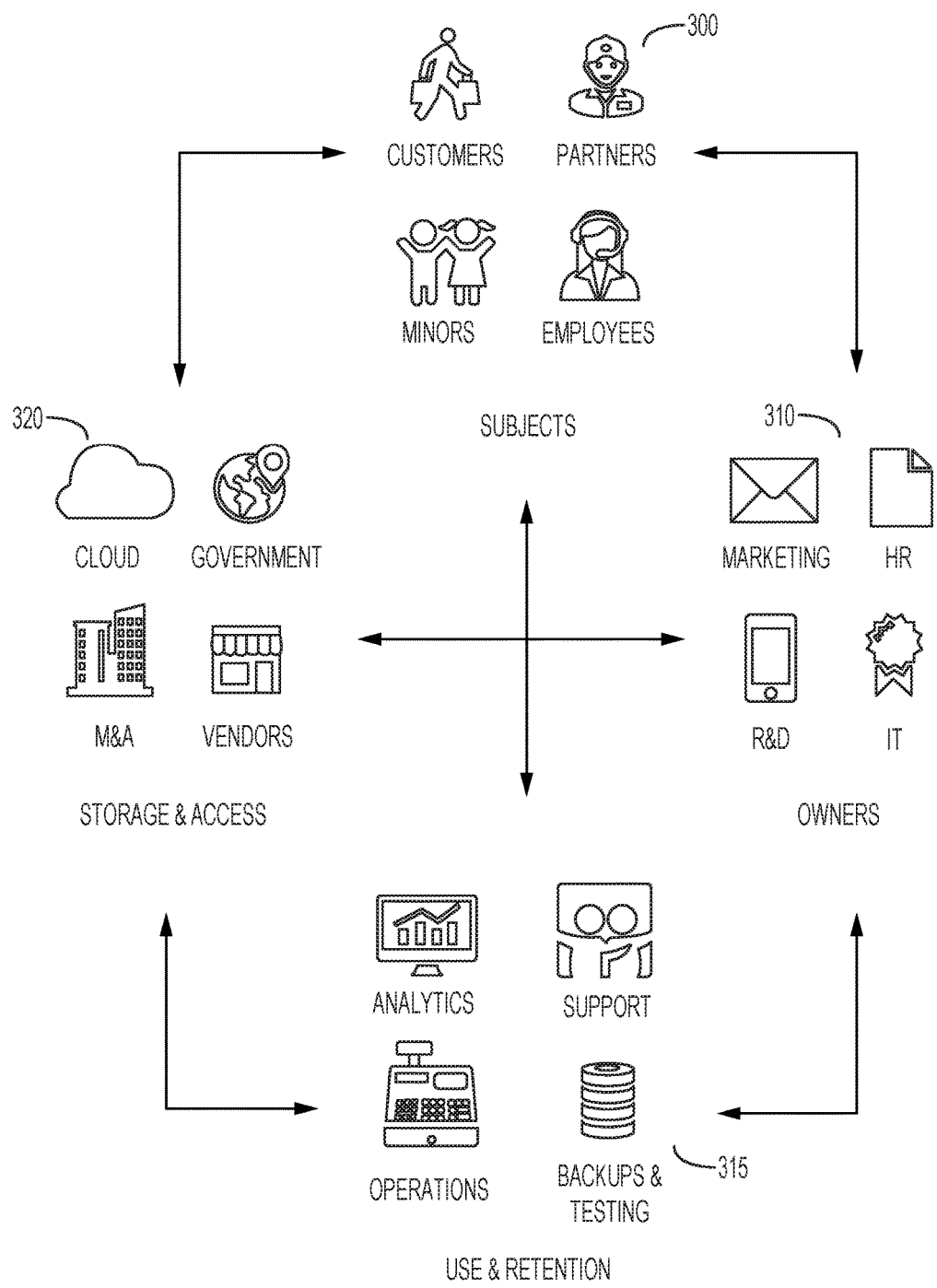
FIG. 3 is a diagram illustrating an example of the elements (e.g., subjects, owner, etc.) that may be involved in privacy compliance.

FIG. 3 provides a high-level visual overview of example "subjects" for particular data privacy campaigns, exemplary campaign "owners," various elements related to the storage and access of personal data, and elements related to the use and retention of the personal data. Each of these elements may, in various embodiments, be accounted for by the System 100 as it facilitates the implementation of an organization's privacy compliance policy.

As may be understood from FIG. 3, sensitive information may be collected by an organization from one or more subjects 300. Subjects may include customers whose information has been obtained by the organization. For example, if the organization is selling goods to a customer, the organization may have been provided with a customer's credit card or banking information (e.g., account number, bank routing number), social security number, or other sensitive information.

An organization may also possess personal data originating from one or more of its business partners. Examples of business partners are vendors that may be data controllers or data processors (which have different legal obligations under EU data protection laws). Vendors may supply a component or raw material to the organization, or an outside contractor responsible for the marketing or legal work of the organization. The personal data acquired from the partner may be that of the partners, or even that of other entities collected by the partners. For example, a marketing agency may collect personal data on behalf of the organization, and transfer that information to the organization. Moreover, the organization may share personal data with one of its partners. For example, the organization may provide a marketing agency with the personal data of its customers so that it may conduct further research.

Other subjects 300 include the organization's own employees. Organizations with employees often collect personal data from their employees, including address and social security information, usually for payroll purposes, or even prior to employment, for conducting credit checks. The subjects 300 may also include minors. It is noted that various corporate privacy policies or privacy laws may require that organizations take additional steps to protect the sensitive privacy of minors.

Still referring to FIG. 3, within an organization, a particular individual (or groups of individuals) may be designated to be an "owner" of a particular campaign to obtain and manage personal data. These owners 310 may have any suitable role within the organization. In various embodiments, an owner of a particular campaign will have primary responsibility for the campaign, and will serve as a resident expert regarding the personal data obtained through the campaign, and the way that the data is obtained, stored, and accessed. As shown in FIG. 3, an owner may be a member of any suitable department, including the organization's marketing, HR, R&D, or IT department. As will be described below, in exemplary embodiments, the owner can always be changed, and owners can sub-assign other owners (and other collaborators) to individual sections of campaign data input and operations.

Referring still to FIG. 3, the system may be configured to account for the use and retention 315 of personal data obtained in each particular campaign. The use and retention of personal data may include how the data is analyzed and used within the organization's operations, whether the data is backed up, and which parties within the organization are supporting the campaign.

The system may also be configured to help manage the storage and access 320 of personal data. As shown in FIG. 3, a variety of different parties may access the data, and the data may be stored in any of a variety of different locations, including on-site, or in "the cloud", i.e., on remote servers that are accessed via the Internet or other suitable network.

B. Main Compliance Module

Figure 4:
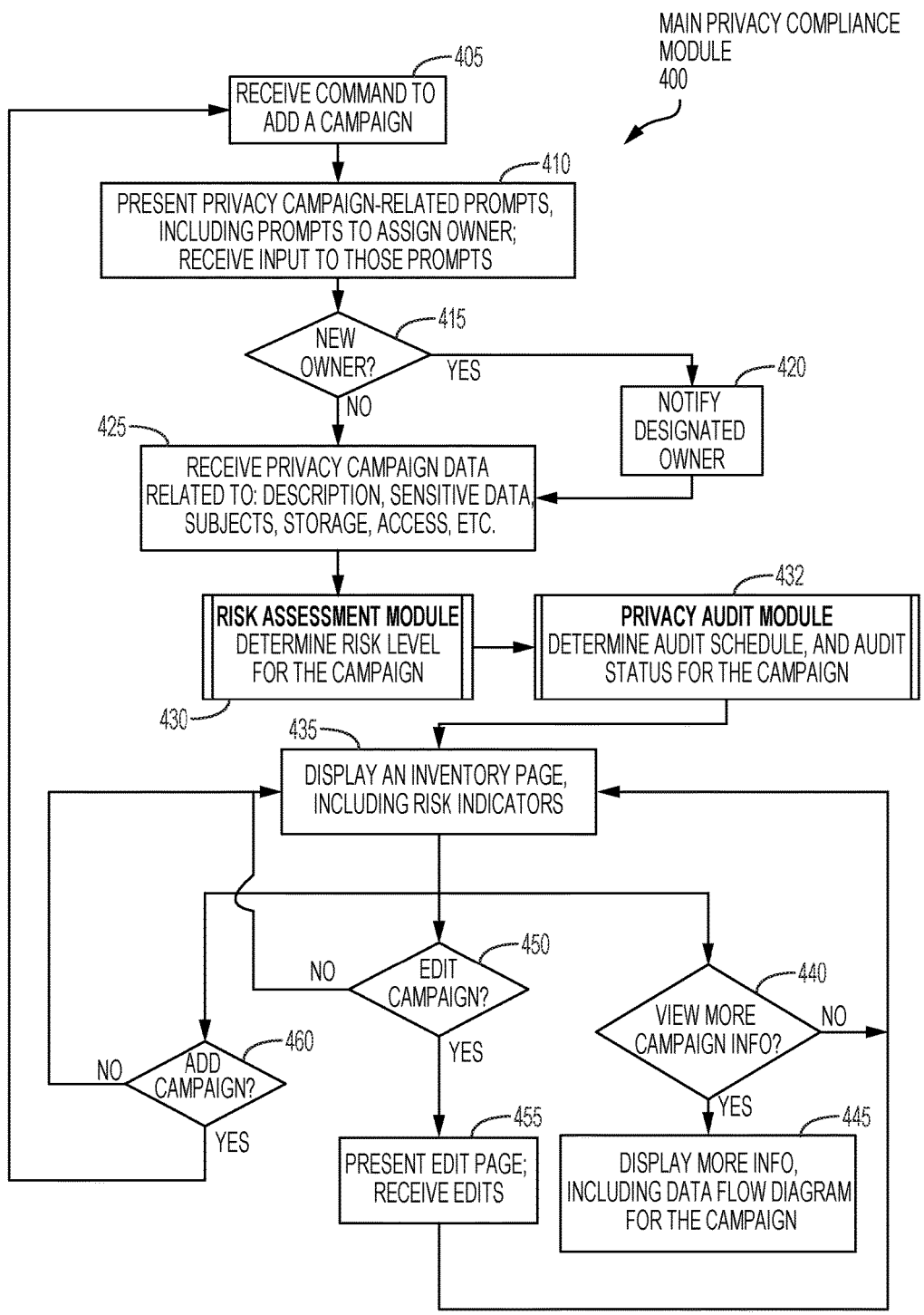
FIG. 4 is a flow chart showing an example of a process performed by the Main Privacy Compliance Module.

FIG. 4 illustrates an exemplary process for operationalizing privacy compliance. Main Privacy Compliance Module 400, which may be executed by one or more computing devices of System 100, may perform this process. In exemplary embodiments, a server (e.g., server 140) in conjunction with a client computing device having a browser, execute the Main Privacy Compliance Module (e.g., computing devices 140, 150, 160, 170, 180, 190) through a network (network 110). In various exemplary embodiments, the Main Privacy Compliance Module 400 may call upon other modules to perform certain functions. In exemplary embodiments, the software may also be organized as a single module to perform various computer executable routines.

I. Adding a Campaign

The process 400 may begin at step 405, wherein the Main Privacy Compliance Module 400 of the System 100 receives a command to add a privacy campaign. In exemplary embodiments, the user selects an on-screen button (e.g., the Add Data Flow button 1555 of FIG. 15) that the Main Privacy Compliance Module 400 displays on a landing page, which may be displayed in a graphical user interface (GUI), such as a window, dialog box, or the like. The landing page may be, for example, the inventory page 1500 below. The inventory page 1500 may display a list of one or more privacy campaigns that have already been input into the System 100. As mentioned above, a privacy campaign may represent, for example, a business operation that the organization is engaged in, or some business record, that may require the use of personal data, which may include the personal data of a customer or some other entity. Examples of campaigns might include, for example, Internet Usage History, Customer Payment Information, Call History Log, Cellular Roaming Records, etc. For the campaign "Internet Usage History," a marketing department may need customers' on-line browsing patterns to run analytics. This might entail retrieving and storing customers' IP addresses, MAC address, URL history, subscriber ID, and other information that may be considered personal data (and even sensitive personal data). As will be described herein, the System 100, through the use of one or more modules, including the Main Privacy Campaign Module 400, creates a record for each campaign. Data elements of campaign data may be associated with each campaign record that represents attributes such as: the type of personal data associated with the campaign; the subjects having access to the personal data; the person or persons within the company that take ownership (e.g., business owner) for ensuring privacy compliance for the personal data associated with each campaign; the location of the personal data; the entities having access to the data; the various computer systems and software applications that use the personal data; and the Risk Level (see below) associated with the campaign.

II. Entry of Privacy Campaign Related Information, Including Owner

At step 410, in response to the receipt of the user's command to add a privacy campaign record, the Main Privacy Compliance Module 400 initiates a routine to create an electronic record for a privacy campaign, and a routine for the entry data inputs of information related to the privacy campaign. The Main Privacy Compliance Module 400 may generate one or more graphical user interfaces (e.g., windows, dialog pages, etc.), which may be presented one GUI at a time. Each GUI may show prompts, editable entry fields, check boxes, radial selectors, etc., where a user may enter or select privacy campaign data. In exemplary embodiments, the Main Privacy Compliance Module 400 displays on the graphical user interface a prompt to create an electronic record for the privacy campaign. A user may choose to add a campaign, in which case the Main Privacy Compliance Module 400 receives a command to create the electronic record for the privacy campaign, and in response to the command, creates a record for the campaign and digitally stores the record for the campaign. The record for the campaign may be stored in, for example, storage 130, or a storage device associated with the Main Privacy Compliance Module (e.g., a hard drive residing on Server 110, or a peripheral hard drive attached to Server 110).

The user may be a person who works in the Chief Privacy Officer's organization (e.g., a privacy office rep, or privacy officer). The privacy officer may be the user that creates the campaign record, and enters initial portions of campaign data (e.g., "high level" data related to the campaign), for example, a name for the privacy campaign, a description of the campaign, and a business group responsible for administering the privacy operations related to that campaign (for example, though the GUI shown in FIG. 6). The Main Privacy Compliance Module 400 may also prompt the user to enter a person or entity responsible for each campaign (e.g., the campaign's "owner"). The owner may be tasked with the responsibility for ensuring or attempting to ensure that the privacy policies or privacy laws associated with personal data related to a particular privacy campaign are being complied with. In exemplary embodiments, the default owner of the campaign may be the person who initiated the creation of the privacy campaign. That owner may be a person who works in the Chief Privacy Officer's organization (e.g., a privacy office rep, or privacy officer). The initial owner of the campaign may designate someone else to be the owner of the campaign. The designee may be, for example, a representative of some business unit within the organization (a business rep). Additionally, more than one owner may be assigned. For example, the user may assign a primary business rep, and may also assign a privacy office rep as owners of the campaign.

In many instances, some or most of the required information related to the privacy campaign record might not be within the knowledge of the default owner (i.e., the privacy office rep). The Main Data Compliance Module 400 can be operable to allow the creator of the campaign record (e.g., a privacy officer rep) to designate one or more other collaborators to provide at least one of the data inputs for the campaign data. Different collaborators, which may include the one or more owners, may be assigned to different questions, or to specific questions within the context of the privacy campaign. Additionally, different collaborators may be designated to respond to parts of questions. Thus, portions of campaign data may be assigned to different individuals.

Still referring to FIG. 4, if at step 415 the Main Privacy Compliance Module 400 has received an input from a user to designate a new owner for the privacy campaign that was created, then at step 420, the Main Privacy Compliance Module 400 may notify that individual via a suitable notification that the privacy campaign has been assigned to him or her. Prior to notification, the Main Privacy Compliance Module 400 may display a field that allows the creator of the campaign to add a personalized message to the newly assigned owner of the campaign to be included with that notification. In exemplary embodiments, the notification may be in the form of an email message. The email may include the personalized message from the assignor, a standard message that the campaign has been assigned to him/her, the deadline for completing the campaign entry, and instructions to log in to the system to complete the privacy campaign entry (along with a hyperlink that takes the user to a GUI providing access to the Main Privacy Compliance Module 400. Also included may be an option to reply to the email if an assigned owner has any questions, or a button that when clicked on, opens up a chat window (i.e., instant messenger window) to allow the newly assigned owner and the assignor a GUI in which they are able to communicate in real-time. An example of such a notification appears in FIG. 16 below. In addition to owners, collaborators that are assigned to input portions of campaign data may also be notified through similar processes. In exemplary embodiments, The Main Privacy Compliance Module 400 may, for example through a Communications Module, be operable to send collaborators emails regarding their assignment of one or more portions of inputs to campaign data. Or through the Communications Module, selecting the commentators button brings up one or more collaborators that are on-line (with the off-line users still able to see the messages when they are back on-line. Alerts indicate that one or more emails or instant messages await a collaborator.

At step 425, regardless of whether the owner is the user (i.e., the creator of the campaign), "someone else" assigned by the user, or other collaborators that may be designated with the task of providing one or more items of campaign data, the Main Privacy Campaign Module 400 may be operable to electronically receive campaign data inputs from one or more users related to the personal data related to a privacy campaign through a series of displayed computer-generated graphical user interfaces displaying a plurality of prompts for the data inputs. In exemplary embodiments, through a step-by-step process, the Main Privacy Campaign Module may receive from one or more users' data inputs that include campaign data like: (1) a description of the campaign; (2) one or more types of personal data to be collected and stored as part of the campaign; (3) individuals from which the personal data is to be collected; (4) the storage location of the personal data, and (5) information regarding who will have access to the personal data. These inputs may be obtained, for example, through the graphical user interfaces shown in FIGS. 8 through 13, wherein the Main Compliance Module 400 presents on sequentially appearing GUIs the prompts for the entry of each of the enumerated campaign data above. The Main Compliance Module 400 may process the campaign data by electronically associating the campaign data with the record for the campaign and digitally storing the campaign data with the record for the campaign. The campaign data may be digitally stored as data elements in a database residing in a memory location in the server 120, a peripheral storage device attached to the server, or one or more storage devices connected to the network (e.g., storage 130). If campaign data inputs have been assigned to one or more collaborators, but those collaborators have not input the data yet, the Main Compliance Module 400 may, for example through the Communications Module, sent an electronic message (such as an email) alerting the collaborators and owners that they have not yet supplied their designated portion of campaign data.

III. Privacy Campaign Information Display

At step 430, Main Privacy Compliance Module 400 may, in exemplary embodiments, call upon a Risk Assessment Module 430 that may determine and assign a Risk Level for the privacy campaign, based wholly or in part on the information that the owner(s) have input. The Risk Assessment Module 430 will be discussed in more detail below.

At step 432, Main Privacy Compliance Module 400 may in exemplary embodiments, call upon a Privacy Audit Module 432 that may determine an audit schedule for each privacy campaign, based, for example, wholly or in part on the campaign data that the owner(s) have input, the Risk Level assigned to a campaign, and/or any other suitable factors. The Privacy Audit Module 432 may also be operable to display the status of an audit for each privacy campaign. The Privacy Audit Module 432 will be discussed in more detail below.

At step 435, the Main Privacy Compliance Module 400 may generate and display a GUI showing an inventory page (e.g., inventory page 1500) that includes information associated with each campaign. That information may include information input by a user (e.g., one or more owners), or information calculated by the Main Privacy Compliance Module 400 or other modules. Such information may include for example, the name of the campaign, the status of the campaign, the source of the campaign, the storage location of the personal data related to the campaign, etc. The inventory page 1500 may also display an indicator representing the Risk Level (as mentioned, determined for each campaign by the Risk Assessment Module 430), and audit information related to the campaign that was determined by the Privacy Audit Module (see below). The inventory page 1500 may be the landing page displayed to users that access the system. Based on the login information received from the user, the Main Privacy Compliance Module may determine which campaigns and campaign data the user is authorized to view, and display only the information that the user is authorized to view. Also from the inventory page 1500, a user may add a campaign (discussed above in step 405), view more information for a campaign, or edit information related to a campaign (see, e.g., FIGS. 15, 16, 17).

If other commands from the inventory page are received (e.g., add a campaign, view more information, edit information related to the campaign), then step 440, 445, and/or 450 may be executed.

At step 440, if a command to view more information has been received or detected, then at step 445, the Main Privacy Compliance Module 400 may present more information about the campaign, for example, on a suitable campaign information page 1500. At this step, the Main Privacy Compliance Module 400 may invoke a Data Flow Diagram Module (described in more detail below). The Data Flow Diagram Module may generate a flow diagram that shows, for example, visual indicators indicating whether data is confidential and/or encrypted (see, e.g., FIG. 1600 below).

At step 450, if the system has received a request to edit a campaign, then, at step 455, the system may display a dialog page that allows a user to edit information regarding the campaign (e.g., edit campaign dialog 1700).

At step 460, if the system has received a request to add a campaign, the process may proceed back to step 405.

C. Risk Assessment Module

Figure 5:
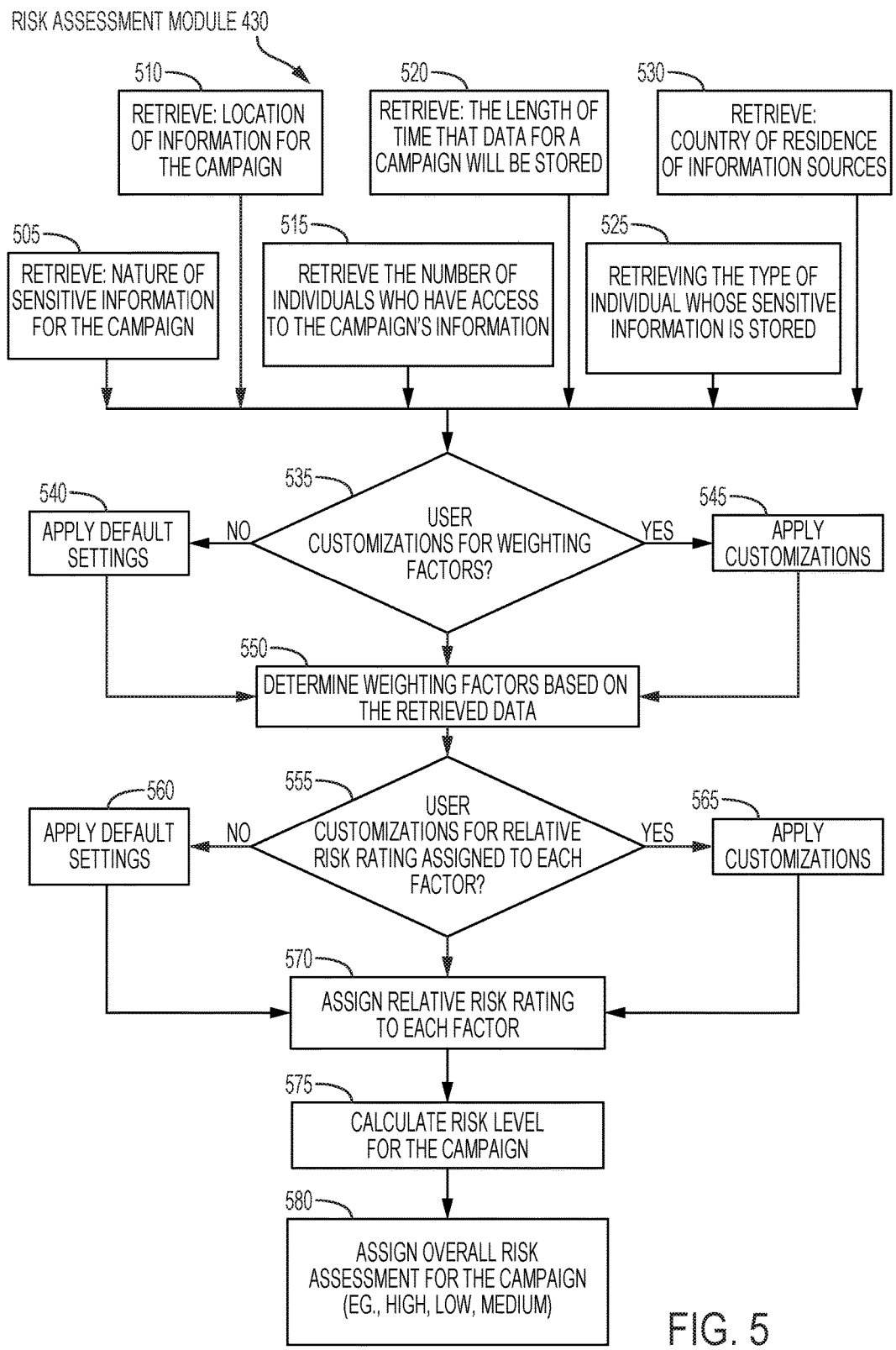
FIG. 5 is a flow chart showing an example of a process performed by the Risk Assessment Module.

FIG. 5 illustrates an exemplary process for determining a Risk Level and Overall Risk Assessment for a particular privacy campaign performed by Risk Assessment Module 430.

I. Determining Risk Level

In exemplary embodiments, the Risk Assessment Module 430 may be operable to calculate a Risk Level for a campaign based on the campaign data related to the personal data associated with the campaign. The Risk Assessment Module may associate the Risk Level with the record for the campaign and digitally store the Risk Level with the record for the campaign.

The Risk Assessment Module 430 may calculate this Risk Level based on any of various factors associated with the campaign. The Risk Assessment Module 430 may determine a plurality of weighting factors based upon, for example: (1) the nature of the sensitive information collected as part of the campaign (e.g., campaigns in which medical information, financial information or non-public personal identifying information is collected may be indicated to be of higher risk than those in which only public information is collected, and thus may be assigned a higher numerical weighting factor); (2) the location in which the information is stored (e.g., campaigns in which data is stored in the cloud may be deemed higher risk than campaigns in which the information is stored locally); (3) the number of individuals who have access to the information (e.g., campaigns that permit relatively large numbers of individuals to access the personal data may be deemed more risky than those that allow only small numbers of individuals to access the data); (4) the length of time that the data will be stored within the system (e.g., campaigns that plan to store and use the personal data over a long period of time may be deemed more risky than those that may only hold and use the personal data for a short period of time); (5) the individuals whose sensitive information will be stored (e.g., campaigns that involve storing and using information of minors may be deemed of greater risk than campaigns that involve storing and using the information of adults); (6) the country of residence of the individuals whose sensitive information will be stored (e.g., campaigns that involve collecting data from individuals that live in countries that have relatively strict privacy laws may be deemed more risky than those that involve collecting data from individuals that live in countries that have relative lax privacy laws). It should be understood that any other suitable factors may be used to assess the Risk Level of a particular campaign, including any new inputs that may need to be added to the risk calculation.

In particular embodiments, one or more of the individual factors may be weighted (e.g., numerically weighted) according to the deemed relative importance of the factor relative to other factors (i.e., Relative Risk Rating).

These weightings may be customized from organization to organization, and/or according to different applicable laws. In particular embodiments, the nature of the sensitive information will be weighted higher than the storage location of the data, or the length of time that the data will be stored.

In various embodiments, the system uses a numerical formula to calculate the Risk Level of a particular campaign. This formula may be, for example: Risk Level for campaign=(Weighting Factor of Factor 1)*(Relative Risk Rating of Factor 1)+(Weighting Factor of Factor 2)*(Relative Risk Rating of Factor 2)+(Weighting Factor of Factor N)*(Relative Risk Rating of Factor N). As a simple example, the Risk Level for a campaign that only collects publicly available information for adults and that stores the information locally for a short period of several weeks might be determined as Risk Level=(Weighting Factor of Nature of Sensitive Information)*(Relative Risk Rating of Particular Sensitive Information to be Collected)+(Weighting Factor of Individuals from which Information is to be Collected)*(Relative Risk Rating of Individuals from which Information is to be Collected)+(Weighting Factor of Duration of Data Retention)*(Relative Risk Rating of Duration of Data Retention)+(Weighting Factor of Individuals from which Data is to be Collected)*(Relative Risk Rating of Individuals from which Data is to be Collected). In this example, the Weighting Factors may range, for example from 1-5, and the various Relative Risk Ratings of a factor may range from 1-10. However, the system may use any other suitable ranges.

In particular embodiments, the Risk Assessment Module 430 may have default settings for assigning Overall Risk Assessments to respective campaigns based on the numerical Risk Level value determined for the campaign, for example, as described above. The organization may also modify these settings in the Risk Assessment Module 430 by assigning its own Overall Risk Assessments based on the numerical Risk Level. For example, the Risk Assessment Module 430 may, based on default or user assigned settings, designate: (1) campaigns with a Risk Level of 1-7 as "low risk" campaigns, (2) campaigns with a Risk Level of 8-15 as "medium risk" campaigns; (3) campaigns with a Risk Level of over 16 as "high risk" campaigns. As show below, in an example inventory page 1500, the Overall Risk Assessment for each campaign can be indicated by up/down arrow indicators, and further, the arrows may have different shading (or color, or portions shaded) based upon this Overall Risk Assessment. The selected colors may be conducive for viewing by those who suffer from color blindness.

Thus, the Risk Assessment Module 430 may be configured to automatically calculate the numerical Risk Level for each campaign within the system, and then use the numerical Risk Level to assign an appropriate Overall Risk Assessment to the respective campaign. For example, a campaign with a Risk Level of 5 may be labeled with an Overall Risk Assessment as "Low Risk". The system may associate both the Risk Level and the Overall Risk Assessment with the campaign and digitally store them as part of the campaign record.

II. Exemplary Process for Assessing Risk

Accordingly, as shown in FIG. 5, in exemplary embodiments, the Risk Assessment Module 430 electronically retrieves from a database (e.g., storage device 130) the campaign data associated with the record for the privacy campaign. It may retrieve this information serially, or in parallel. At step 505, the Risk Assessment Module 430 retrieves information regarding (1) the nature of the sensitive information collected as part of the campaign. At step 510, the Risk Assessment Module 430 retrieves information regarding the (2) the location in which the information related to the privacy campaign is stored. At step 515, the Risk Assessment Module 430 retrieves information regarding (3) the number of individuals who have access to the information. At step 520, the Risk Assessment Module retrieves information regarding (4) the length of time that the data associated with a campaign will be stored within the System 100. At step 525, the Risk Assessment Module retrieves information regarding (5) the individuals whose sensitive information will be stored. At step 530, the Risk Assessment Module retrieves information regarding (6) the country of residence of the individuals whose sensitive information will be stored.

At step 535, the Risk Assessment Module takes into account any user customizations to the weighting factors related to each of the retrieved factors from steps 505, 510, 515, 520, 525, and 530. At steps 540 and 545, the Risk Assessment Module applies either default settings to the weighting factors (which may be based on privacy laws), or customizations to the weighting factors. At step 550, the Risk Assessment Module determines a plurality of weighting factors for the campaign. For example, for the factor related to the nature of the sensitive information collected as part of the campaign, a weighting factor of 1-5 may be assigned based on whether non-public personal identifying information is collected.

At step 555, the Risk Assessment Module takes into account any user customizations to the Relative Risk assigned to each factor, and at step 560 and 565, will either apply default values (which can be based on privacy laws) or the customized values for the Relative Risk. At step 570, the Risk Assessment Module assigns a relative risk rating for each of the plurality of weighting factors. For example, the relative risk rating for the location of the information of the campaign may be assigned a numerical number (e.g., from 1-10) that is lower than the numerical number assigned to the Relative Risk Rating for the length of time that the sensitive information for that campaign is retained.

At step 575, the Risk Assessment Module 430 calculates the relative risk assigned to the campaign based upon the plurality of Weighting Factors and the Relative Risk Rating for each of the plurality of factors. As an example, the Risk Assessment Module 430 may make this calculation using the formula of Risk Level=(Weighting Factor of Factor 1)*(Relative Risk Rating of Factor 1)+(Weighting Factor of Factor 2)*(Relative Risk Rating of Factor 2)+(Weighting Factor of Factor N)*(Relative Risk Rating of Factor N).

At step 580, based upon the numerical value derived from step 575, the Risk Assessment Module 430 may determine an Overall Risk Assessment for the campaign. The Overall Risk Assessment determination may be made for the privacy campaign may be assigned based on the following criteria, which may be either a default or customized setting: (1) campaigns with a Risk Level of 1-7 as "low risk" campaigns, (2) campaigns with a Risk Level of 8-15 as "medium risk" campaigns; (3) campaigns with a Risk Level of over 16 as "high risk" campaigns. The Overall Risk Assessment is then associated and stored with the campaign record.

D. Privacy Audit Module

The System 100 may determine an audit schedule for each campaign, and indicate, in a particular graphical user interface (e.g., inventory page 1500), whether a privacy audit is coming due (or is past due) for each particular campaign and, if so, when the audit is/was due. The System 100 may also be operable to provide an audit status for each campaign, and alert personnel of upcoming or past due privacy audits. To further the retention of evidence of compliance, the System 100 may also receive and store evidence of compliance. A Privacy Audit Module 432, may facilitate these functions.

I. Determining a Privacy Audit Schedule and Monitoring Compliance

In exemplary embodiments, the Privacy Audit Module 432 is adapted to automatically schedule audits and manage compliance with the audit schedule. In particular embodiments, the system may allow a user to manually specify an audit schedule for each respective campaign. The Privacy Audit Module 432 may also automatically determine, and save to memory, an appropriate audit schedule for each respective campaign, which in some circumstances, may be editable by the user.

The Privacy Audit Module 432 may automatically determine the audit schedule based on the determined Risk Level of the campaign. For example, all campaigns with a Risk Level less than 10 may have a first audit schedule and all campaigns with a Risk Level of 10 or more may have a second audit schedule. The Privacy Audit Module may also be operable determine the audit schedule based on the Overall Risk Assessment for the campaign (e.g., "low risk" campaigns may have a first predetermined audit schedule, "medium risk" campaigns may have a second predetermined audit schedule, "high risk" campaigns may have a third predetermined audit schedule, etc.).

In particular embodiments, the Privacy Audit Module 432 may automatically facilitate and monitor compliance with the determined audit schedules for each respective campaign. For example, the system may automatically generate one or more reminder emails to the respective owners of campaigns as the due date approaches. The system may also be adapted to allow owners of campaigns, or other users, to submit evidence of completion of an audit (e.g., by for example, submitting screen shots that demonstrate that the specified parameters of each campaign are being followed). In particular embodiments, the system is configured for, in response to receiving sufficient electronic information documenting completion of an audit, resetting the audit schedule (e.g., scheduling the next audit for the campaign according to a determined audit schedule, as determined above).

II. Exemplary Privacy Audit Process

Figure 6:
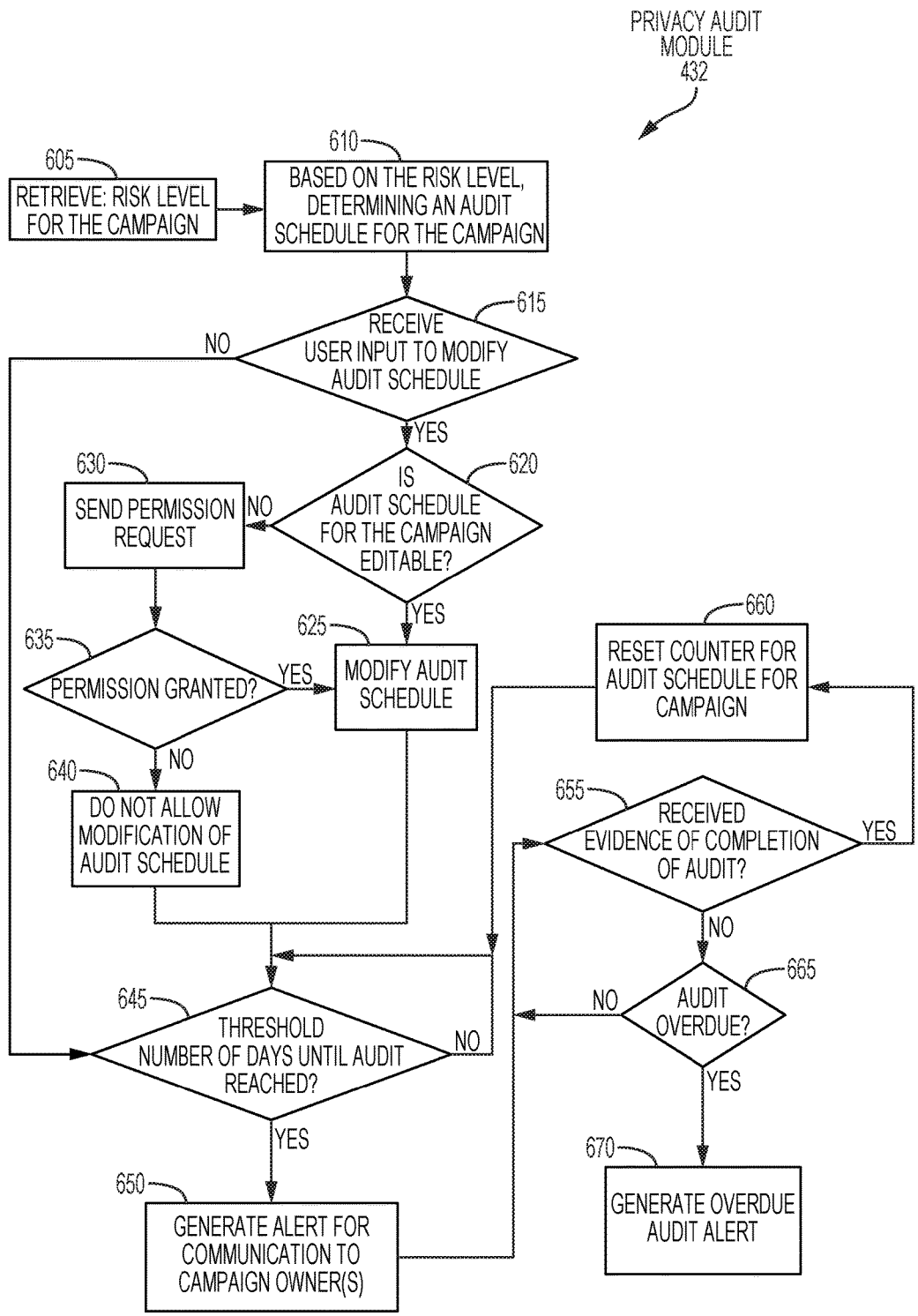
FIG. 6 is a flow chart showing an example of a process performed by the Privacy Audit Module.

FIG. 6 illustrates an exemplary process performed by a Privacy Audit Module 432 for assigning a privacy audit schedule and facilitating and managing compliance for a particular privacy campaign. At step 605, the Privacy Audit Module 432 retrieves the Risk Level associated with the privacy campaign. In exemplary embodiments, the Risk Level may be a numerical number, as determined above by the Risk Assessment Module 430. If the organization chooses, the Privacy Audit Module 432 may use the Overall Risk Assessment to determine which audit schedule for the campaign to assign.

At step 610, based on the Risk Level of the campaign (or the Overall Risk Assessment), or based on any other suitable factor, the Privacy Audit Module 432 can assign an audit schedule for the campaign. The audit schedule may be, for example, a timeframe (i.e., a certain amount of time, such as number of days) until the next privacy audit on the campaign to be performed by the one or more owners of the campaign. The audit schedule may be a default schedule. For example, the Privacy Audit Module can automatically apply an audit schedule of 120 days for any campaign having Risk Level of 10 and above. These default schedules may be modifiable. For example, the default audit schedule for campaigns having a Risk Level of 10 and above can be changed from 120 days to 150 days, such that any campaign having a Risk Level of 10 and above is assigned the customized default audit schedule (i.e., 150 days). Depending on privacy laws, default policies, authority overrides, or the permission level of the user attempting to modify this default, the default might not be modifiable.

At step 615, after the audit schedule for a particular campaign has already been assigned, the Privacy Audit Module 432 determines if a user input to modify the audit schedule has been received. If a user input to modify the audit schedule has been received, then at step 620, the Privacy Audit Module 432 determines whether the audit schedule for the campaign is editable (i.e., can be modified). Depending on privacy laws, default policies, authority overrides, or the permission level of the user attempting to modify the audit schedule, the campaign's audit schedule might not be modifiable.

At step 625, if the audit schedule is modifiable, then the Privacy Audit Module will allow the edit and modify the audit schedule for the campaign. If at step 620 the Privacy Audit Module determines that the audit schedule is not modifiable, in some exemplary embodiments, the user may still request permission to modify the audit schedule. For example, the Privacy Audit Module 432 can at step 630 provide an indication that the audit schedule is not editable, but also provide an indication to the user that the user may contact through the system one or more persons having the authority to grant or deny permission to modify the audit schedule for the campaign (i.e., administrators) to gain permission to edit the field. The Privacy Audit Module 432 may display an on-screen button that, when selected by the user, sends a notification (e.g., an email) to an administrator. The user can thus make a request to modify the audit schedule for the campaign in this manner.

At step 635, the Privacy Audit Module may determine whether permission has been granted by an administrator to allow a modification to the audit schedule. It may make this determination based on whether it has received input from an administrator to allow modification of the audit schedule for the campaign. If the administrator has granted permission, the Privacy Audit Module 432 at step 635 may allow the edit of the audit schedule. If at step 640, a denial of permission is received from the administrator, or if a certain amount of time has passed (which may be customized or based on a default setting), the Privacy Audit Module 432 retains the audit schedule for the campaign by not allowing any modifications to the schedule, and the process may proceed to step 645. The Privacy Audit Module may also send a reminder to the administrator that a request to modify the audit schedule for a campaign is pending.

At step 645, the Privacy Audit Module 432 determines whether a threshold amount of time (e.g., number of days) until the audit has been reached. This threshold may be a default value, or a customized value. If the threshold amount of time until an audit has been reached, the Privacy Audit Module 432 may at step 650 generate an electronic alert. The alert can be a message displayed to the collaborator the next time the collaborator logs into the system, or the alert can be an electronic message sent to one or more collaborators, including the campaign owners. The alert can be, for example, an email, an instant message, a text message, or one or more of these communication modalities. For example, the message may state, "This is a notification that a privacy audit for Campaign Internet Browsing History is scheduled to occur in 90 days." More than one threshold may be assigned, so that the owner of the campaign receives more than one alert as the scheduled privacy audit deadline approaches. If the threshold number of days has not been reached, the Privacy Audit Module 432 will continue to evaluate whether the threshold has been reached (i.e., back to step 645).

In exemplary embodiments, after notifying the owner of the campaign of an impending privacy audit, the Privacy Audit Module may determine at step 655 whether it has received any indication or confirmation that the privacy audit has been completed. In example embodiments, the Privacy Audit Module allows for evidence of completion to be submitted, and if sufficient, the Privacy Audit Module 432 at step 660 resets the counter for the audit schedule for the campaign. For example, a privacy audit may be confirmed upon completion of required electronic forms in which one or more collaborators verify that their respective portions of the audit process have been completed. Additionally, users can submit photos, screen shots, or other documentation that show that the organization is complying with that user's assigned portion of the privacy campaign. For example, a database administrator may take a screen shot showing that all personal data from the privacy campaign is being stored in the proper database and submit that to the system to document compliance with the terms of the campaign.

If at step 655, no indication of completion of the audit has been received, the Privacy Audit Module 432 can determine at step 665 whether an audit for a campaign is overdue (i.e., expired). If it is not overdue, the Privacy Audit Module 432 will continue to wait for evidence of completion (e.g., step 655). If the audit is overdue, the Privacy Audit Module 432 at step 670 generates an electronic alert (e.g., an email, instant message, or text message) to the campaign owner(s) or other administrators indicating that the privacy audit is overdue, so that the organization can take responsive or remedial measures.

In exemplary embodiments, the Privacy Audit Module 432 may also receive an indication that a privacy audit has begun (not shown), so that the status of the audit when displayed on inventory page 1500 shows the status of the audit as pending. While the audit process is pending, the Privacy Audit Module 432 may be operable to generate reminders to be sent to the campaign owner(s), for example, to remind the owner of the deadline for completing the audit.

E. Data Flow Diagram Module

The system 110 may be operable to generate a data flow diagram based on the campaign data entered and stored, for example in the manner described above.

I. Display of Security Indicators and Other Information

In various embodiments, a Data Flow Diagram Module is operable to generate a flow diagram for display containing visual representations (e.g., shapes) representative of one or more parts of campaign data associated with a privacy campaign, and the flow of that information from a source (e.g., customer), to a destination (e.g., an internet usage database), to which entities and computer systems have access (e.g., customer support, billing systems). Data Flow Diagram Module may also generate one or more security indicators for display. The indicators may include, for example, an "eye" icon to indicate that the data is confidential, a "lock" icon to indicate that the data, and/or a particular flow of data, is encrypted, or an "unlocked lock" icon to indicate that the data, and/or a particular flow of data, is not encrypted. In the example shown in FIG. 16, the dotted arrow lines generally depict respective flows of data and the locked or unlocked lock symbols indicate whether those data flows are encrypted or unencrypted. The color of dotted lines representing data flows may also be colored differently based on whether the data flow is encrypted or non-encrypted, with colors conducive for viewing by those who suffer from color blindness.

II. Exemplary Process Performed by Data Flow Diagram Module

Figure 7:
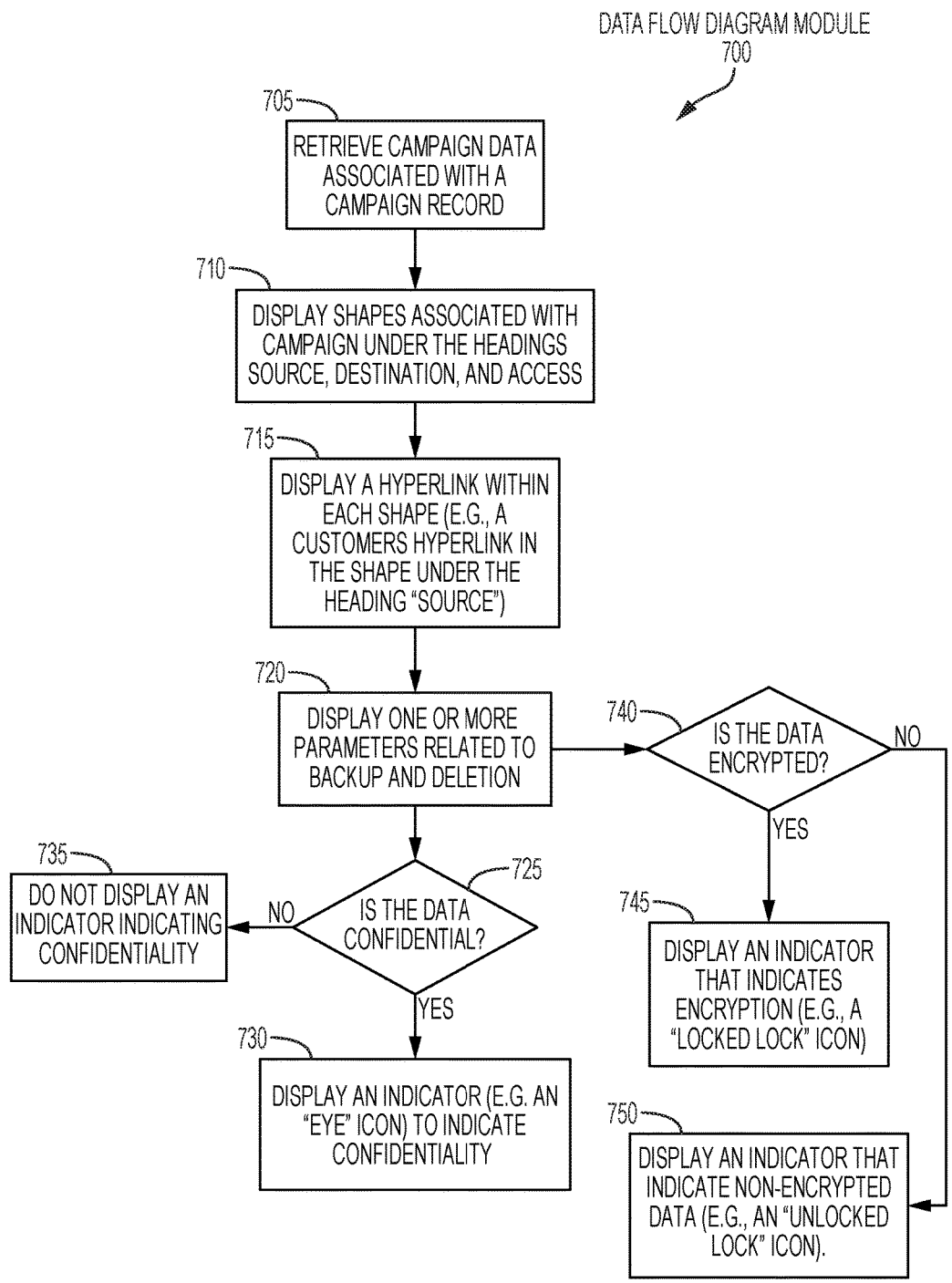
FIG. 7 is a flow chart showing an example of a process performed by the Data Flow Diagram Module.

FIG. 7 shows an example process performed by the Data Flow Diagram Module 700. At step 705, the Data Flow Diagram retrieves campaign data related to a privacy campaign record. The campaign data may indicate, for example, that the sensitive information related to the privacy campaign contains confidential information, such as the social security numbers of a customer.

Figure 16:
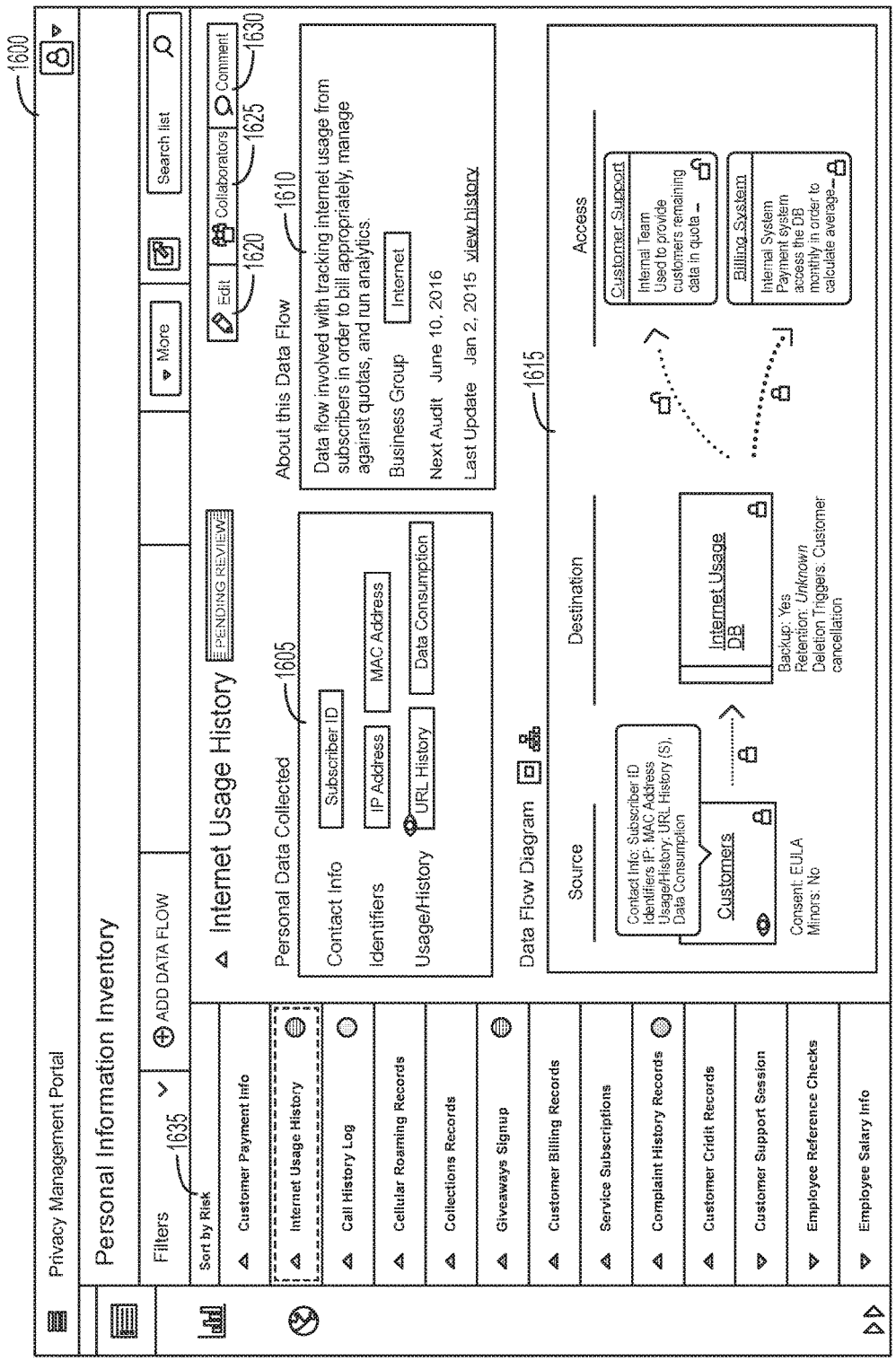
FIG. 16 is an example of a GUI showing campaign data, including a data flow diagram.

At step 710, the Data Flow Diagram Module 700 is operable to display on-screen objects (e.g., shapes) representative of the Source, Destination, and Access, which indicate that information below the heading relates to the source of the personal data, the storage destination of the personal data, and access related to the personal data. In addition to campaign data regarding Source, Destination, and Access, the Data Flow Diagram Module 700 may also account for user defined attributes related to personal data, which may also be displayed as on-screen objects. The shape may be, for example, a rectangular box (see, e.g., FIG. 16). At step 715, the Data Flow Diagram Module 700 may display a hyperlink label within the on-screen object (e.g., as shown in FIG. 16, the word "Customer" may be a hyperlink displayed within the rectangular box) indicative of the source of the personal data, the storage destination of the personal data, and access related to the personal data, under each of the respective headings. When a user hovers over the hyperlinked word, the Data Flow Diagram is operable to display additional campaign data relating to the campaign data associated with the hyperlinked word. The additional information may also be displayed in a pop up, or a new page. For example, FIG. 16 shows that if a user hovers over the words "Customer," the Data Flow Diagram Module 700 displays what customer information is associated with the campaign (e.g., the Subscriber ID, the IP and Mac Addresses associated with the Customer, and the customer's browsing and usage history). The Data Flow Diagram Module 700 may also generate for display information relating to whether the source of the data includes minors, and whether consent was given by the source to use the sensitive information, as well as the manner of the consent (for example, through an End User License Agreement (EULA)).

At step 720, the Data Flow Diagram Module 700 may display one or more parameters related to backup and retention of personal data related to the campaign, including in association with the storage destination of the personal data. As an example, Data Flow Diagram 1615 of FIG. 16 displays that the information in the Internet Usage database is backed up, and the retention related to that data is Unknown.

At 725, the Data Flow Diagram Module 700 determines, based on the campaign data associated with the campaign, whether the personal data related to each of the hyperlink labels is confidential. At Step 730, if the personal data related to each hyperlink label is confidential, the Data Flow Diagram Module 700 generates visual indicator indicating confidentiality of that data (e.g., an "eye" icon, as show in Data Flow Diagram 1615). If there is no confidential information for that box, then at step 735, no indicators are displayed. While this is an example of the generation of indicators for this particular hyperlink, in exemplary embodiments, any user defined campaign data may visual indicators that may be generated for it.

Figure 9:
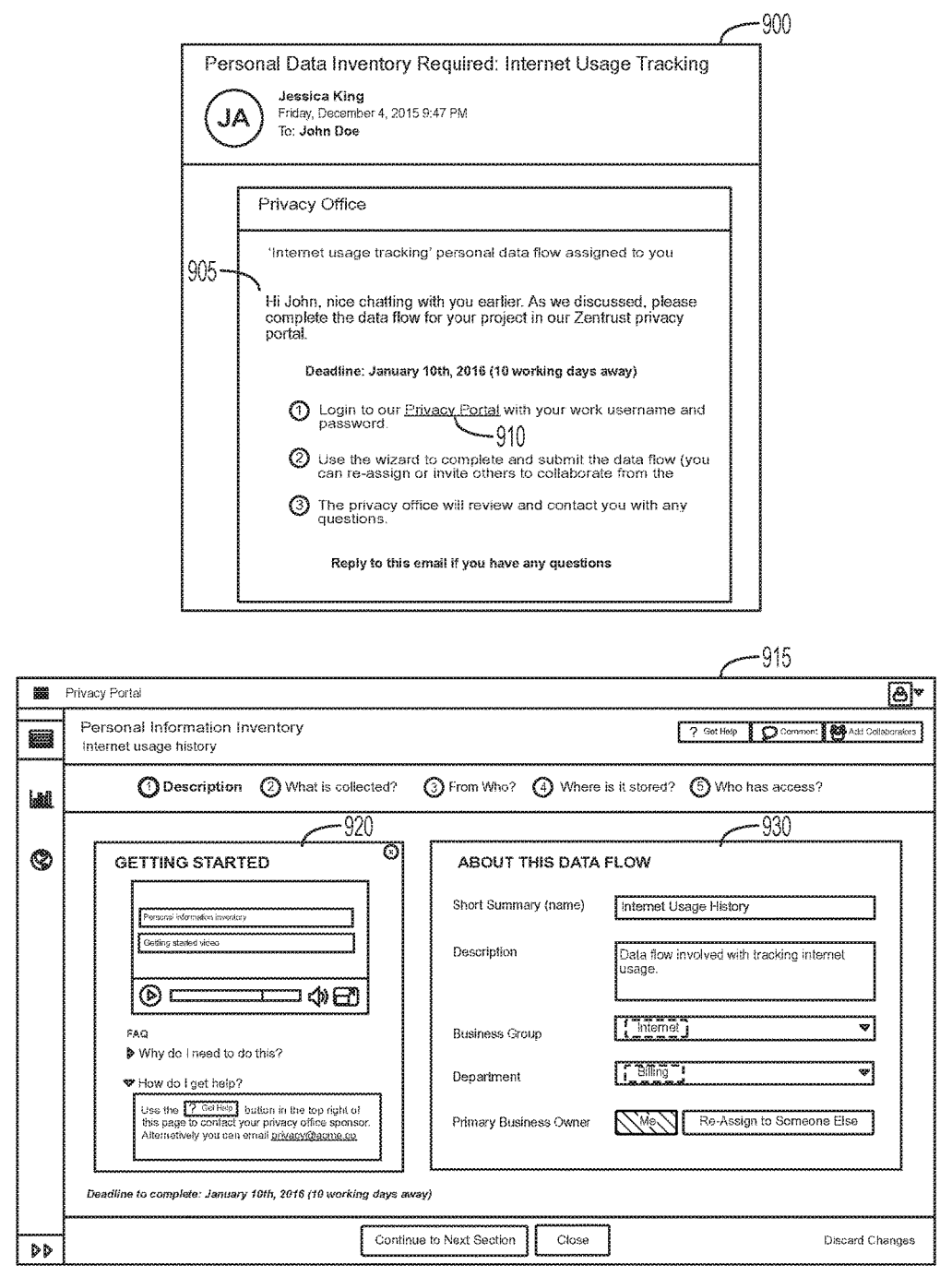

At step 740, the Data Flow Diagram Module 700 determined whether any of the data associated with the source, stored in a storage destination, being used by an entity or application, or flowing to one or more entities or systems (i.e., data flow) associated with the campaign is designated as encrypted. If the data is encrypted, then at step 745 the Data Flow Diagram Module 700 may generate an indicator that the personal data is encrypted (e.g., a "lock" icon). If the data is non-encrypted, then at step 750, the Data Flow Diagram Module 700 displays an indicator to indicate that the data or particular flow of data is not encrypted. (e.g., an "unlocked lock" icon). An example of a data flow diagram is depicted in FIG. 9. Additionally, the data flow diagram lines may be colored differently to indicate whether the data flow is encrypted or unencrypted, wherein the colors can still be distinguished by a color-blind person.

F. Communications Module

In exemplary embodiments, a Communications Module of the System 100 may facilitate the communications between various owners and personnel related to a privacy campaign. The Communications Module may retain contact information (e.g., emails or instant messaging contact information) input by campaign owners and other collaborators.

Figure 13:
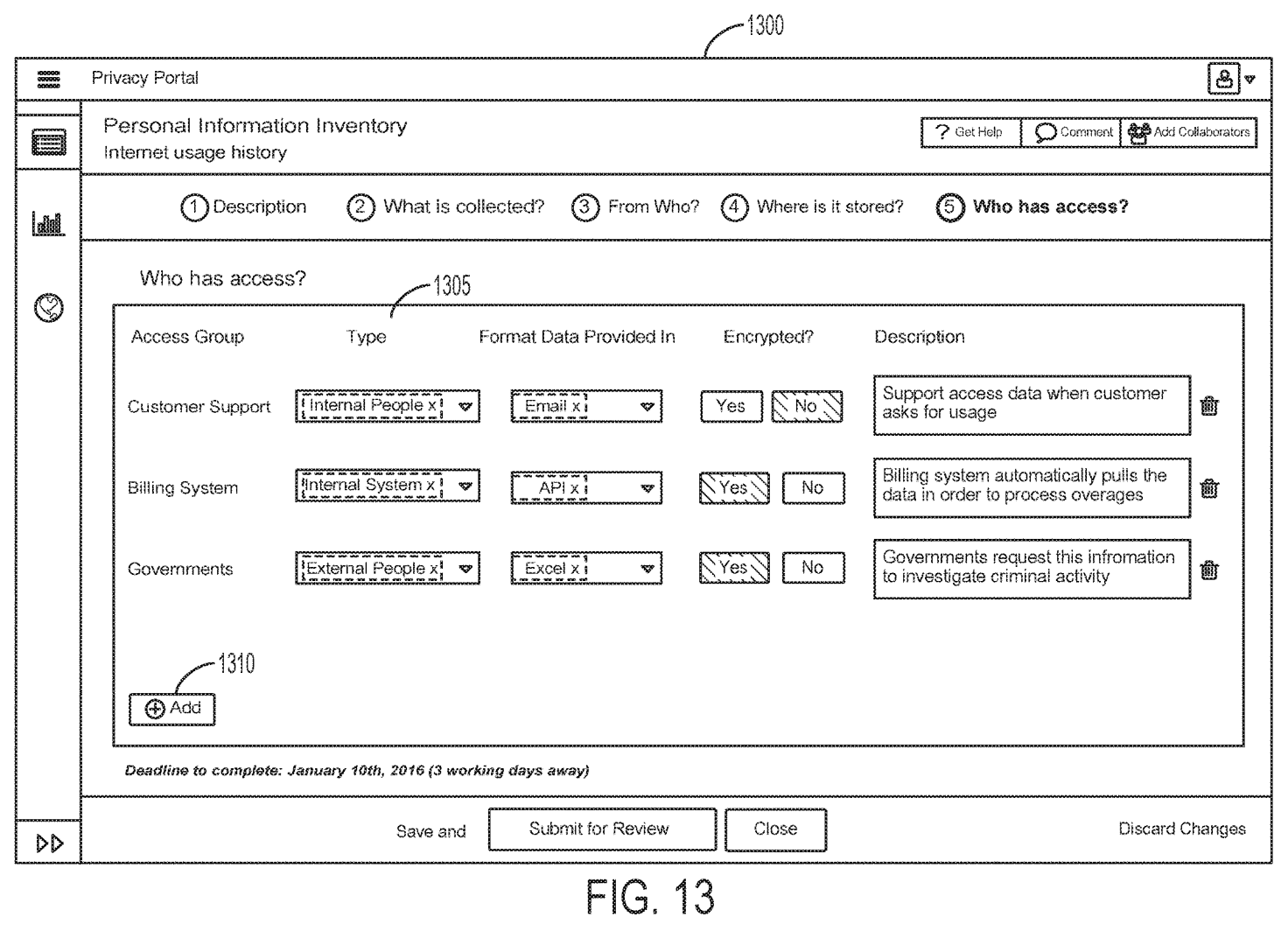
Figure 14:
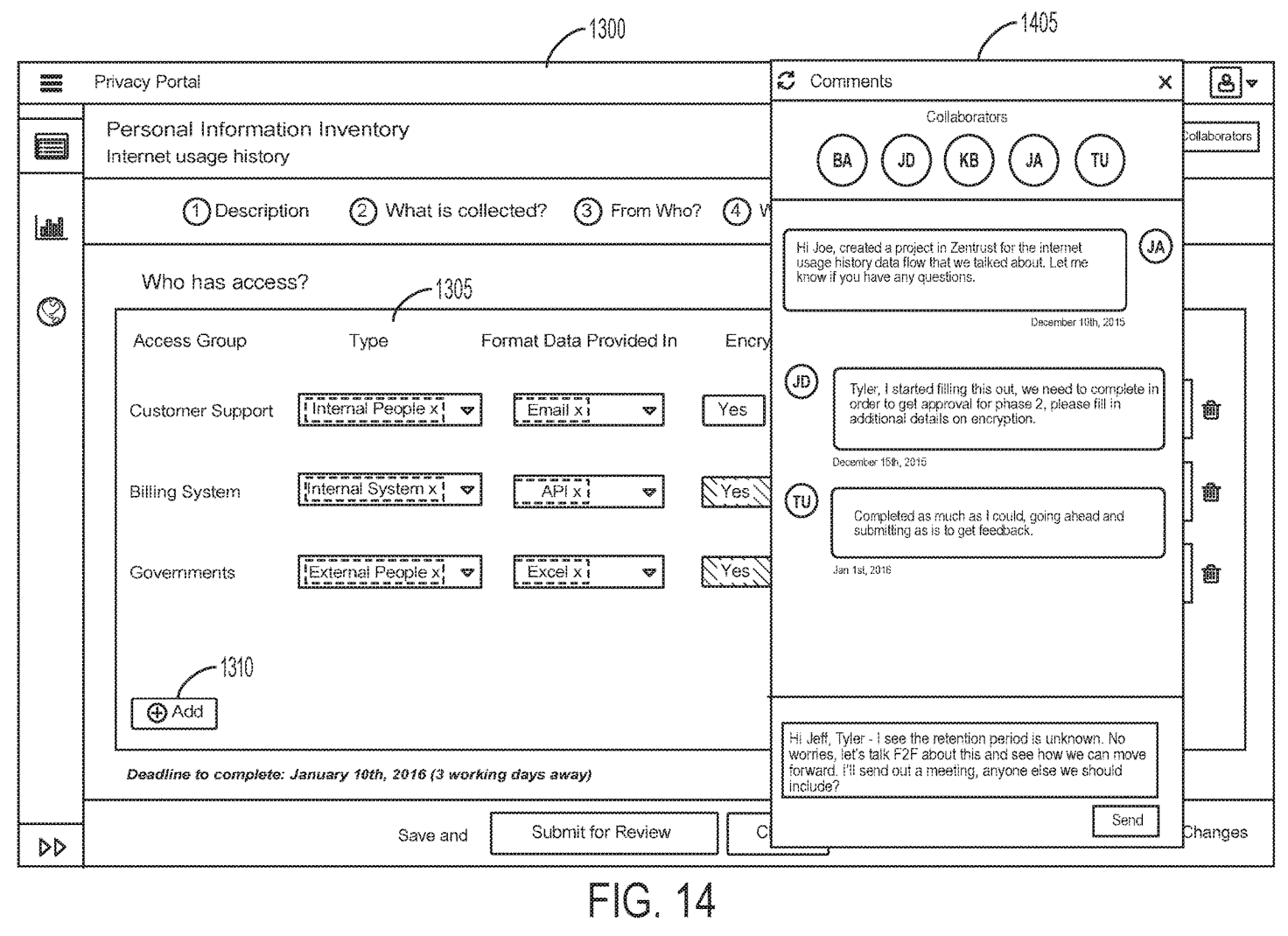

The Communications Module can be operable to take a generated notification or alert (e.g., alert in step 670 generated by Privacy Audit Module 432) and instantiate an email containing the relevant information. As mentioned above, the Main Privacy Compliance Module 400 may, for example through a communications module, be operable to send collaborators emails regarding their assignment of one or more portions of inputs to campaign data. Or through the communications module, selecting the commentators button brings up one or more collaborators that are on-line In exemplary embodiments, the Communications Module can also, in response to a user request (e.g., depressing the "comment" button show in FIG. 9, FIG. 10, FIG. 11, FIG. 12, FIG. 13, FIG. 16), instantiate an instant messaging session and overlay the instant messaging session over one or more portions of a GUI, including a GUI in which a user is presented with prompts to enter or select information. An example of this instant messaging overlay feature orchestrated by the Communications Module is shown in FIG. 14. While a real-time message session may be generated, off-line users may still able to see the messages when they are back on-line.

The Communications Module may facilitate the generation of alerts that indicate that one or more emails or instant messages await a collaborator.

If campaign data inputs have been assigned to one or more collaborators, but those collaborators have not input the data yet, the Communications Module, may facilitate the sending of an electronic message (such as an email) alerting the collaborators and owners that they have not yet supplied their designated portion of campaign data.

Exemplary User Experience

In the exemplary embodiments of the system for operationalizing privacy compliance, adding a campaign (i.e., data flow) comprises gathering information that includes several phases: (1) a description of the campaign; (2) the personal data to be collected as part of the campaign; (3) who the personal data relates to; (4) where the personal data be stored; and (5) who will have access to the indicated personal data.

Figure 8:
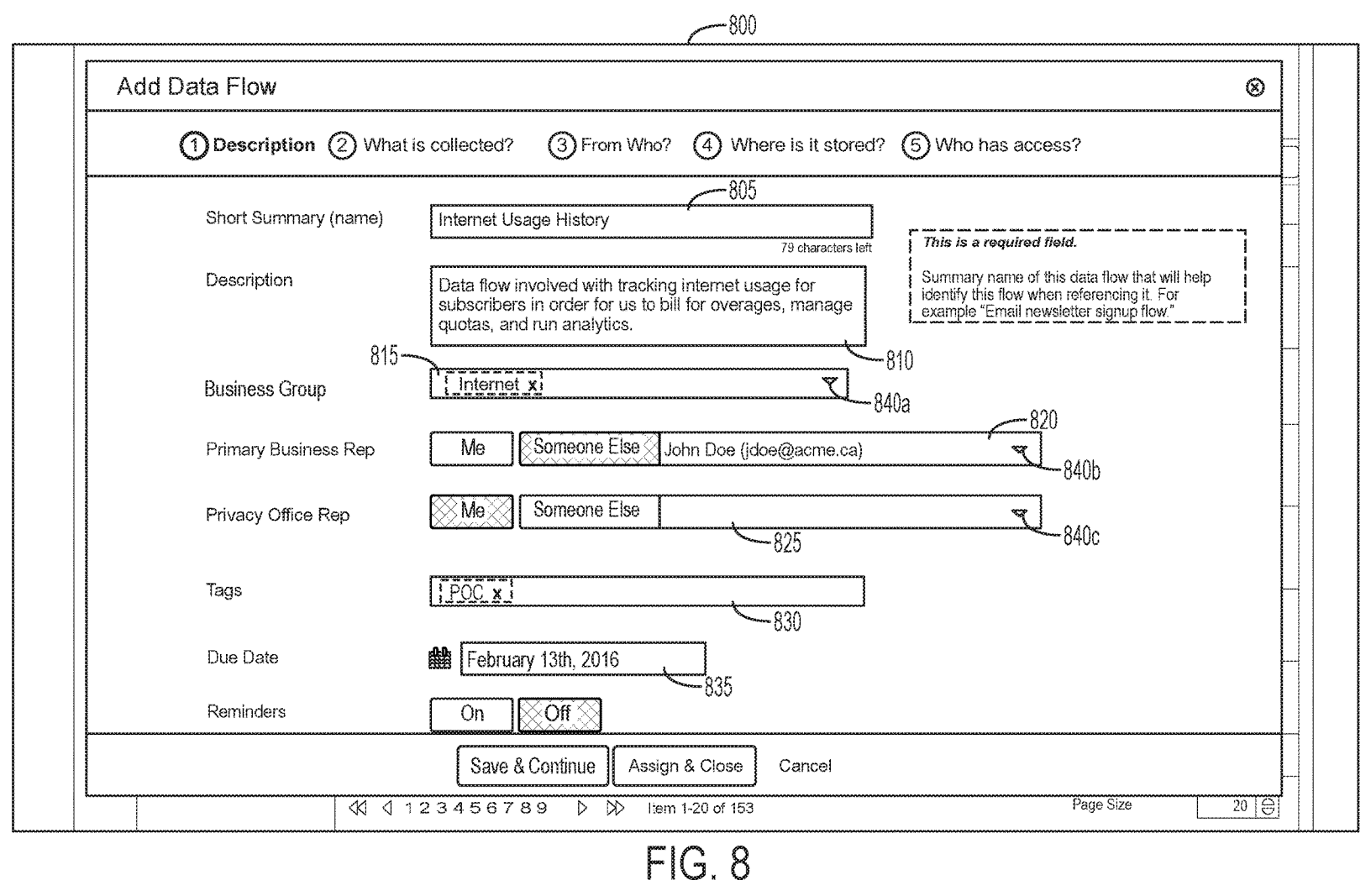

A. FIG. 8: Campaign Record Creation and Collaborator Assignment

FIG. 8 illustrates an example of the first phase of information gathering to add a campaign. In FIG. 8, a description entry dialog 800 may have several fillable/editable fields and drop-down selectors. In this example, the user may fill out the name of the campaign in the Short Summary (name) field 805, and a description of the campaign in the Description field 810. The user may enter or select the name of the business group (or groups) that will be accessing personal data for the campaign in the Business Group field 815. The user may select the primary business representative responsible for the campaign (i.e., the campaign's owner), and designate him/herself, or designate someone else to be that owner by entering that selection through the Someone Else field 820. Similarly, the user may designate him/herself as the privacy office representative owner for the campaign, or select someone else from the second Someone Else field 825. At any point, a user assigned as the owner may also assign others the task of selecting or answering any question related to the campaign. The user may also enter one or more tag words associated with the campaign in the Tags field 830. After entry, the tag words may be used to search for campaigns, or used to filter for campaigns (for example, under Filters 845). The user may assign a due date for completing the campaign entry, and turn reminders for the campaign on or off. The user may save and continue, or assign and close.

In example embodiments, some of the fields may be filled in by a user, with suggest-as-you-type display of possible field entries (e.g., Business Group field 815), and/or may include the ability for the user to select items from a drop-down selector (e.g., drop-down selectors 840*a*, 840*b*, 840*c*). The system may also allow some fields to stay hidden or unmodifiable to certain designated viewers or categories of users. For example, the purpose behind a campaign may be hidden from anyone who is not the chief privacy officer of the company, or the retention schedule may be configured so that it cannot be modified by anyone outside of the organization's legal department.

B. FIG. 9: Collaborator Assignment Notification and Description Entry

Moving to FIG. 9, in example embodiments, if another business representative (owner), or another privacy office representative has been assigned to the campaign (e.g., John Doe in FIG. 8), the system may send a notification (e.g., an electronic notification) to the assigned individual, letting them know that the campaign has been assigned to him/her. FIG. 9 shows an example notification 900 sent to John Doe that is in the form of an email message. The email informs him that the campaign "Internet Usage Tracking" has been assigned to him, and provides other relevant information, including the deadline for completing the campaign entry and instructions to log in to the system to complete the campaign (data flow) entry (which may be done, for example, using a suitable "wizard" program). The user that assigned John ownership of the campaign may also include additional comments 905 to be included with the notification 900. Also included may be an option to reply to the email if an assigned owner has any questions.

In this example, if John selects the hyperlink Privacy Portal 910, he is able to access the system, which displays a landing page 915. The landing page 915 displays a Getting Started section 920 to familiarize new owners with the system, and also display an "About This Data Flow" section 930 showing overview information for the campaign.

Figure 10:
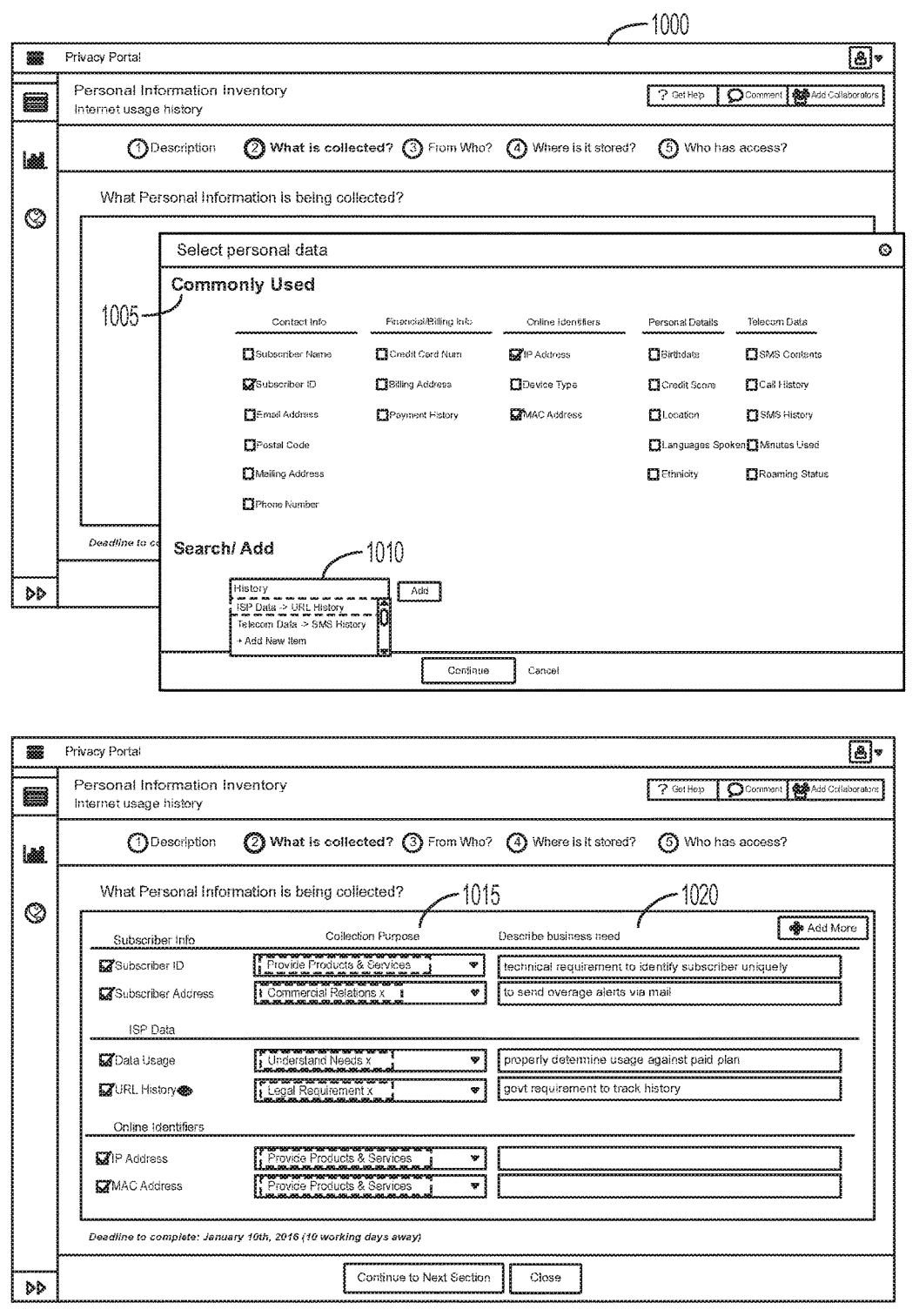

C. FIG. 10: What Personal Data is Collected

Moving to FIG. 10, after the first phase of campaign addition (i.e., description entry phase), the system may present the user (who may be a subsequently assigned business representative or privacy officer) with a dialog 1000 from which the user may enter in the type of personal data being collected.

In addition, questions are described generally as transitional questions, but the questions may also include one or more smart questions in which the system is configured to: (1) pose an initial question to a user and, (2) in response to the user's answer satisfying certain criteria, presenting the user with one or more follow-up questions. For example, in FIG. 10, if the user responds with a choice to add personal data, the user may be additionally presented follow-up prompts, for example, the select personal data window overlaying screen 800 that includes commonly used selections may include, for example, particular elements of an individual's contact information (e.g., name, address, email address), Financial/Billing Information (e.g., credit card number, billing address, bank account number), Online Identifiers (e.g., IP Address, device type, MAC Address), Personal Details (Birthdate, Credit Score, Location), or Telecommunication Data (e.g., Call History, SMS History, Roaming Status). The System 100 is also operable to pre-select or automatically populate choices—for example, with commonly-used selections 1005, some of the boxes may already be checked. The user may also use a search/add tool 1010 to search for other selections that are not commonly used and add another selection. Based on the selections made, the user may be presented with more options and fields. For example, if the user selected "Subscriber ID" as personal data associated with the campaign, the user may be prompted to add a collection purpose under the heading Collection Purpose 1015, and the user may be prompted to provide the business reason why a Subscriber ID is being collected under the "Describe Business Need" heading 1020.

D. FIG. 11: Who Personal Data is Collected from

As displayed in the example of FIG. 11, the third phase of adding a campaign may relate to entering and selecting information regarding who the personal data is gathered from. As noted above, the personal data may be gathered from, for example, one or more Subjects 100. In the exemplary "Collected From" dialog 1100, a user may be presented with several selections in the "Who Is It Collected From" section 1105. These selections may include whether the personal data was to be collected from an employee, customer, or other entity. Any entities that are not stored in the system may be added. The selections may also include, for example, whether the data was collected from a current or prospective subject (e.g., a prospective employee may have filled out an employment application with his/her social security number on it). Additionally, the selections may include how consent was given, for example through an end user license agreement (EULA), on-line Opt-in prompt, Implied consent, or an indication that the user is not sure. Additional selections may include whether the personal data was collected from a minor, and where the subject is located.

Figure 12:
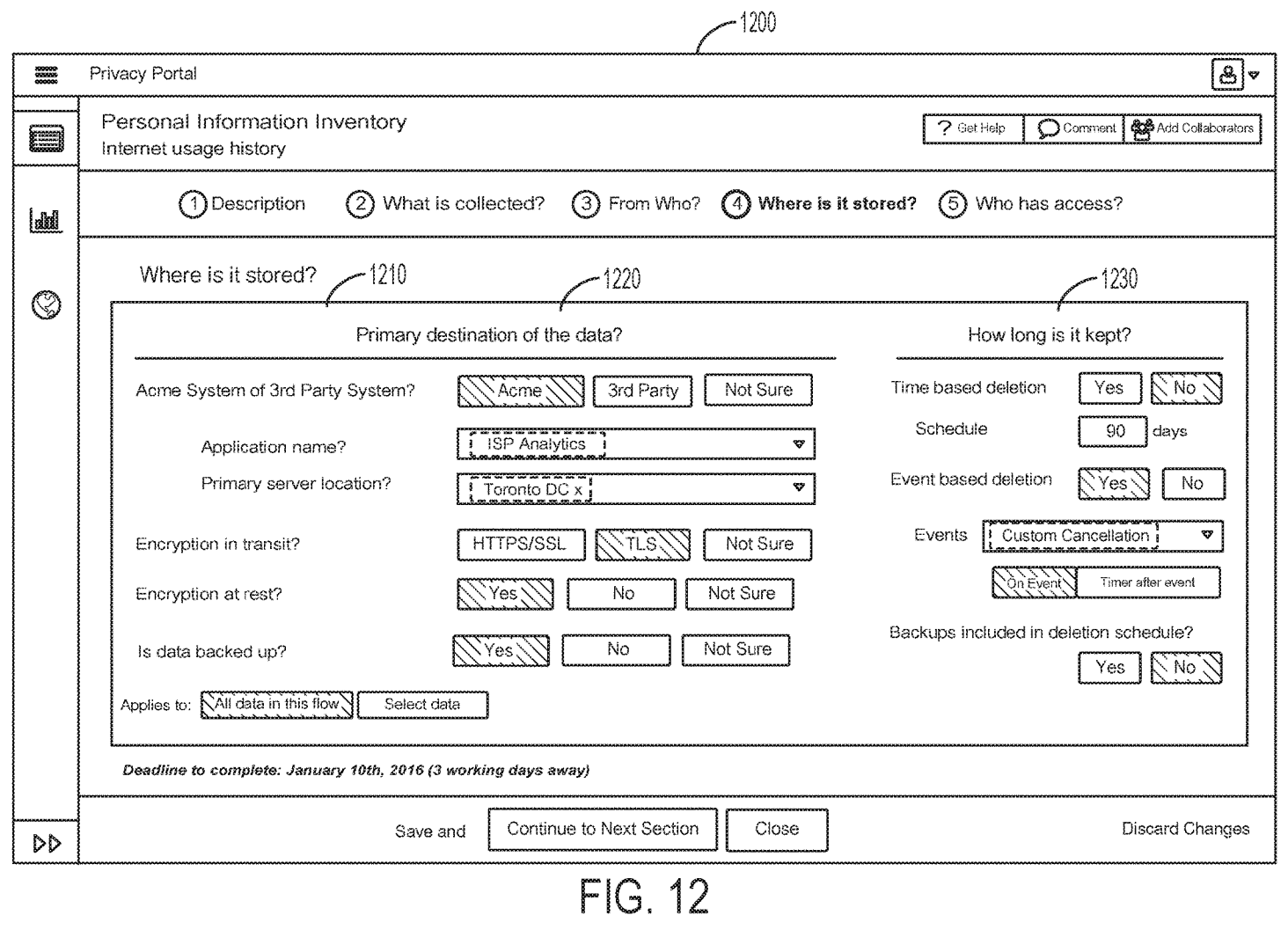

E. FIG. 12: Where is the Personal Data Stored

FIG. 12 shows an example "Storage Entry" dialog screen 1200, which is a graphical user interface that a user may use to indicate where particular sensitive information is to be stored within the system. From this section, a user may specify, in this case for the Internet Usage History campaign, the primary destination of the personal data 1220 and how long the personal data is to be kept 1230. The personal data may be housed by the organization (in this example, an entity called "Acme") or a third party. The user may specify an application associated with the personal data's storage (in this example, ISP Analytics), and may also specify the location of computing systems (e.g., servers) that will be storing the personal data (e.g., a Toronto data center). Other selections indicate whether the data will be encrypted and/or backed up.

The system also allows the user to select whether the destination settings are applicable to all the personal data of the campaign, or just select data (and if so, which data). In FIG. 12, the user may also select and input options related to the retention of the personal data collected for the campaign (e.g., How Long Is It Kept 1230). The retention options may indicate, for example, that the campaign's personal data should be deleted after a per-determined period of time has passed (e.g., on a particular date), or that the campaign's personal data should be deleted in accordance with the occurrence of one or more specified events (e.g., in response to the occurrence of a particular event, or after a specified period of time passes after the occurrence of a particular event), and the user may also select whether backups should be accounted for in any retention schedule. For example, the user may specify that any backups of the personal data should be deleted (or, alternatively, retained) when the primary copy of the personal data is deleted.

F. FIG. 13: Who and What Systems have Access to Personal Data

FIG. 13 describes an example Access entry dialog screen 1300. As part of the process of adding a campaign or data flow, the user may specify in the "Who Has Access" section 1305 of the dialog screen 1300. In the example shown, the Customer Support, Billing, and Government groups within the organization are able to access the Internet Usage History personal data collected by the organization. Within each of these access groups, the user may select the type of each group, the format in which the personal data was provided, and whether the personal data is encrypted. The access level of each group may also be entered. The user may add additional access groups via the Add Group button 1310.

G. Facilitating Entry of Campaign Data, Including Chat Shown in FIG. 14

As mentioned above, to facilitate the entry of data collected through the example GUIs shown in FIGS. 8 through 12, in exemplary embodiments, the system is adapted to allow the owner of a particular campaign (or other user) to assign certain sections of questions, or individual questions, related to the campaign to contributors other than the owner. This may eliminate the need for the owner to contact other users to determine information that they don't know and then enter the information into the system themselves. Rather, in various embodiments, the system facilitates the entry of the requested information directly into the system by the assigned users.

In exemplary embodiments, after the owner assigns a respective responsible party to each question or section of questions that need to be answered in order to fully populate the data flow, the system may automatically contact each user (e.g., via an appropriate electronic message) to inform the user that they have been assigned to complete the specified questions and/or sections of questions, and provide those users with instructions as to how to log into the system to enter the data. The system may also be adapted to periodically follow up with each user with reminders until the user completes the designated tasks. As discussed elsewhere herein, the system may also be adapted to facilitate real-time text or voice communications between multiple collaborators as they work together to complete the questions necessary to define the data flow. Together, these features may reduce the amount of time and effort needed to complete each data flow.

To further facilitate collaboration, as shown FIG. 14, in exemplary embodiments, the System 100 is operable to overlay an instant messaging session over a GUI in which a user is presented with prompts to enter or select information. In FIG. 14, a communications module is operable to create an instant messaging session window 1405 that overlays the Access entry dialog screen 1400. In exemplary embodiments, the Communications Module, in response to a user request (e.g., depressing the "comment" button show in FIG. 9, FIG. 10, FIG. 11, FIG. 12, FIG. 13, FIG. 16), instantiates an instant messaging session and overlays the instant messaging session over one or more portions of the GUI.

H: FIG. 15: Campaign Inventory Page

After new campaigns have been added, for example using the exemplary processes explained in regard to FIGS. 8-13, the users of the system may view their respective campaign or campaigns, depending on whether they have access to the campaign. The chief privacy officer, or another privacy office representative, for example, may be the only user that may view all campaigns. A listing of all of the campaigns within the system may be viewed on, for example, inventory page 1500 (see below). Further details regarding each campaign may be viewed via, for example, campaign information page 1600, which may be accessed by selecting a particular campaign on the inventory page 1500. And any information related to the campaign may be edited or added through, for example, the edit campaign dialog 1700 screen (see FIG. 17). Certain fields or information may not be editable, depending on the particular user's level of access. A user may also add a new campaign using a suitable user interface, such as the graphical user interface shown in FIG. 15 or FIG. 16.

In example embodiments, the System 100 (and more particularly, the Main Privacy Compliance Module 400) may use the history of past entries to suggest selections for users during campaign creation and entry of associated data. As an example, in FIG. 10, if most entries that contain the term "Internet" and have John Doe as the business rep assigned to the campaign have the items Subscriber ID, IP Address, and MAC Address selected, then the items that are commonly used may display as pre-selected items the Subscriber ID, IP address, and MAC Address each time a campaign is created having Internet in its description and John Doe as its business rep.

FIG. 15 describes an example embodiment of an inventory page 1500 that may be generated by the Main Privacy Compliance Module 400. The inventory page 1500 may be represented in a graphical user interface. Each of the graphical user interfaces (e.g., webpages, dialog boxes, etc.) presented in this application may be, in various embodiments, an HTML-based page capable of being displayed on a web browser (e.g., Firefox, Internet Explorer, Google Chrome, Opera, etc.), or any other computer-generated graphical user interface operable to display information, including information having interactive elements (e.g., an iOS, Mac OS, Android, Linux, or Microsoft Windows application). The webpage displaying the inventory page 1500 may include typical features such as a scroll-bar, menu items, as well as buttons for minimizing, maximizing, and closing the webpage. The inventory page 1500 may be accessible to the organization's chief privacy officer, or any other of the organization's personnel having the need, and/or permission, to view personal data.

Still referring to FIG. 15, inventory page 1500 may display one or more campaigns listed in the column heading Data Flow Summary 1505, as well as other information associated with each campaign, as described herein. Some of the exemplary listed campaigns include Internet Usage History 1510, Customer Payment Information, Call History Log, Cellular Roaming Records, etc. A campaign may represent, for example, a business operation that the organization is engaged in may require the use of personal data, which may include the personal data of a customer. In the campaign Internet Usage History 1510, for example, a marketing department may need customers' on-line browsing patterns to run analytics. Examples of more information that may be associated with the Internet Usage History 1510 campaign will be presented in FIG. 4 and FIG. 5. In example embodiments, clicking on (i.e., selecting) the column heading Data Flow Summary 1505 may result in the campaigns being sorted either alphabetically, or reverse alphabetically.

The inventory page 1500 may also display the status of each campaign, as indicated in column heading Status 1515. Exemplary statuses may include "Pending Review", which means the campaign has not been approved yet, "Approved," meaning the data flow associated with that campaign has been approved, "Audit Needed," which may indicate that a privacy audit of the personal data associated with the campaign is needed, and "Action Required," meaning that one or more individuals associated with the campaign must take some kind of action related to the campaign (e.g., completing missing information, responding to an outstanding message, etc.). In certain embodiments, clicking on (i.e., selecting) the column heading Status 1515 may result in the campaigns being sorted by status.

The inventory page 1500 of FIG. 15 may list the "source" from which the personal data associated with a campaign originated, under the column heading "Source" 1520. The sources may include one or more of the subjects 100 in example FIG. 1. As an example, the campaign "Internet Usage History" 1510 may include a customer's IP address or MAC address. For the example campaign "Employee Reference Checks", the source may be a particular employee. In example embodiments, clicking on (i.e., selecting) the column heading Source 1520 may result in the campaigns being sorted by source.

The inventory page 1500 of FIG. 15 may also list the "destination" of the personal data associated with a particular campaign under the column heading Destination 1525. Personal data may be stored in any of a variety of places, for example on one or more storage devices 280 that are maintained by a particular entity at a particular location. Different custodians may maintain one or more of the different storage devices. By way of example, referring to FIG. 15, the personal data associated with the Internet Usage History campaign 1510 may be stored in a repository located at the Toronto data center, and the repository may be controlled by the organization (e.g., Acme corporation) or another entity, such as a vendor of the organization that has been hired by the organization to analyze the customer's internet usage history. Alternatively, storage may be with a department within the organization (e.g., its marketing department). In example embodiments, clicking on (i.e., selecting) the column heading Destination 1525 may result in the campaigns being sorted by destination.

On the inventory page 1500, the Access heading 1530 may show the number of transfers that the personal data associated with a campaign has undergone. In example embodiments, clicking on (i.e., selecting) the column heading "Access" 1530 may result in the campaigns being sorted by Access.

The column with the heading Audit 1535 shows the status of any privacy audits associated with the campaign. Privacy audits may be pending, in which an audit has been initiated but yet to be completed. The audit column may also show for the associated campaign how many days have passed since a privacy audit was last conducted for that campaign. (e.g., 140 days, 360 days). If no audit for a campaign is currently required, an "OK" or some other type of indication of compliance (e.g., a "thumbs up" indicia) may be displayed for that campaign's audit status. Campaigns may also be sorted based on their privacy audit status by selecting or clicking on the Audit heading 1535.

In example inventory page 1500, an indicator under the heading Risk 1540 may also display an indicator as to the Risk Level associated with the personal data for a particular campaign. As described earlier, a risk assessment may be made for each campaign based on one or more factors that may be obtained by the system. The indicator may, for example, be a numerical score (e.g., Risk Level of the campaign), or, as in the example shown in FIG. 15, it may be arrows that indicate the Overall Risk Assessment for the campaign. The arrows may be of different shades or different colors (e.g., red arrows indicating "high risk" campaigns, yellow arrows indicating "medium risk" campaigns, and green arrows indicating "low risk" campaigns). The direction of the arrows—for example, pointing upward or downward, may also provide a quick indication of Overall Risk Assessment for users viewing the inventory page 1500. Each campaign may be sorted based on the Risk Level associated with the campaign.

The example inventory page 1500 may comprise a filter tool, indicated by Filters 1545, to display only the campaigns having certain information associated with them. For example, as shown in FIG. 15, under Collection Purpose 1550, checking the boxes "Commercial Relations," "Provide Products/Services", "Understand Needs," "Develop Business & Ops," and "Legal Requirement" will result the display under the Data Flow Summary 1505 of only the campaigns that meet those selected collection purpose requirements.

From example inventory page 1500, a user may also add a campaign by selecting (i.e., clicking on) Add Data Flow 1555. Once this selection has been made, the system initiates a routine to guide the user in a phase-by-phase manner through the process of creating a new campaign (further details herein). An example of the multi-phase GUIs in which campaign data associated with the added privacy campaign may be input and associated with the privacy campaign record is described in FIG. 8-13 above.

From the example inventory page 1500, a user may view the information associated with each campaign in more depth, or edit the information associated with each campaign. To do this, the user may, for example, click on or select the name of the campaign (i.e., click on Internet Usage History 1510). As another example, the user may select a button displayed on screen indicating that the campaign data is editable (e.g., edit button 1560).

I: FIG. 16: Campaign Information Page and Data Flow Diagram

FIG. 16 shows an example of information associated with each campaign being displayed in a campaign information page 1600. Campaign information page 1600 may be accessed by selecting (i.e., clicking on), for example, the edit button 1560. In this example, Personal Data Collected section 1605 displays the type of personal data collected from the customer for the campaign Internet Usage History. The type of personal data, which may be stored as data elements associated with the Internet Usage History campaign digital record entry. The type of information may include, for example, the customer's Subscriber ID, which may be assigned by the organization (e.g., a customer identification number, customer account number). The type of information may also include data associated with a customer's premises equipment, such as an IP Address, MAC Address, URL History (i.e., websites visited), and Data Consumption (i.e., the number of megabytes or gigabytes that the user has download).

Still referring to FIG. 16, the "About this Data Flow" section 1610 displays relevant information concerning the campaign, such as the purpose of the campaign. In this example, a user may see that the Internet Usage History campaign is involved with the tracking of internet usage from customers in order to bill appropriately, manage against quotas, and run analytics. The user may also see that the business group that is using the sensitive information associated with this campaign is the Internet group. A user may further see that the next privacy audit is scheduled for Jun. 10, 2016, and that the last update of the campaign entry was Jan. 2, 2015. The user may also select the "view history" hyperlink to display the history of the campaign.

FIG. 16 also depicts an example of a Data Flow Diagram 1615 generated by the system, based on information provided for the campaign. The Data Flow Diagram 1615 may provide the user with a large amount of information regarding a particular campaign in a single compact visual. In this example, for the campaign Internet Usage History, the user may see that the source of the personal data is the organization's customers. In example embodiments, as illustrated, hovering the cursor (e.g., using a touchpad, or a mouse) over the term "Customers" may cause the system to display the type of sensitive information obtained from the respective consumers, which may correspond with the information displayed in the "Personal Data Collected" section 1605.

In various embodiments, the Data Flow Diagram 1615 also displays the destination of the data collected from the User (in this example, an Internet Usage Database), along with associated parameters related to backup and deletion. The Data Flow Diagram 1615 may also display to the user which department(s) and what system(s) have access to the personal data associated with the campaign. In this example, the Customer Support Department has access to the data, and the Billing System may retrieve data from the Internet Usage Database to carry out that system's operations. In the Data Flow Diagram 1615, one or more security indicators may also be displayed. The may include, for example, an "eye" icon to indicate that the data is confidential, a "lock" icon to indicate that the data, and/or a particular flow of data, is encrypted, or an "unlocked lock" icon to indicate that the data, and/or a particular flow of data, is not encrypted. In the example shown in FIG. 16, the dotted arrow lines generally depict respective flows of data and the locked or unlocked lock symbols indicate whether those data flows are encrypted or unencrypted.

Campaign information page 1600 may also facilitate communications among the various personnel administrating the campaign and the personal data associated with it. Collaborators may be added through the Collaborators button 1625. The system may draw information from, for example, an active directory system, to access the contact information of collaborators.

If comment 1630 is selected, a real-time communication session (e.g., an instant messaging session) among all (or some) of the collaborators may be instantiated and overlaid on top of the page 1600. This may be helpful, for example, in facilitating population of a particular page of data by multiple users. In example embodiments, the Collaborators 1625 and Comments 1630 button may be included on any graphical user interface described herein, including dialog boxes in which information is entered or selected. Likewise, any instant messaging session may be overlaid on top of a webpage or dialog box. The system may also use the contact information to send one or more users associated with the campaign periodic updates, or reminders. For example, if the deadline to finish entering the campaign data associated with a campaign is upcoming in three days, the business representative of that assigned campaign may be sent a message reminding him or her that the deadline is in three days.

Like inventory page 1500, campaign information page 1600 also allows for campaigns to be sorted based on risk (e.g., Sort by Risk 1635). Thus, for example, a user is able to look at the information for campaigns with the highest risk assessment.

J: FIG. 17: Edit Campaign Dialog

FIG. 17 depicts an example of a dialog box—the edit campaign dialog 1700. The edit campaign dialog 1700 may have editable fields associated with a campaign. In this example, the information associated with the Internet Usage History campaign may be edited via this dialog. This includes the ability for the user to change the name of the campaign, the campaign's description, the business group, the current owner of the campaign, and the particular personal data that is associated with the campaign (e.g., IP address, billing address, credit score, etc.). In example embodiments, the edit campaign dialog 1700 may also allow for the addition of more factors, checkboxes, users, etc.

The system 100 also includes a Historical Record Keeping Module, wherein every answer, change to answer, as well as assignment/re-assignment of owners and collaborators is logged for historical record keeping.

Automated Approach to Demonstrating Privacy By Design, and Integration with Software Development and Agile Tools for Privacy Design In particular embodiments, privacy by design can be used in the design phase of a product (e.g., hardware or software), which is a documented approach to managing privacy risks. One of the primary concepts is evaluating privacy impacts, and making appropriate privacy-protecting changes during the design of a project, before the project go-live.

In various embodiments, the system is adapted to automate this process with the following capabilities: (1) initial assessment; (2) gap analysis/recommended steps; and/or (3) final/updated assessment. These capabilities are discussed in greater detail below.

Initial Assessment

In various embodiments, when a business team within a particular organization is planning to begin a privacy campaign, the system presents the business team with a set of assessment questions that are designed to help one or more members of the organization's privacy team to understand what the business team's plans are, and to understand whether the privacy campaign may have a privacy impact on the organization. The questions may also include a request for the business team to provide the "go-live" date, or implementation date, for the privacy campaign. In response to receiving the answers to these questions, the system stores the answers to the system's memory and makes the answers available to the organization's privacy team. The system may also add the "go-live" date to one or more electronic calendars (e.g., the system's electronic docket).

In some implementations, the initial assessment can include an initial privacy impact assessment that evaluates one or more privacy impact features of the proposed design of the product. The initial privacy impact assessment incorporates the respective answers for the plurality of question/answer pairings in the evaluation of the one or more privacy impact features. The privacy impact features may, for example, be related to how the proposed design of the new product will collect, use, store, and/or manage personal data. One or more of these privacy impact features can be evaluated, and the initial privacy assessment can be provided to identify results of the evaluation.

Gap Analysis/Recommended Steps

After the system receives the answers to the questions, one or more members of the privacy team may review the answers to the questions. The privacy team may then enter, into the system, guidance and/or recommendations regarding the privacy campaign. In some implementations, the privacy team may input their recommendations into the privacy compliance software. In particular embodiments, the system automatically communicates the privacy team's recommendations to the business team and, if necessary, reminds one or more members of the business team to implement the privacy team's recommendations before the go-live date. The system may also implement one or more audits (e.g., as described above) to make sure that the business team incorporates the privacy team's recommendations before the "go-live" date.

The recommendations may include one or more recommended steps that can be related to modifying one or more aspects of how the product will collect, use, store, and/or manage personal data. The recommended steps may include, for example: (1) limiting the time period that personal data is held by the system (e.g., seven days); (2) requiring the personal data to be encrypted when communicated or stored; (3) anonymizing personal data; or (4) restricting access to personal data to a particular, limited group of individuals. The one or more recommended steps may be provided to address a privacy concern with one or more of the privacy impact features that were evaluated in the initial privacy impact assessment.

In response to a recommended one or more steps being provided (e.g., by the privacy compliance officers), the system may generate one or more tasks in suitable project management software that is used in managing the proposed design of the product at issue. In various embodiments, the one or more tasks may be tasks that, if recommended, would individually or collectively complete one or more (e.g., all of) the recommended steps. For example, if the one or more recommended steps include requiring personal data collected by the product to be encrypted, then the one or more tasks may include revising the product so that it encrypts any personal data that it collects.

The one or more tasks may include, for example, different steps to be performed at different points in the development of the product. In particular embodiments, the computer software application may also monitor, either automatically or through suitable data inputs, the development of the product to determine whether the one or more tasks have been completed.

Upon completion of each respective task in the one or more tasks, the system may provide a notification that the task has been completed. For example, the project management software may provide a suitable notification to the privacy compliance software that the respective task has been completed.

Final/Updated Assessment

Once the mitigation steps and recommendations are complete, the system may (e.g., automatically) conduct an updated review to assess any privacy risks associated with the revised product.

In particular embodiments, the system includes unique reporting and historical logging capabilities to automate Privacy-by-Design reporting and/or privacy assessment reporting. In various embodiments, the system is adapted to: (1) measure/analyze the initial assessment answers from the business team; (2) measure recommendations for the privacy campaign; (3) measure any changes that were implemented prior to the go-live date; (4) automatically differentiate between: (a) substantive privacy protecting changes, such as the addition of encryption, anonymization, or minimizations; and (b) non-substantive changes, such as spelling correction.

The system may also be adapted to generate a privacy assessment report showing that, in the course of a business's normal operations: (1) the business evaluates projects prior to go-live for compliance with one or more privacy-related regulations or policies; and (2) related substantive recommendations are made and implemented prior to go-live. This may be useful in documenting that privacy-by-design is being effectively implemented for a particular privacy campaign.

The privacy assessment report may, in various embodiments, include an updated privacy impact assessment that evaluates the one or more privacy impact features after the one or more recommended steps discussed above are implemented. The system may generate this updated privacy impact assessment automatically by, for example, automatically modifying any answers from within the question/answer pairings of the initial impact privacy assessment to reflect any modifications to the product that have been made in the course of completing the one or more tasks that implement the one or more substantive recommendations. For example, if a particular question from the initial privacy impact assessment indicated that certain personal data was personally identifiable data, and a recommendation was made to anonymize the data, the question/answer pairing for the particular question could be revised so the answer to the question indicates that the data has been anonymized. Any revised question/answer pairings may then be used to complete an updated privacy assessment report.

Figure 18A:
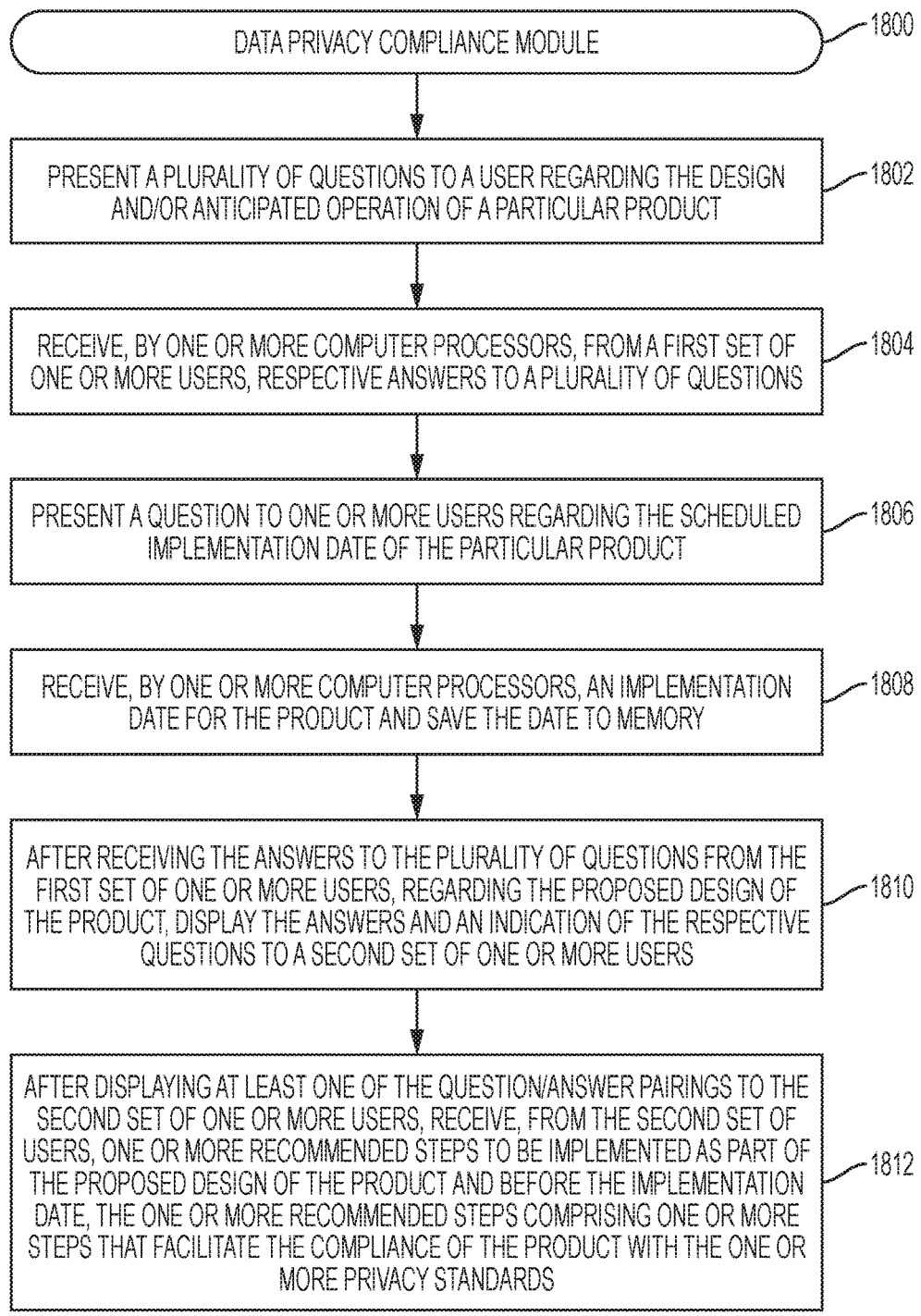
FIGS. 18A-18B depict a flow chart showing an example of a process performed by the Data Privacy Compliance Module.
Figure 18B:
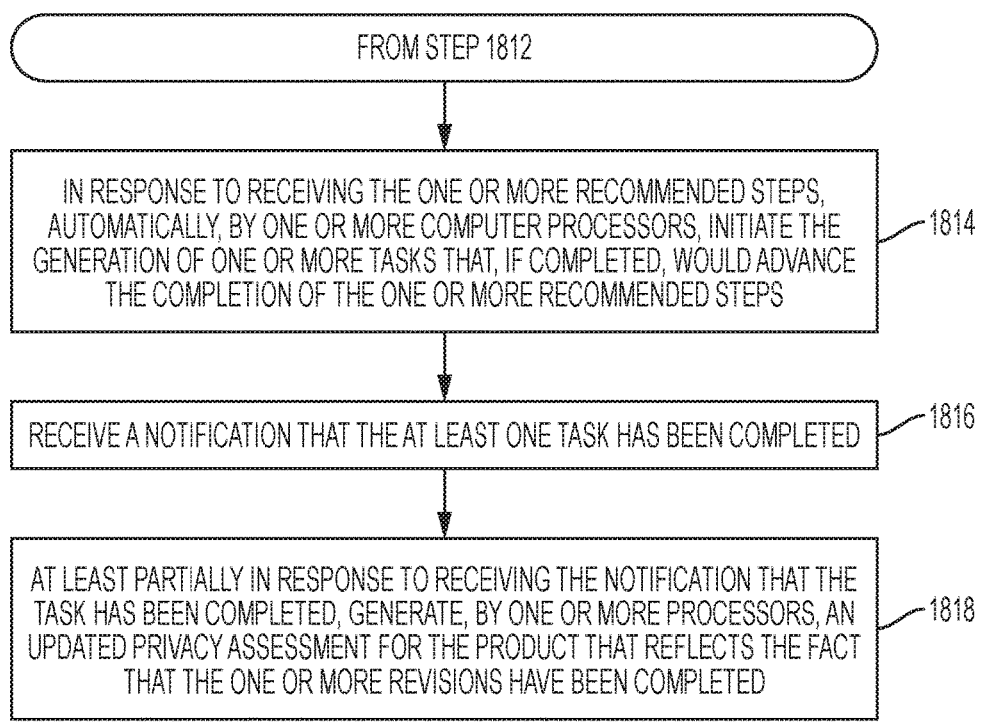

FIGS. 18A and 18B show an example process performed by a Data Privacy Compliance Module 1800. In executing the Data Privacy Compliance Module 1800, the system begins at Step 1802, where it presents a series of questions to a user (e.g., via a suitable computer display screen or other user-interface, such as a voice-interface) regarding the design and/or anticipated operation of the product. This may be done, for example, by having a first software application (e.g., a data privacy software application or other suitable application) present the user with a template of questions regarding the product (e.g., for use in conducting an initial privacy impact assessment for the product). Such questions may include, for example, data mapping questions and other questions relevant to the product's design and/or anticipated operation.

Next, the at Step 1804, the system receives, via a first computer software application, from a first set of one or more users (e.g., product designers, such as software designers, or other individuals who are knowledgeable about the product), respective answers to the questions regarding the product and associates the respective answers with their corresponding respective questions within memory to create a plurality of question/answer pairings regarding the proposed design of the product (e.g., software, a computerized electro-mechanical product, or other product).

Next, at Step 1806, the system presents a question to one or more users requesting the scheduled implantation date for the product. At Step 1808, the system receives this response and saves the scheduled implementation date to memory.

Next, after receiving the respective answers at Step 1804, the system displays, at Step 1810, the respective answers (e.g., along with their respective questions and/or a summary of the respective questions) to a second set of one or more users (e.g., one or more privacy officers from the organization that is designing the product), for example, in the form a plurality of suitable question/answer pairings. As an aside, within the context of this specification, pairings of an answer and either its respective question or a summary of the question may be referred to as a "question/answer" pairing. As an example, the question "Is the data encrypted? and respective answer "Yes" may be represented, for example, in either of the following question/answer pairings: (1) "The data is encrypted"; and (2) "Data encrypted? Yes". Alternatively, the question/answer pairing may be represented as a value in a particular field in a data structure that would convey that the data at issue is encrypted.

The system then advances to Step 1812, where it receives, from the second set of users, one or more recommended steps to be implemented as part of the proposed design of the product and before the implementation date, the one or more recommended steps comprising one or more steps that facilitate the compliance of the product with the one or more privacy standards and/or policies. In particular embodiments in which the product is a software application or an electro-mechanical device that runs device software, the one or more recommended steps may comprise modifying the software application or device software to comply with one or more privacy standards and/or policies.

Next, at Step 1814, in response to receiving the one or more recommended steps, the system automatically initiates the generation of one or more tasks in a second computer software application (e.g., project management software) that is to be used in managing the design of the product. In particular embodiments, the one or more tasks comprise one or more tasks that, if completed, individually and/or collectively would result in the completion of the one or more recommended steps. The system may do this, for example, by facilitating communication between the first and second computer software applications via a suitable application programming interface (API).

The system then initiates a monitoring process for determining whether the one or more tasks have been completed. This step may, for example, be implemented by automatically monitoring which changes (e.g., edits to software code) have been made to the product, or by receiving manual input confirming that various tasks have been completed.

Finally, at Step 1816, at least partially in response to the first computer software application being provided with the notification that the task has been completed, the system generates an updated privacy assessment for the product that reflects the fact that the task has been completed. The system may generate this updated privacy impact assessment automatically by, for example, automatically modifying any answers from within the question/answer pairings of the initial impact privacy assessment to reflect any modifications to the product that have been made in the course of completing the one or more tasks that implement the one or more substantive recommendations. For example, if a particular question from the initial privacy impact assessment indicated that certain personal data was personally-identifiable data, and a recommendation was made to anonymize the data, the question/answer pairing for the particular question could be revised so that the answer to the question indicates that the data has been anonymized. Any revised question/answer pairings may then be used to complete an updated privacy assessment report.

Figure 19A:
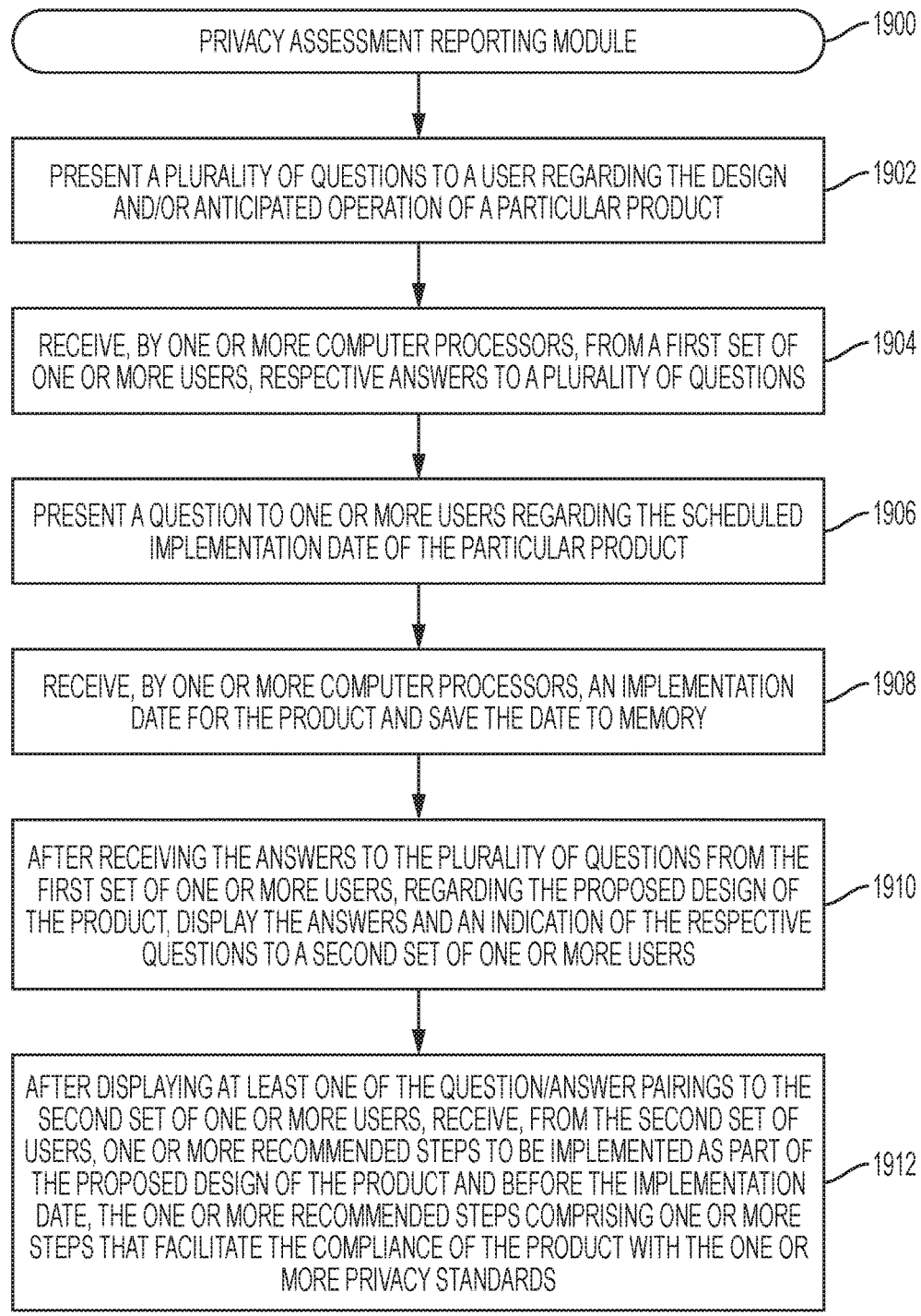
FIGS. 19A-19B depict a flow chart showing an example of a process performed by the Privacy Assessment Report Module.
Figure 19B:
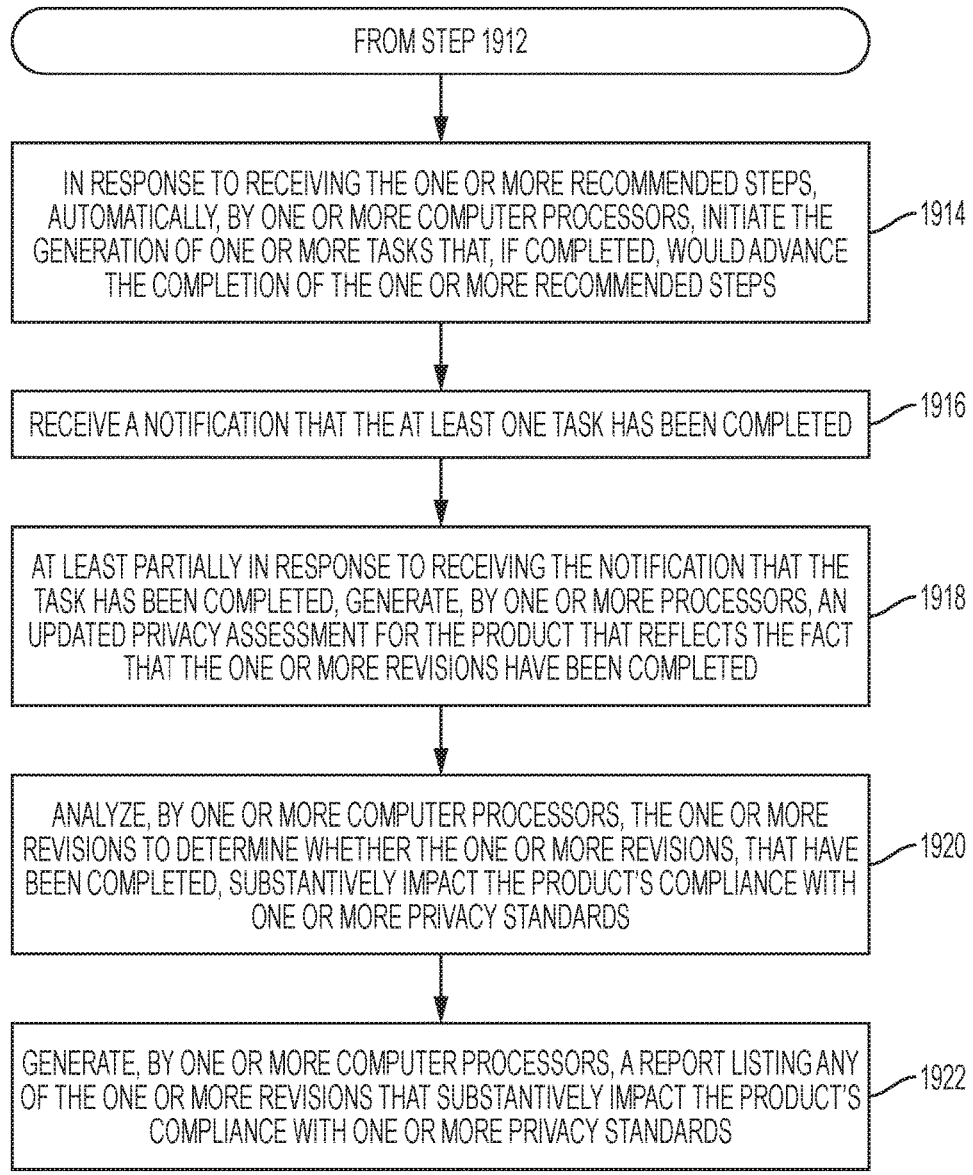

FIGS. 19A-19B depict the operation of a Privacy-By-Design Module 1900. In various embodiments, when the system executes the Privacy-By-Design Module 1900, the system begins, at Step 1902, where it presents a series of questions to a user (e.g., via a suitable computer display screen or other user-interface, such as a voice-interface) regarding the design and/or anticipated operation of the product. This may be done, for example, by having a first software application (e.g., a data privacy software application or other suitable application) present the user with a template of questions regarding the product (e.g., for use in conducting an initial privacy impact assessment for the product). Such questions may include, for example, data mapping questions and other questions relevant to the product's design and/or anticipated operation.

Next, the at Step 1904, the system receives, e.g., via a first computer software application, from a first set of one or more users (e.g., product designers, such as software designers, or other individuals who are knowledgeable about the product), respective answers to the questions regarding the product and associates the respective answers with their corresponding respective questions within memory to create a plurality of question/answer pairings regarding the proposed design of the product (e.g., software, a computerized electro-mechanical product, or other product).

Next, at Step 1906, the system presents a question to one or more users requesting the scheduled implantation date for the product. At Step 1908, the system receives this response and saves the scheduled implementation date to memory.

Next, after receiving the respective answers at Step 1904, the system displays, at Step 1910, the respective answers (e.g., along with their respective questions and/or a summary of the respective questions) to a second set of one or more users (e.g., one or more privacy officers from the organization that is designing the product), for example, in the form a plurality of suitable question/answer pairings. As an aside, within the context of this specification, pairings of an answer and either its respective question or a summary of the question may be referred to as a "question/answer" pairing. As an example, the question "Is the data encrypted? and respective answer "Yes" may be represented, for example, in either of the following question/answer pairings: (1) "The data is encrypted"; and (2) "Data encrypted? Yes". Alternatively, the question/answer pairing may be represented as a value in a particular field in a data structure that would convey that the data at issue is encrypted.

The system then advances to Step 1912, where it receives, from the second set of users, one or more recommended steps to be implemented as part of the proposed design of the product and before the implementation date, the one or more recommended steps comprising one or more steps that facilitate the compliance of the product with the one or more privacy standards and/or policies. In particular embodiments in which the product is a software application or an electro-mechanical device that runs device software, the one or more recommended steps may comprise modifying the software application or device software to comply with one or more privacy standards and/or policies.

Next, at Step 1914, in response to receiving the one or more recommended steps, the system automatically initiates the generation of one or more tasks in a second computer software application (e.g., project management software) that is to be used in managing the design of the product. In particular embodiments, the one or more tasks comprise one or more tasks that, if completed, individually and/or collectively would result in the completion of the one or more recommended steps.

The system then initiates a monitoring process for determining whether the one or more tasks have been completed. This step may, for example, be implemented by automatically monitoring which changes (e.g., edits to software code) have been made to the product, or by receiving manual input confirming that various tasks have been completed.

The system then advances to Step 1916, where it receives a notification that the at least one task has been completed. Next, at Step 1918, at least partially in response to the first computer software application being provided with the notification that the task has been completed, the system generates an updated privacy assessment for the product that reflects the fact that the task has been completed. The system may generate this updated privacy impact assessment automatically by, for example, automatically modifying any answers from within the question/answer pairings of the initial impact privacy assessment to reflect any modifications to the product that have been made in the course of completing the one or more tasks that implement the one or more substantive recommendations. For example, if a particular question from the initial privacy impact assessment indicated that certain personal data was personally-identifiable data, and a recommendation was made to anonymize the data, the question/answer pairing for the particular question could be revised so that the answer to the question indicates that the data has been anonymized. Any revised question/answer pairings may then be used to complete an updated privacy assessment report.

As discussed above, the system may then analyze the one or more revisions that have made to the product to determine whether the one or more revisions substantively impact the product's compliance with one or more privacy standards. Finally, the system generates a privacy-by-design report that may, for example, include a listing of any of the one or more revisions that have been made and that substantively impact the product's compliance with one or more privacy standards.

In various embodiments, the privacy-by-design report may also comprise, for example, a log of data demonstrating that the business, in the normal course of its operations: (1) conducts privacy impact assessments on new products before releasing them; and (2) implements any changes needed to comply with one or more privacy policies before releasing the new products. Such logs may include data documenting the results of any privacy impact assessments conducted by the business (and/or any particular sub-part of the business) on new products before each respective new product's launch date, any revisions that the business (and/or any particular sub-part of the business) make to new products before the launch of the product. The report may also optionally include the results of any updated privacy impact assessments conducted on products after the products have been revised to comply with one or more privacy regulations and/or policies. The report may further include a listing of any changes that the business has made to particular products in response to initial impact privacy assessment results for the products. The system may also list which of the listed changes were determined, by the system, to be substantial changes (e.g., that the changes resulted in advancing the product's compliance with one or more privacy regulations).

Additional Aspects of System

1. Standardized and Customized Assessment of Vendors' Compliance with Privacy and/or Security Policies In particular embodiments, the system may be adapted to: (1) facilitate the assessment of one or more vendors' compliance with one or more privacy and/or security policies; and (2) allow organizations (e.g., companies or other organizations) who do business with the vendors to create, view and/or apply customized criteria to information periodically collected by the system to evaluate each vendor's compliance with one or more of the company's specific privacy and/or security policies. In various embodiments, the system may also flag any assessments, projects, campaigns, and/or data flows that the organization has documented and maintained within the system if those data flows are associated with a vendor that has its rating changed so that the rating meets certain criteria (e.g., if the vendor's rating falls below a predetermined threshold).

In particular embodiments:

The system may include an online portal and community that includes a listing of all supported vendors.

An appropriate party (e.g., the participating vendor or a member of the on-line community) may use the system to submit an assessment template that is specific to a particular vendor.

If the template is submitted by the vendor itself, the template may be tagged in any appropriate way as "official"

An instance for each organization using the system (i.e., customer) is integrated with this online community/portal so that the various assessment templates can be directly fed into that organization's instance of the system if the organization wishes to use it.

Vendors may subscribe to a predetermined standardized assessment format.

Assessment results may also be stored in the central community/portal.

A third-party privacy and/or security policy compliance assessor, on a schedule, may (e.g., periodically) complete the assessment of the vendor.

Each organization using the system can subscribe to the results (e.g., once they are available).

Companies can have one or more customized rules set up within the system for interpreting the results of assessments in their own unique way. For example:

Each customer can weight each question within an assessment as desired and set up addition/multiplication logic to determine an aggregated risk score that takes into account the customized weightings given to each question within the assessment.

Based on new assessment results—the system may notify each customer if the vendor's rating falls, improves, or passes a certain threshold.

The system can flag any assessments, projects, campaigns, and/or data flows that the customer has documented and maintained within the system if those data flows are associated with a vendor that has its rating changed.

2. Privacy Policy Compliance System that Facilitates Communications with Regulators (Including Translation Aspect)

In particular embodiments, the system is adapted to interface with the computer systems of regulators (e.g., government regulatory agencies) that are responsible for approving privacy campaigns. This may, for example, allow the regulators to review privacy campaign information directly within particular instances of the system and, in some embodiments, approve the privacy campaigns electronically.

In various embodiments, the system may implement this concept by:

Exporting relevant data regarding the privacy campaign, from an organization's instance of the system (e.g., customized version of the system) in standardized format (e.g., PDF or Word) and sending the extracted data to an appropriate regulator for review (e.g., in electronic or paper format).

Either regular provides the format that the system codes to, or the organization associated with the system provides a format that the regulators are comfortable with.

Send secure link to regulator that gives them access to comment and leave feedback Gives the regulator direct access to the organization's instance of the system with a limited and restricted view of just the projects and associated audit and commenting logs the organization needs reviewed.

Regulator actions are logged historically and the regulator can leave guidance, comments, and questions, etc.

Have portal for regulator that securely links to the systems of their constituents.

Details:

When submitted—the PIAs are submitted with requested priority—standard or expedited.

DPA specifies how many expedited requests individuals are allowed to receive.

Either the customer or DPA can flag a PIA or associated comments/guidance on the PIA with "needs translation" and that can trigger an automated or manual language translation.

Regulator could be a DPA "data protection authority" in any EU country, or other country with similar concept like FTC in US, or OPC in Canada.

3. Systems/Methods for Measuring the Privacy Maturity of a Business Group within an Organization.

In particular embodiments, the system is adapted for automatically measuring the privacy of a business group, or other group, within a particular organization that is using the system. This may provide an automated way of measuring the privacy maturity, and one or more trends of change in privacy maturity of the organization, or a selected sub-group of the organization.

In various embodiments, the organization using the system can customize one or more algorithms used by the system to measure the privacy maturity of a business group (e.g., by specifying one or more variables and/or relative weights for each variable in calculating a privacy maturity score for the group). The following are examples of variables that may be used in this process:

Issues/Risks found in submitted assessments that are unmitigated or uncaught prior to the assessment being submitted to the privacy office % of privacy assessments with high issues/total assessments % with medium % with low Size and type of personal data used by the group Total assessments done Number of projects/campaigns with personal data Amount of personal data Volume of data transfers to internal and external parties Training of the people in the group Number or % of individuals who have watched training, readings, or videos Number or % of individuals who have completed quizzes or games for privacy training Number or % of individuals who have attended privacy events either internally or externally Number or % of individuals who are members of IAPP Number or % of individuals who have been specifically trained in privacy either internally or externally, formally (IAPP certification) or informally Usage of an online version of the system, or mobile training or communication portal that customer has implemented Other factors

4. Automated Assessment of Compliance (Scan App or Website to Determine Behavior/Compliance with Privacy Policies)

In various embodiments, instead of determining whether an organization complies with the defined parameters of a privacy campaign by, for example, conducting an audit as described above (e.g., by asking users to answer questions regarding the privacy campaign, such as "What is collected" "what cookies are on your website", etc.), the system may be configured to automatically determine whether the organization is complying with one or more aspects of the privacy policy.

For example, during the audit process, the system may obtain a copy of a software application (e.g., an "app") that is collecting and/or using sensitive user information, and then automatically analyze the app to determine whether the operation of the app is complying with the terms of the privacy campaign that govern use of the app.

Similarly, the system may automatically analyze a website that is collecting and/or using sensitive user information to determine whether the operation of the web site is complying with the terms of the privacy campaign that govern use of the web site.

In regard to various embodiments of the automatic application-analyzing embodiment referenced above:
- The typical initial questions asked during an audit may be replaced by a request to "Upload your app here".
  - After the app is uploaded to the system, the system detects what privacy permissions and data the app is collecting from users.
  - This is done by having the system use static or behavioral analysis of the application, or by having the system integrate with a third-party system or software (e.g., Veracode), which executes the analysis.
  - During the analysis of the app, the system may detect, for example, whether the app is using location services to detect the location of the user's mobile device.
  - In response to determining that the app is collecting one or more specified types of sensitive information (e.g., the location of the user's mobile device), the system may automatically request follow up information from the user by posing one or more questions to the user, such as:
  - For what business reason is the data being collected?
  - How is the user's consent given to obtain the data?
  - Would users be surprised that the data is being collected?
  - Is the data encrypted at rest and/or in motion?
  - What would happen if the system did not collect this data? What business impact would it have?
  - In various embodiments, the system is adapted to allow each organization to define these follow-up questions, but the system asks the questions (e.g., the same questions, or a customized list of questions) for each privacy issue that is found in the app.
  - In various embodiments, after a particular app is scanned a first time, when the app is scanned, the system may only detect and analyze any changes that have been made to the app since the previous scan of the app.
  - In various embodiments, the system is adapted to (optionally) automatically monitor (e.g., continuously monitor) one or more online software application marketplaces (such as Microsoft, Google, or Apple's App Store) to determine whether the application has changed. If so, the system may, for example: (1) automatically scan the application as discussed above; and (2) automatically notify one or more designated individuals (e.g., privacy office representatives) that an app was detected that the business failed to perform a privacy assessment on prior to launching the application.

In regard to various embodiments of the automatic application-analyzing embodiment referenced above:
- The system prompts the user to enter the URL of the website to be analyzed, and, optionally, the URL to the privacy policy that applies to the web site.
- The system then scans the website for cookies, and/or other tracking mechanisms, such as fingerprinting technologies and/or 3rd party SDKs.
  - The system may then optionally ask the user to complete a series of one or more follow-up questions for each of these items found during the scan of the website.
  - This may help the applicable privacy office craft a privacy policy to be put on the website to disclose the use of the tracking technologies and SDK's used on the website.
- The system may then start a continuous monitoring of the website site to detect whether any new cookies, SDKs, or tracking technologies are used. In various embodiments, the system is configured to, for example, generate an alert to an appropriate individual (e.g., a designated privacy officer) to inform them of the change to the website. The privacy officer may use this information, for example, to determine whether to modify the privacy policy for the website or to coordinate discontinuing use of the new tracking technologies and/or SDK's.
- In various embodiments, the system may also auto-detect whether any changes have been made to the policy or the location of the privacy policy link on the page and, in response to auto-detecting such changes, trigger an audit of the project.
- It should be understood that the above methods of automatically assessing behavior and/or compliance with one or more privacy policies may be done in any suitable way (e.g., ways other than website scanning and app scanning). For example, the system may alternatively, or in addition, automatically detect, scan and/or monitor any appropriate technical system(s) (e.g., computer system and/or system component or software), cloud services, apps, websites and/or data structures, etc.

5. System Integration with DLP Tools.

DLP tools are traditionally used by information security professionals. Various DLP tools discover where confidential, sensitive, and/or personal information is stored and use various techniques to automatically discover sensitive data within a particular computer system—for example, in emails, on a particular network, in databases, etc. DLP tools can detect the data, what type of data, the amount of data, and whether the data is encrypted. This may be valuable for security professionals, but these tools are typically not useful for privacy professionals because the tools typically cannot detect certain privacy attributes that are required to be known to determine whether an organization is in compliance with particular privacy policies.

For example, traditional DLP tools cannot typically answer the following questions:
- Who was the data collected from (data subject)?
- Where are those subjects located?

Are they minors?
How was consent to use the data received?
What is the use of the data?
Is the use consistent with the use specified at the time of consent?
What country is the data stored in and/or transferred to?
Etc.

In various embodiments, the system is adapted to integrate with appropriate DLP and/or data discovery tools (e.g., INFORMATICA) and, in response to data being discovered by those tools, to show each area of data that is discovered as a line-item in a system screen via integration.

The system may do this, for example, in a manner that is similar to pending transactions in a checking account that have not yet been reconciled.

A designated privacy officer may then select one of those—and either match it up (e.g., reconcile it) with an existing data flow or campaign in the system OR trigger a new assessment to be done on that data to capture the privacy attributes and data flow.

6. System for Generating an Organization's Data Map by Campaign, by System, or by Individual Data Attributes.

In particular embodiments, the system may be adapted to allow users to specify various criteria, and then to display, to the user, any data maps that satisfy the specified criteria. For example, the system may be adapted to display, in response to an appropriate request: (1) all of a particular customer's data flows that are stored within the system; (2) all of the customer's data flows that are associated with a particular campaign; and/or (3) all of the customer's data flows that involve a particular address.

Similarly, the system may be adapted to allow privacy officers to document and input the data flows into the system in any of a variety of different ways, including:
Document by process
The user initiates an assessment for a certain business project and captures the associated data flows (including the data elements related to the data flows and the systems they are stored in).
Document by element
The user initiates an audit of a data element—such as SSN—and tries to identify all data structures associated with the organization that include the SSN. The system may then document this information (e.g., all of the organization's systems and business processes that involve the business processes.)
Document by system
The user initiates an audit of a database, and the system records, in memory, the results of the audit.

7. Privacy Policy Compliance System that Allows Users to Attach Emails to Individual Campaigns.

Privacy officers frequently receive emails (or other electronic messages) that are associated with an existing privacy assessment or campaign, or a potential future privacy assessment. For record keeping and auditing purposes, the privacy officer may wish to maintain those emails in a central storage location, and not in email. In various embodiments, the system is adapted to allow users to automatically attach the email to an existing privacy assessment, data flow, and/or privacy campaign. Alternatively or additionally, the system may allow a user to automatically store emails within a data store associated with the system, and to store the emails as "unassigned", so that they may later be assigned to an existing privacy assessment, data flow, and/or privacy campaign.

In various embodiments, the system is adapted to allow a user to store an email using:
a browser plugin-extension that captures webmail;
a Plug-in directly with office 365 or google webmail (or other suitable email application);
a Plug-in with email clients on computers such as Outlook;
via an integrated email alias that the email is forwarded to; or
any other suitable configuration 8. Various Aspects of Related Mobile Applications In particular embodiments, the system may use a mobile app (e.g., that runs on a particular mobile device associated by a user) to collect data from a user. The mobile app may be used, for example, to collect answers to screening questions. The app may also be adapted to allow users to easily input data documenting and/or reporting a privacy incident. For example, the app may be adapted to assist a user in using their mobile device to capture an image of a privacy incident (e.g., a screen shot documenting that data has been stored in an improper location, or that a printout of sensitive information has been left in a public workspace within an organization.)

The mobile app may also be adapted to provide incremental training to individuals. For example, the system may be adapted to provide incremental training to a user (e.g., in the form of the presentation of short lessons on privacy). Training sessions may be followed by short quizzes that are used to allow the user to assess their understanding of the information and to confirm that they have completed the training.

9. Automatic Generation of Personal Data Inventory for Organization

In particular embodiments, the system is adapted to generate and display an inventory of the personal data that an organization collects and stores within its systems (or other systems). As discussed above, in various embodiments, the system is adapted to conduct privacy impact assessments for new and existing privacy campaigns. During a privacy impact assessment for a particular privacy campaign, the system may ask one or more users a series of privacy impact assessment questions regarding the particular privacy campaign and then store the answers to these questions in the system's memory, or in memory of another system, such a third-party computer server.

Such privacy impact assessment questions may include questions regarding: (1) what type of data is to be collected as part of the campaign; (2) who the data is to be collected from; (3) where the data is to be stored; (4) who will have access to the data; (5) how long the data will be kept before being deleted from the system's memory or archived; and/or (6) any other relevant information regarding the campaign.

The system may store the above information, for example, in any suitable data structure, such as a database. In particular embodiments, the system may be configured to selectively (e.g., upon request by an authorized user) generate and display a personal data inventory for the organization that includes, for example, all of the organization's current active campaigns, all of the organization's current and past campaigns, or any other listing of privacy campaigns that, for example, satisfy criteria specified by a user. The system may be adapted to display and/or export the data inventory in any suitable format (e.g., in a table, a spreadsheet, or any other suitable format).

10. Integrated/Automated Solution for Privacy Risk Assessments

Continuing with Concept 9, above, in various embodiments, the system may execute multiple integrated steps to generate a personal data inventory for a particular organization. For example, in a particular embodiment, the system first conducts a Privacy Threshold Assessment (PTA) by asking a user a relatively short set of questions (e.g., between 1 and 15 questions) to quickly determine whether the risk associated with the campaign may potentially exceed a pre-determined risk threshold (e.g., whether the campaign is a potentially high-risk campaign). The system may do this, for example, by using any of the above techniques to assign a collective risk score to the user's answers to the questions and determining whether the collective risk score exceeds a particular risk threshold value. Alternatively, the system may be configured to determine that the risk associated with the campaign exceeds the risk threshold value if the user answers a particular one or more of the questions in a certain way.

The system may be configured for, in response to the user's answers to one or more of the questions within the Privacy Threshold Assessment indicating that the campaign exceeds, or may potentially exceed, a pre-determined risk threshold, presenting the user with a longer set of detailed questions regarding the campaign (e.g., a Privacy Impact Assessment). The system may then use the user's answers to this longer list of questions to assess the overall risk of the campaign, for example, as described above.

In particular embodiments, the system may be configured for, in response to the user's answers to one or more of the questions within the Privacy Threshold Assessment indicating that the campaign does not exceed, or does not potentially exceed, a pre-determined risk threshold, not presenting the user with a longer set of detailed questions regarding the campaign (e.g., a Privacy Impact Assessment). In such a case, the system may simply save an indication to memory that the campaign is a relatively low risk campaign.

Accordingly, in particular embodiments, the system may be adapted to automatically initiate a Privacy Impact Assessment if the results of a shorter Privacy Threshold Assessment satisfy certain criteria. Additionally, or alternatively, in particular embodiments, the system may be adapted to allow a privacy officer to manually initiate a Privacy Impact Assessment for a particular campaign.

In particular embodiments, built into the Privacy Threshold Assessment and the Privacy Impact Assessment are the data mapping questions and/or sub-questions of how the personal data obtained through the campaign will be collected, used, stored, accessed, retained, and/or transferred, etc. In particular embodiments: (1) one or more of these questions are asked in the Privacy Threshold Assessment; and (2) one or more of the questions are asked in the Privacy Impact Assessment. In such embodiments, the system may obtain the answers to each of these questions, as captured during the Privacy Threshold Assessment and the Privacy Impact Assessment, and then use the respective answers to generate the end-to-end data flow for the relevant privacy campaign.

The system may then link all of the data flows across all of the organization's privacy campaigns together in order to show a complete evergreen version of the personal data inventory of the organization. Thus, the system may efficiently generate the personal data inventory of an organization (e.g., through the use of reduced computer processing power) by automatically gathering the data needed to prepare the personal data inventory while conducting Privacy Threshold Assessments and Privacy Impact Assessments.

System for Preventing Individuals from Trying to Game the System

As discussed above, in particular embodiments, the system is adapted to display a series of threshold questions for particular privacy campaigns and to use conditional logic to assess whether to present additional, follow-up questions to the user. There may, for example, be situations in which a user may answer, or attempt to answer, one or more of the threshold questions incorrectly (e.g., dishonestly) in an attempt to avoid needing to answer additional questions. This type of behavior can present serious potential problems for the organization because the behavior may result in privacy risks associated with a particular privacy campaign being hidden due to the incorrect answer or answers.

To address this issue, in various embodiments, the system maintains a historical record of every button press (e.g., un-submitted system input) that an individual makes when a question is presented to them. In particular embodiments, actively monitoring the user's system inputs may include, for example, monitoring, recording, tracking, and/or otherwise taking account of the user's system inputs. These system inputs may include, for example: (1) one or more mouse inputs; (2) one or more keyboard (e.g., text) inputs; (3) one or more touch inputs; and/or (4) any other suitable inputs (e.g., such as one or more vocal inputs, etc.). In various embodiments, the system is configured to actively monitor the user's system inputs, for example: (1) while the user is viewing one or more graphical user interfaces for providing information regarding or responses to questions regarding one or more privacy campaigns; (2) while the user is logged into a privacy portal; and/or (3) in any other suitable situation related to the user providing information related to the collection or storage of personal data (e.g., in the context of a privacy campaign). Additionally, the system tracks, and saves to memory, each incidence of the individual changing their answer to a question (e.g., (a) before formally submitting the answer by pressing an "enter" key, or other "submit" key on a user interface, such as a keyboard or graphical user interface on a touch-sensitive display screen; or (b) after initially submitting the answer).

The system may also be adapted to automatically determine whether a particular question (e.g., threshold question) is a "critical" question that, if answered in a certain way, would cause the conditional logic trigger to present the user with one or more follow-up questions. For example, the system may, in response to receiving the user's full set of answers to the threshold questions, automatically identify any individual question within the series of threshold questions that, if answered in a particular way (e.g., differently than the user answered the question) would have caused the system to display one or more follow up questions. The system may then flag those identified questions, in the system's memory, as "critical" questions.

Alternatively, the system may be adapted to allow a user (e.g., a privacy officer of an organization) who is drafting a particular threshold question that, when answered in a particular way, will automatically trigger the system to display one or more follow up questions to the user, to indicate that is a "critical" threshold question. The system may then save this "critical" designation of the question to the system's computer memory.

In various embodiments, the system is configured, for any questions that are deemed "critical" (e.g., either by the system, or manually, as discussed above), to determine whether the user exhibited any abnormal behavior when answering the question. For example, the system may check to see whether the user changed their answer once, or multiple times, before submitting their answer to the question (e.g., by tracking the user's keystrokes while they are answering the threshold question, as described above). As another example, the system may determine whether it took the user longer than a pre-determined threshold amount of time (e.g., 5 minutes, 3 minutes, etc . . . ) to answer the critical threshold question.

In particular embodiments, the system may be adapted, in response to determining that the user exhibited abnormal behavior when answering the critical threshold question, to automatically flag the threshold question and the user's answer to that question for later follow up by a designated individual or team (e.g., a member of the organization's privacy team). In particular embodiments, the system may also, or alternatively, be adapted to automatically generate and transmit a message to one or more individuals (e.g., the organization's chief privacy officer) indicating that the threshold question may have been answered incorrectly and that follow-up regarding the question may be advisable. After receiving the message, the individual may, in particular embodiments, follow up with the individual who answered the question, or conduct other additional research, to determine whether the question was answered accurately.

In particular embodiments, the system is configured to monitor a user's context as the user provides responses for a computerized privacy questionnaire. The user context may take in to account a multitude of different user factors to incorporate information about the user's surroundings and circumstances. One user factor may be the amount of time a user takes to respond to one or more particular questions or the complete computerized privacy questionnaire. For example, if the user rushed through the computerized privacy questionnaire, the system may indicate that user abnormal behavior occurred in providing the one or more responses. In some implementations, the system may include a threshold response time for each question of the computerized privacy questionnaire (e.g., this may be a different threshold response time for each question) or the complete computerized privacy questionnaire. The system may compare the response time for each of the one or more responses to its associated threshold response time, and/or the system may compare the response time for completion of the computerized privacy questionnaire to the associated threshold response time for completion of the full computerized privacy questionnaire. The system may be configured to indicate that user abnormal behavior occurred in providing the one or more responses when either the response time is a longer period of time (e.g., perhaps indicating that the user is being dishonest) or shorter period of time (e.g., perhaps indicating that the user is rushing through the computerized privacy questionnaire and the responses may be inaccurate) than the threshold response time.

Another user factor may be a deadline for initiation or completion of the computerized privacy questionnaire. For example, if the user initiated or completed the computerized privacy questionnaire after a particular period of time (e.g., an initiation time or a completion time), the system may indicate that user abnormal behavior occurred in providing the one or more responses. The certain period of time may be preset, user-defined, and/or adjusted by the user, and may be a threshold time period. Additionally, in some implementations, the user factors may be adjusted based on one another. For example, if the user initiated the computerized privacy questionnaire close to a deadline for the computerized privacy questionnaire, then the threshold response time for each question of the computerized privacy questionnaire or the complete computerized privacy questionnaire may be modified (e.g., the threshold response time may be increased to ensure that the user does not rush through the privacy questionnaire close to the deadline).

Additionally, another user factor may incorporate a location in which the user conducted the privacy questionnaire. For example, if the user conducted the privacy questionnaire in a distracting location (e.g., at the movies or airport), the system may indicate that user abnormal behavior occurred. The system may use GPS tracking data associated with the electronic device (e.g., laptop, smart phone) on which the user conducted the privacy questionnaire to determine the location of the user. The system may include one or more particular locations or types of locations that are designated as locations in which the user may be distracted, or otherwise provide less accurate results. The locations may be specific to each user or the same locations for all users, and the locations may be adjusted (e.g., added, removed, or otherwise modified). The types of locations may be locations such as restaurants, entertainment locations, mass transportation points (e.g., airports, train stations), etc.

In particular embodiments, the system is configured to determine a type of connection via which the user is accessing the questionnaire. For example, the system may determine that the user is accessing the questionnaire while connect to a public wireless network (e.g., at an airport, coffee shop, etc.). The system may further determine that the user is connect to a wireless or other network such as a home network (e.g., at the user's house). In such examples, the system may determine that the user may be distracted based on a location inferred based on one or more connections identified for the computing device via which the user is accessing the questionnaire. In other embodiments, the system may determine that the user is connect via a company network (e.g., a network associated with the entity providing the questionnaire for completion). In such embodiments, the system may be configured to determine that the user is focused on the questionnaire (e.g., by virtue of the user being at work while completing it).

Moreover, another user factor may involve determining the electronic activities the user is performing on the user's electronic device while they are completing the privacy questionnaire. This factor may also be related to determining if the user is distracted when completing the privacy questionnaire. For example, the system may determine whether the user interacted, on the electronic device, with one or more web browsers or software applications that are unrelated to conducting the computerized privacy questionnaire (e.g., by determining whether the user accessed one or more other active browsing windows, or whether a browsing window in which the user is completing the questionnaire becomes inactive while the user us completing it). If the system determines that such unrelated electronic activities were interacted with, the system may indicate that user abnormal behavior occurred in completing the privacy questionnaire. Further, the electronic activities may be preset, user-specific, and/or modified. The user factors above are provided by way of example, and more, fewer, or different user factors may be included as part of the system. In some embodiments, the system may incorporate the user's electronic device camera to determine if the user is exhibiting abnormal behavior (e.g., pupils dilated/blinking a lot could indicate deception in responding to the privacy questionnaire).

In some implementations, the system may use one or more of the user factors to calculate a user context score.

Each of the user factors may include a user factor rating to indicate a likelihood that user abnormal behavior occurred with respect to that particular user factor. The user context score may be calculated based on each of the user factor ratings. In some embodiments, a weighting factor may be applied to each user factor (e.g., this may be specific for each organization) for the calculation of the user context score. Additionally, in some embodiments, if one or more user factor ratings is above a certain rating (i.e., indicating a very likelihood of user abnormal behavior for that particular user factor), then the user context score may automatically indicate that user abnormal behavior occurred in completing the privacy questionnaire. The user context score may be compared to a threshold user context score that may be preset, user or organization defined, and/or modified. If the system determines that the user context score is greater than the threshold user context score (i.e., indicates a higher likelihood of user abnormal behavior than the likelihood defined by threshold), then the system may indicate that user abnormal behavior occurred in conducting the privacy questionnaire.

In some implementations, the submitted input of the user to one or more responses may include a particular type of input that may cause the system to provide one or more follow up questions. The follow up questions may be provided for the user justify the particular type of input response that was provided. The particular type of input may be responses that are indefinite, indicate the user is unsure of the appropriate response (e.g., "I do not know"), or intimate that the user is potentially being untruthful in the response. For example, if the user provides a response of "I do not know" (e.g., by selecting in a list or inputting in a text box), the system may be configured to provided one or more follow up questions to further determine why the user "does not know" the answer to the specific inquiry or if the user is being truthful is saying they "do not know."

In some implementations, the system may, for each of the one or more responses to one or more questions in the computerized privacy questionnaire, determine a confidence factor score. The confidence factor score may be based on the user context of the user as the user provides the one or more responses and/or the one or more system inputs from the user the comprise the one or more responses. For example, if the user was in a distracting environment when the user provided a particular response in the privacy questionnaire and/or the user provided one or more unsubmitted inputs prior to providing the submitted input for the particular response, the system may calculate a low confidence factor score for the particular response.

Further, the system may calculate a confidence score for the computerized privacy questionnaire based at least in part on the confidence factor score for each of the one or more responses to one or more questions in the computerized privacy questionnaire. Upon calculating the confidence score, the system can use the confidence score to determine whether user abnormal behavior occurred in providing the one or more responses. In some implementations, a low confidence factor score for a single response may cause the confidence score of the privacy questionnaire to automatically indicate user abnormal behavior occurred in providing the privacy questionnaire. However, in other embodiments, this is not the case. For example, if only two out of twenty confidence factor scores are very low (i.e., indicate a higher likelihood of user abnormal behavior in providing the particular response), the system may determine, based on the calculated confidence score for the privacy questionnaire, that user abnormal behavior did not occur in completing the privacy questionnaire.

Privacy Assessment Monitoring Module

In particular embodiments, a Privacy Assessment Monitoring Module 2000 is configured to: (1) monitor user inputs when the user is providing information related to a privacy campaign or completing a privacy impact assessment; and (2) determine, based at least in part on the user inputs, whether the user has provided one or more abnormal inputs or responses. In various embodiments, the Privacy Assessment Monitoring Module 300 is configured to determine whether the user is, or may be, attempting to provide incomplete, false, or misleading information or responses related to the creation of a particular privacy campaign, a privacy impact assessment associated with a particular privacy campaign, etc.

Figure 20:
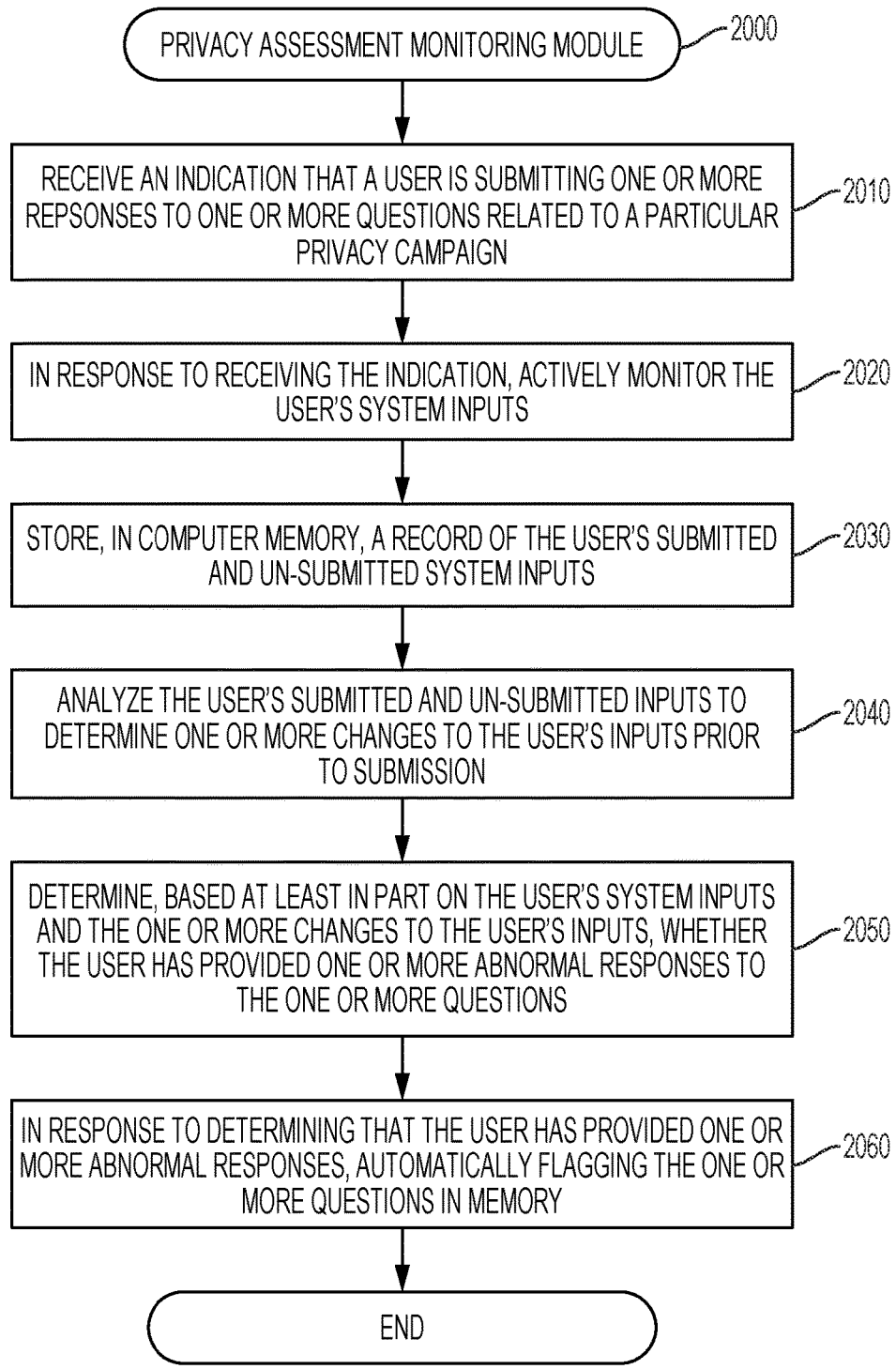
FIG. 20 is a flow chart showing an example of a process performed by the Privacy Assessment Monitoring Module according to particular embodiments.

Turning to FIG. 20, in particular embodiments, when executing the Privacy Assessment Monitoring Module 2000, the system begins, at Step 2010, by receiving an indication that a user is submitting one or more responses to one or more questions related to a particular privacy campaign. In various embodiments, the system is configured to receive the indication in response to a user initiating a new privacy campaign (e.g., on behalf of a particular organization, subgroup within the organization, or other suitable business unit). In other embodiments, the system is configured to receive the indication while a particular user is completing a privacy impact assessment for a particular privacy campaign, where the privacy impact assessment provides oversight into various aspects of the particular privacy campaign such as, for example: (1) what personal data is collected as part of the privacy campaign; (2) where the personal data is stored; (3) who has access to the stored personal data; (4) for what purpose the personal data is collected, etc.

In various embodiments, the system is configured to receive the indication in response to determining that a user has accessed a privacy campaign initiation system (e.g., or other privacy system) and is providing one or more pieces of information related to a particular privacy campaign. In particular embodiments, the system is configured to receive the indication in response to the provision, by the user, of one or more responses as part of a privacy impact assessment. In various embodiments, the system is configured to receive the indication in response to any suitable stimulus in any situation in which a user may provide one or more potentially abnormal responses to one or more questions related to the collection, storage or use of personal data.

In various embodiments, the privacy campaign may be associated with an electronic record (e.g., or any suitable data structure) comprising privacy campaign data. In particular embodiments, the privacy campaign data comprises a description of the privacy campaign, one or more types of personal data related to the campaign, a subject from which the personal data is collected as part of the privacy campaign, a storage location of the personal data (e.g., including a physical location of physical memory on which the personal data is stored), one or more access permissions associated with the personal data, and/or any other suitable data associated with the privacy campaign. In various embodiments, the privacy campaign data is provided by a user of the system.

An exemplary privacy campaign, project, or other activity may include, for example: (1) a new IT system for storing and accessing personal data (e.g., include new hardware and/or software that makes up the new IT system; (2) a data sharing initiative where two or more organizations seek to pool or link one or more sets of personal data; (3) a proposal to identify people in a particular group or demographic and initiate a course of action; (4) using existing data for a new and unexpected or more intrusive purpose; and/or (5) one or more new databases which consolidate information held by separate parts of the organization. In still other embodiments, the particular privacy campaign, project or other activity may include any other privacy campaign, project, or other activity discussed herein, or any other suitable privacy campaign, project, or activity.

During a privacy impact assessment for a particular privacy campaign, a privacy impact assessment system may ask one or more users (e.g., one or more individuals associated with the particular organization or sub-group that is undertaking the privacy campaign) a series of privacy impact assessment questions regarding the particular privacy campaign and then store the answers to these questions in the system's memory, or in memory of another system, such as a third-party computer server.

Such privacy impact assessment questions may include questions regarding, for example: (1) what type of data is to be collected as part of the campaign; (2) who the data is to be collected from; (3) where the data is to be stored; (4) who will have access to the data; (5) how long the data will be kept before being deleted from the system's memory or archived; and/or (6) any other relevant information regarding the campaign. In various embodiments a privacy impact assessment system may determine a relative risk or potential issues with a particular privacy campaign as it related to the collection and storage of personal data. For example, the system may be configured to identify a privacy campaign as being "High" risk, "Medium" risk, or "Low" risk based at least in part on answers submitted to the questions listed above. For example, a Privacy Impact Assessment that revealed that credit card numbers would be stored without encryption for a privacy campaign would likely cause the system to determine that the privacy campaign was high risk.

As may be understood in light of this disclosure, a particular organization may implement operational policies and processes that strive to comply with industry best practices and legal requirements in the handling of personal data. In various embodiments, the operational policies and processes may include performing privacy impact assessments (e.g., such as those described above) by the organization and/or one or more sub-groups within the organization. In particular embodiments, one or more individuals responsible for completing a privacy impact assessment or providing privacy campaign data for a particular privacy campaign may attempt to provide abnormal, misleading, or otherwise incorrect information as part of the privacy impact assessment. In such embodiments, the system may be configured to receive the indication in response to receiving an indication that a user has initiated or is performing a privacy impact assessment.

Returning to Step 2020, the system is configured to, in response to receiving the indication at Step 310, monitor (e.g., actively monitor) the user's system inputs. In particular embodiments, actively monitoring the user's system inputs may include, for example, monitoring, recording, tracking, and/or otherwise taking account of the user's system inputs. These system inputs may include, for example: (1) one or more mouse inputs; (2) one or more keyboard (e.g., text) inputs); (3) one or more touch inputs; and/or (4) any other suitable inputs (e.g., such as one or more vocal inputs, etc.). In various embodiments, the system is configured to actively monitor the user's system inputs, for example: (1) while the user is viewing one or more graphical user interfaces for providing information regarding or responses to questions regarding one or more privacy campaigns; (2) while the user is logged into a privacy portal; and/or (3) in any other suitable situation related to the user providing information related to the collection or storage of personal data (e.g., in the context of a privacy campaign). In other embodiments, the system is configured to monitor one or more biometric indicators associated with the user such as, for example, heart rate, pupil dilation, perspiration rate, etc.

In particular embodiments, the system is configured to monitor a user's inputs, for example, by substantially automatically tracking a location of the user's mouse pointer with respect to one or more selectable objects on a display screen of a computing device. In particular embodiments, the one or more selectable objects are one or more selectable objects (e.g., indicia) that make up part of a particular privacy impact assessment, privacy campaign initiation system, etc. In still other embodiments, the system is configured to monitor a user's selection of any of the one or more selectable objects, which may include, for example, an initial selection of one or more selectable objects that the user subsequently changes to selection of a different one of the one or more selectable objects.

In any embodiment described herein, the system may be configured to monitor one or more keyboard inputs (e.g., text inputs) by the user that may include, for example, one or more keyboard inputs that the user enters or one or more keyboard inputs that the user enters but deletes without submitting. For example, a user may type an entry relating to the creation of a new privacy campaign in response to a prompt that asks what reason a particular piece of personal data is being collected for. The user may, for example, initially begin typing a first response, but delete the first response and enter a second response that the user ultimately submits. In various embodiments of the system described herein, the system is configured to monitor the un-submitted first response in addition to the submitted second response.

In still other embodiments, the system is configured to monitor a user's lack of input. For example, a user may mouse over a particular input indicia (e.g., a selection from a drop-down menu, a radio button or other selectable indicia) without selecting the selection or indicia. In particular embodiments, the system is configured to monitor such inputs. As may be understood in light of this disclosure, a user that mouses over a particular selection and lingers over the selection without actually selecting it may be contemplating whether to: (1) provide a misleading response; (2) avoid providing a response that they likely should provide in order to avoid additional follow up questions; and/or (3) etc.

In other embodiments, the system is configured to monitor any other suitable input by the user. In various embodiments, this may include, for example: (1) monitoring one or more changes to an input by a user; (2) monitoring one or more inputs that the user later removes or deletes; (3) monitoring an amount of time that the user spends providing a particular input; and/or (4) monitoring or otherwise tracking any other suitable information related to the user's response to a particular question and/or provision of a particular input to the system.

Returning to Step 2030, the system is configured to store, in memory, a record of the user's submitted and un-submitted system inputs. As discussed above, the system may be configured to actively monitor both submitted and un-submitted inputs by the user. In particular embodiments, the system is configured to store a record of those inputs in computer memory (e.g., in the One or More Databases 140 shown in FIG. 1). In particular embodiments, storing the user's submitted and un-submitted system inputs may include, for example, storing a record of: (1) each system input made by the user; (2) an amount of time spent by the user in making each particular input; (3) one or more changes to one or more inputs made by the user; (4) an amount of time spent by the user to complete a particular form or particular series of questions prior to submission; and/or (5) any other suitable information related to the user's inputs as they may relate to the provision of information related to one or more privacy campaigns.

Continuing to Step 2040, the system is configured to analyze the user's submitted and un-submitted inputs to determine one or more changes to the user's inputs prior to submission. In particular embodiments, the system may, for example: (1) compare a first text input with a second text input to determine one or more differences, where the first text input is an unsubmitted input and the second text input is a submitted input; (2) determine one or more changes in selection, by the user, of a user-selectable input indicia (e.g., including a number of times the user changed a selection); and/or (3) compare any other system inputs by the user to determine one or more changes to the user's responses to one or more questions prior to submission. In various embodiments, the system is configured to determine whether the one or more changes include one or more changes that alter a meaning of the submitted and unsubmitted inputs.

In various embodiments, the system is configured to compare first, unsubmitted text input with second, submitted text input to determine whether the content of the second text input differs from the first text input in a meaningful way. For example, a user may modify the wording of their text input without substantially modifying the meaning of the input (e.g., to correct spelling, utilize one or more synonyms, correct punctuation, etc.). In this example, the system may determine that the user has not made meaningful changes to their provided input.

In another example, the system may determine that the user has changed the first input to the second input where the second input has a meaning that differs from a meaning of the first input. For example, the first and second text inputs may: (1) list one or more different individuals; (2) list one or more different storage locations; (3) include one or more words with opposing meanings (e.g., positive vs. negative, short vs. long, store vs. delete, etc.); and/or (4) include any other differing text that may indicate that the responses provided (e.g., the first text input and the second text input) do not have essentially the same meaning. In this example, the system may determine that the user has made one or more changes to the user's inputs prior to submission.

Returning to Step 2050, the system continues by determining, based at least in part on the user's system inputs and the one or more changes to the user's inputs, whether the user has provided one or more abnormal responses to the one or more questions. In various embodiments, the system is configured to determine whether the user has provided one or more abnormal responses to the one or more questions based on determining, at Step 2040, that the user has made one or more changes to a response prior to submitting the response (e.g., where the one or more changes alter a meaning of the response).

In other embodiments, the system is configured to determine that the user has provided one or more abnormal responses based on determining that the user took longer than a particular amount of time to provide a particular response. For example, the system may determine that the user has provided an abnormal response in response to the user taking longer than a particular amount of time (e.g., longer than thirty seconds, longer than one minute, longer than two minutes, etc.) to answer a simple multiple choice question (e.g., "Will the privacy campaign collect personal data for customers or employees?").

In particular embodiments, the system is configured to determine that the user has provided one or more abnormal responses based on a number of times that the user has changed a response to a particular question. For example, the system may determine a number of different selections made by the user when selecting one or more choices from a drop down menu prior to ultimately submitting a response. In another example, the system may determine a number of times the user changed their free-form text entry response to a particular question. In various embodiments, the system is configured to determine that the user provided one or more abnormal responses in response to determining that the user changed their response to a particular question more than a threshold number of times (e.g., one time, two times, three times, four times, five times, etc.).

In still other embodiments, the system is configured to determine that the user has provided one or more abnormal responses based at least in part on whether a particular question (e.g., threshold question) is a "critical" question. In particular embodiments, a critical question may include a question that, if answered in a certain way, would cause the system's conditional logic trigger to present the user with one or more follow-up questions. For example, the system may, in response to receiving the user's full set of answers to the threshold questions, automatically identify any individual question within the series of threshold questions that, if answered in a particular way (e.g., differently than the user answered the question) would have caused the system to display one or more follow up questions.

In various embodiments, the system is configured, for any questions that are deemed "critical" (e.g., either by the system, or manually) to determine whether the user exhibited any abnormal behavior when answering the question. For example, the system may check to see whether the user changed their answer once, or multiple times, before submitting their answer to the question (e.g., by tracking the user's keystrokes or other system inputs while they are answering the threshold question, as described above). As another example, the system may determine whether it took the user longer than a pre-determined threshold amount of time (e.g., 5 minutes, 3 minutes, etc.) to answer the critical threshold question.

In particular embodiments, the system is configured to determine whether the user provided one or more abnormal responses based on any suitable combination of factors described herein including, for example: (1) one or more changes to a particular response; (2) a number of changes to a particular response; (3) an amount of time it took to provide the particular response; (4) whether the response is a response to a critical question; and/or (5) any other suitable factor.

Continuing to Step 2060, the system, in response to determining that the user has provided one or more abnormal responses, automatically flags the one or more questions in memory. In particular embodiments, the system is configured to automatically flag the one or more questions in memory by associating the one or more questions in memory with a listing or index of flagged questions. In other embodiments, the system, in response to flagging the one or more questions, is further configured to generate a notification and transmit the notification to any suitable individual.

For example, the system may transmit a notification that one or more question have been flagged by a particular privacy officer or other individual responsible ensuring that a particular organization's collection and storage of personal data meets one or more legal or industry standards.

In particular embodiments, the system is configured to generate a report of flagged questions related to a particular privacy campaign. In various embodiments, flagging the one or more questions is configured to initiate a follow up by a designated individual or team (e.g., a member of the organization's privacy team) regarding the one or more questions. In particular embodiments, the system may also, or alternatively, be adapted to automatically generate and transmit a message to one or more individuals (e.g., the organization's chief privacy officer) indicating that the threshold question may have been answered incorrectly and that follow-up regarding the question may be advisable. After receiving the message, the individual may, in particular embodiments, follow up with the individual who answered the question, or conduct other additional research, to determine whether the question was answered accurately.

Privacy Assessment Modification Module

In particular embodiments, a Privacy Assessment Modification Module 2100 is configured to modify a questionnaire to include at least one additional question in response to determining that a user has provided one or more abnormal inputs or responses regarding a particular privacy campaign. For example, the system may, as discussed above, prompt the user to answer one or more follow up questions in response to determining that the user gave an abnormal response to a critical question. In particular embodiments, modifying the questionnaire to include one or more additional questions may prompt the user to provide more accurate responses which may, for example, limit a likelihood that a particular privacy campaign may run afoul of legal or industry-imposed restrictions on the collection and storage of personal data.

Figure 21:
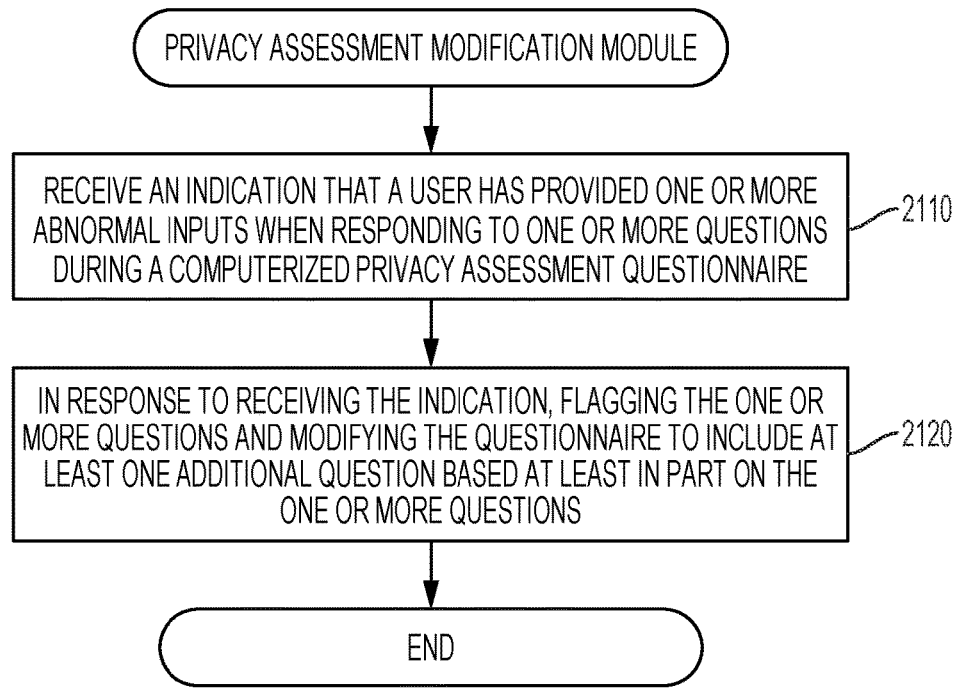
FIG. 21 is a flow chart showing an example of a process performed by the Privacy Assessment Modification Module.

Turning to FIG. 21, in particular embodiments, when executing the Privacy Assessment Modification Module 2100, the system begins, at Step 2110, by receiving an indication that a user has provided one or more abnormal inputs or responses to one or more questions during a computerized privacy assessment questionnaire. In particular embodiments, the system is configured to receive the indication in response to determining that the user has provided one or more abnormal responses to one or more questions as part of Step 2050 of the Privacy Assessment Monitoring Module 2000 described above.

Continuing to Step 2120, in response to receiving the indication, the system is configured to flag the one or more questions and modify the questionnaire to include at least one additional question based at least in part on the one or more questions. In various embodiments, the system is configured to modify the questionnaire to include at least one follow up question that relates to the one or more questions for which the user provided one or more abnormal responses. For example, the system may modify the questionnaire to include one or more follow up questions that the system would have prompted the user to answer if the user had submitted a response that the user had initially provided but not submitted. For example, a user may have initially provided a response that social security numbers would be collected as part of a privacy campaign but deleted that response prior to submitting what sort of personal data would be collected. The system may, in response to determining that the user had provided an abnormal response to that question, modify the questionnaire to include one or more additional questions related to why social security numbers would need to be collected (or to double check that they, in fact, would not be).

In other embodiments, the system is configured to take any other suitable action in response to determining that a user has provided one or more abnormal responses. The system may, for example: (1) automatically modify a privacy campaign; (2) flag a privacy campaign for review by one or more third party regulators; and/or (3) perform any other suitable action.

CONCLUSION

Although embodiments above are described in reference to various systems and methods for creating and managing data flows related to individual privacy campaigns, it should be understood that various aspects of the system described above may be applicable to other privacy-related systems, or to other types of systems, in general. For example, the functionality described above for obtaining the answers to various questions (e.g., assigning individual questions or sections of questions to multiple different users, facilitating collaboration between the users as they complete the questions, automatically reminding users to complete their assigned questions, and other aspects of the systems and methods described above) may be used within the context of Privacy Impact Assessments (e.g., in having users answer certain questions to determine whether a certain project complies with an organization's privacy policies).

While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Many modifications and other embodiments of the invention will come to mind to one skilled in the art to which this invention pertains having the benefit of the teachings presented in the foregoing descriptions and the associated drawings. While examples discussed above cover the use of various embodiments in the context of operationalizing privacy compliance and assessing risk of privacy campaigns, various embodiments may be used in any other suitable context. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A computer-implemented data processing method for monitoring one or more user inputs while a user provides one or more responses to one or more questions in a computerized privacy questionnaire, the method comprising:
    actively monitoring, by one or more processors, one or more system inputs from the user as the user provides the one or more responses to the one or more questions in a computerized privacy questionnaire, the one or more system inputs comprising one or more submitted inputs and one or more unsubmitted inputs, wherein actively monitoring the one or more system inputs comprises: (1) recording a first keyboard entry, provided within a graphical user interface, that occurs prior to submission of the one or more responses by the user, and; (2) recording a second keyboard entry, provided within the graphical user interface, that occurs after the user inputs the first keyboard entry and before the user submits the one or more responses;
    storing, in computer memory, by one or more processors, an electronic record of the one or more system inputs;
    analyzing, by one or more processors, the one or more submitted inputs and the one or more unsubmitted inputs to determine one or more changes to the one or more responses prior to submission, by the user, of the one or more responses, wherein analyzing the one or more submitted inputs and the one or more unsubmitted inputs to determine the one or more changes to the one or more responses comprises comparing the first keyboard entry with the second keyboard entry to determine one or more differences between the one or more submitted inputs and the one or more unsubmitted inputs, wherein the first keyboard entry is an unsubmitted input and the second keyboard entry is a submitted input;
    determining, by one or more processors, based at least in part on the one or more inputs and the one or more changes to the one or more responses, whether the user has provided one or more responses to the one or more questions comprising one or more abnormal responses to the one or more questions; and
    at least partially in response to determining that the user has provided one or more abnormal responses to the one or more questions, automatically flagging the one or more questions in memory.

2. The computer-implemented method of claim 1, wherein analyzing the one or more submitted inputs and the one or more unsubmitted inputs to determine one or more changes to the one or more responses prior to submission comprises determining a number of times the user changed a response to a particular one of the one or more questions.

3. The computer-implemented method of claim 1, further comprising:
    determining that a particular response of the one or more responses to a particular question of the one or more questions comprises a particular input as the submitted input;
    in response, determining that the particular response of the one or more responses provided by the user comprises an abnormal response; and
    in response to determining that the particular response comprises an abnormal response, flagging the particular question of the one or more questions in memory.

4. The computer-implemented method of claim 3, further comprising:
    in response to determining that the particular response of the one or more responses to the particular question of the one or more questions comprises the particular input as the submitted input, prompting the user to answer at least one or more follow up questions.

5. The computer-implemented method of claim 1, wherein:
    actively monitoring the one or more system inputs comprises actively monitoring an amount of time the user takes to provide each of the one or more responses.

6. The computer-implemented method of claim 5, further comprising:
    for each particular one of the one or more responses, determining whether the amount of time taken by the user to provide the particular response is longer than a threshold amount of time; and
    in response to determining that the amount of time taken by the user to provide the particular response is longer than the threshold amount of time, determining that the particular response is an abnormal response.

7. A computer-implemented data processing method for monitoring a user as the user provides one or more responses to one or more questions in a computerized privacy questionnaire, the method comprising:
    actively monitoring, by one or more processors, (i) a user context of the user as the user provides the one or more responses to the one or more questions in the computerized privacy questionnaire and (ii) one or more system inputs from the user as the user provides the one or more responses, the one or more system inputs comprising one or more submitted inputs and one or more unsubmitted inputs, wherein actively monitoring the user context and the one or more system inputs comprises recording a first user input, provided within a graphical user interface, that occurs prior to submission of the one or more responses by the user, and recording a second user input, provided within the graphical user interface, that occurs after the user inputs the first user input and before the user submits the one or more responses;
    storing, in computer memory, by one or more processors, an electronic record of user context of the user and the one or more system inputs from the user;
    analyzing, by one or more processors, at least one item of information selected from a group consisting of (i) the user context and (ii) the one or more system inputs from the user to determine whether abnormal user behavior occurred in providing the one or more responses, wherein determining whether the abnormal user behavior occurred in providing the one or more responses comprises comparing the first user input with the second user input to determine one or more differences between the one or more submitted inputs and the one or more unsubmitted inputs, wherein the first user input is an unsubmitted input and the second user input is a submitted input; and
    at least partially in response to determining that abnormal user behavior occurred in providing the one or more responses, automatically flagging at least a portion of the computerized privacy questionnaire in memory.

8. The computer-implemented method of claim 7, wherein the user context comprises at least one user factor selected from a group consisting of:
- an amount of time that the user takes to complete the computerized privacy questionnaire;
- a deadline associated with the computerized privacy questionnaire;
- a location of the user as the user conducts the computerized privacy questionnaire; and
- one or more electronic activities associated with an electronic device on which the user is responding to the computerized privacy questionnaire.

9. The computer-implemented method of claim 8, wherein the user context comprises a deadline associated with the computerized privacy questionnaire and the system is further configured for:
- determining a time that the user initiated the computerized privacy questionnaire;
- determining whether the time that the user initiated the computerized privacy questionnaire is after a threshold initiation time; and
- in response to determining that the time that the user initiated the computerized privacy questionnaire is after the threshold initiation time, determining that abnormal user behavior occurred in providing the one or more responses.

10. The computer-implemented method of claim 8, wherein the user context comprises an amount of time that the user takes to complete the computerized privacy questionnaire and the system is further configured for:
- determining whether the amount of time taken by the user to provide the one or more responses is less than a threshold response time; and
- in response to determining that the amount of time taken by the user to provide the one or more responses is less than the threshold response time, determining that abnormal user behavior occurred in providing the one or more responses.

11. The computer-implemented data processing method of claim 10, wherein the user context comprises a deadline associated with the computerized privacy questionnaire and the system is further configured for:
- determining a time that the user initiated the computerized privacy questionnaire;
- determining a period of time between (i) the time that the user initiated the computerized privacy questionnaire and (ii) a deadline time for completion of the computerized privacy questionnaire; and
- modifying the threshold response time based at least in part on the period of time between (i) the time that the user initiated the computerized privacy questionnaire and (ii) the deadline time for completion of the computerized privacy questionnaire.

12. The computer-implemented method of claim 8, wherein the user context comprises a location of the user as the user provides at least one particular response to a particular question in the computerized privacy questionnaire and the system is further configured for:
- determining a type of location at which the user provided the particular response;
- determining whether the type of location at which the user provided the particular response is a predetermined type of location;
- in response to determining that the type of location at which the user provided the particular response is the predetermined type of location, determining that abnormal user behavior occurred in providing the particular response.

13. The computer-implemented method of claim 8, wherein the user context comprises one or more electronic activities associated with the electronic device on which the user responded to the computerized privacy questionnaire and the system is further configured for:
- determining whether the user interacted, on the electronic device, with one or more web browsers or software applications that are unrelated to conducting the computerized privacy questionnaire while the user was in the process of completing the computerized privacy questionnaire; and
- in response to determining that the user interacted, on the electronic device, with one or more web browsers or software applications that are unrelated to conducting the computerized privacy questionnaire while the user was in the process of completing the computerized privacy questionnaire, determining that abnormal user behavior occurred in providing the one or more responses.

14. The computer-implemented data processing method of claim 8, wherein the user context comprises at least two of the user factors and the system is further configured for:
- determining, for each particular one of the at least two particular user factors, a respective user factor rating based at least in part on information related to the particular user factor as the user provided the one or more responses to the one or more questions in the computerized privacy questionnaire;
- calculating a user context score based at least in part on the respective user factor rating for each of the at least two user factors; and
- determining whether abnormal user behavior occurred in providing the one or more responses based at least in part on the user context score.

15. The computer-implemented data processing method of claim 14, wherein the step of determining whether abnormal user behavior occurred in providing the one or more responses based at least in part on the user context score comprises:
- comparing the user context score to a threshold user context score; and
- in response to determining that the user context score is greater than the threshold user context score, determining that abnormal user behavior occurred in providing the one or more responses.

16. The computer-implemented data processing method of claim 7, wherein:
- the method comprises analyzing the one or more system inputs from the user to determine whether abnormal user behavior occurred in providing the one or more responses; and
- the step of analyzing the one or more system inputs comprises:
  - determining that a particular response of the one or more responses to a particular question of the one or more questions comprises a particular type of input as the submitted input; and
  - in response to determining that the particular response of the one or more responses to the particular question of the one or more questions comprises the particular type of input as the submitted input, prompting the user to provide a response to at least one or more follow up questions.

17. The computer-implemented data processing method of claim 16, wherein the particular type of input identifies the particular response as an indefinite response.

18. The computer-implemented data processing method of claim 7, further comprising:
- for each respective one of the one or more responses to the one or more questions in the computerized privacy questionnaire, determining a respective confidence factor score based at least in part on the user context of the user as the user provides the respective response, and one or more unsubmitted inputs that were entered, but not submitted, in response to the same question as the respective response; and
- calculating a confidence score for the computerized privacy questionnaire based at least in part on the confidence factor score for each respective one of the one or more responses to one or more questions in the computerized privacy questionnaire; and
- using the confidence score for the computerized privacy questionnaire to determine whether abnormal user behavior occurred in providing the one or more responses.

19. A computer-implemented data processing method for monitoring a user as the user provides one or more responses to one or more questions in a computerized privacy questionnaire, the method comprising:
- actively monitoring, by one or more processors, a user context of the user as the user provides the one or more responses to the one or more questions in a computerized privacy questionnaire, the one or more responses comprising one or more submitted inputs and one or more unsubmitted inputs, wherein actively monitoring the user context of the user as the user provides the one more responses to the one or more questions in a computerized privacy questionnaire comprises recording a first user input, provided within a graphical user interface, that occurs prior to submission of the one or more responses by the user, and recording a second user input, provided within the graphical user interface, that occurs after the user provides the first user input and before the user submits the one or more responses; and
- wherein the user context comprises at least one user factor selected from a group consisting of:
  - an amount of time the user takes to complete the computerized privacy questionnaire;
  - a deadline associated with the computerized privacy questionnaire;
  - a location of the user as the user completes the computerized privacy questionnaire; and
  - one or more electronic activities associated with an electronic device on which the user is responding to the computerized privacy questionnaire;
- storing, in computer memory, by one or more processors, an electronic record of the user context of the user;
- analyzing, by one or more processors, the user context, based at least in part on the at least one user factor, to determine whether abnormal user behavior occurred in providing the one or more responses, and wherein determining whether the abnormal user behavior occurred in providing the one or more responses comprises comparing the first user input with the second user input to determine one or more differences between the first user input and the second user input, wherein the first user input is an unsubmitted input and the second user input is a submitted input; and
- at least partially in response to determining that abnormal user behavior occurred in providing the one or more responses, automatically flagging at least a portion of the computerized privacy questionnaire in memory.

* * * * *